United States Patent
Kember et al.

(10) Patent No.: US 11,965,062 B2
(45) Date of Patent: *Apr. 23, 2024

(54) METHODS FOR FORMING POLYCARBONATE ETHER POLYOLS AND HIGH MOLECULAR WEIGHT POLYETHER CARBONATES

(71) Applicant: Econic Technologies LTD, Macclesfield Cheshire (GB)

(72) Inventors: Michael Kember, Macclesfield Cheshire (GB); James Leeland, Macclesfield Cheshire (GB); Rakibul Kabir, Macclesfield Cheshire (GB); Emmalina Hollis, Macclesfield Cheshire (GB)

(73) Assignee: Econic Technologies LTD., Macclesfield (GB)

( * ) Notice: Subject to any disclaimer, the term of this patent is extended or adjusted under 35 U.S.C. 154(b) by 548 days.

This patent is subject to a terminal disclaimer.

(21) Appl. No.: 16/757,870

(22) PCT Filed: Oct. 24, 2018

(86) PCT No.: PCT/GB2018/053082
§ 371 (c)(1),
(2) Date: Apr. 21, 2020

(87) PCT Pub. No.: WO2019/081931
PCT Pub. Date: May 2, 2019

(65) Prior Publication Data
US 2020/0339749 A1 Oct. 29, 2020

(30) Foreign Application Priority Data
Oct. 24, 2017 (GB) ...................... 1717459

(51) Int. Cl.
*C08G 65/26* (2006.01)
*C07F 15/04* (2006.01)
(Continued)

(52) U.S. Cl.
CPC ........ *C08G 65/2663* (2013.01); *C07F 15/045* (2013.01); *C08G 18/44* (2013.01);
(Continued)

(58) Field of Classification Search
CPC ....... C07F 15/045; C08G 18/44; C08G 64/34; C08G 65/2663
See application file for complete search history.

(56) References Cited

U.S. PATENT DOCUMENTS

| | | |
|---|---|---|
| 3,427,256 A | 2/1969 | Milgrom |
| 4,500,704 A | 2/1985 | Kruper, Jr. et al. |

(Continued)

FOREIGN PATENT DOCUMENTS

| | | |
|---|---|---|
| WO | 2006103213 A1 | 10/2006 |
| WO | 2008092767 A1 | 8/2008 |

(Continued)

OTHER PUBLICATIONS

International Search Report (ISR) for PCT/GB2018/053082 dated Feb. 11, 2019 (4 pages).

(Continued)

*Primary Examiner* — Pancham Bakshi
(74) *Attorney, Agent, or Firm* — Shumaker, Loop & Kendrick, LLP

(57) ABSTRACT

The method of preparing the polycarbonate ether polyol or high molecular weight polyether carbonate using controlled addition of materials during polymerisation includes the steps of:

mixing catalyst of formula(I), double metal cyanide (DMC) catalyst and optionally carbon dioxide and/or solvent with epoxide and optionally starter compound and/or carbon dioxide; or mixing DMC catalyst and optionally starter compound, carbon dioxide and/or solvent with epoxide and optionally carbon dioxide and/or solvent; or mixing epoxide, catalyst of formula(I), starter compound and carbon dioxide and optionally solvent; or mixing catalyst of formula (I), DMC catalyst and optionally starter compound, epoxide, carbon dioxide and/or solvent to form in each case a mixture ($\alpha$); and adding one or more of starter compound, epoxide, carbon dioxide, catalyst of formula(I), DMC catalyst and/or solvent to mixture ($\alpha$) to form mixture ($\beta$) comprising starter compound, epoxide, carbon dioxide, catalyst of formula(I), DMC catalyst and optionally solvent,

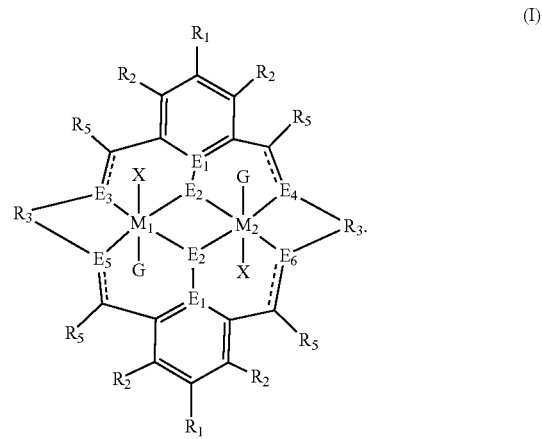

15 Claims, No Drawings

(51) Int. Cl.
   *C08G 18/44*   (2006.01)
   *C08G 64/34*   (2006.01)

(52) U.S. Cl.
   CPC ......... *C08G 64/34* (2013.01); *C08G 65/2603* (2013.01); *C08G 65/269* (2013.01)

(56) References Cited

U.S. PATENT DOCUMENTS

| | | |
|---|---|---|
| 5,536,883 A | 7/1996 | Le-Khac |
| 6,762,278 B2 | 7/2004 | Hinz et al. |
| 7,977,501 B2 | 7/2011 | Haider et al. |
| 10,774,179 B2 * | 9/2020 | Kember ............. C08G 65/2603 |
| 2003/0069389 A1 | 4/2003 | Eleveld et al. |
| 2003/0158449 A1 | 8/2003 | Hofmann et al. |
| 2004/0220430 A1 | 11/2004 | Eleveld et al. |
| 2005/0065383 A1 | 3/2005 | Wehmeyer |
| 2008/0167502 A1 | 7/2008 | Bohres et al. |
| 2013/0211041 A1 | 8/2013 | Kunst et al. |
| 2014/0249279 A1 | 9/2014 | Williams et al. |
| 2017/0210848 A1 | 7/2017 | Chapman et al. |
| 2017/0247509 A1 | 8/2017 | Sujith et al. |

FOREIGN PATENT DOCUMENTS

| | | |
|---|---|---|
| WO | 2013034750 A2 | 3/2013 |
| WO | 2015022290 A1 | 2/2015 |
| WO | 2016012785 A1 | 1/2016 |
| WO | 2016012786 A1 | 1/2016 |
| WO | 2017037441 A1 | 3/2017 |

OTHER PUBLICATIONS

Written Opinion of the International Searching Authority for PCT/GB2018/053082 dated Feb. 11, 2019 (6 pages).

M. Kember et al. "Highly Active Dizinc Catalyst for the Copolymerization of Carbon Dioxide and Cyclohexene Oxide at One Atmosphere Pressure", Angewandte Chemie International Edition, vol. 48, No. 5, p. 931-933, Dec. 29, 2008.

GB Search Report for GB App. No. 1717459.0 dated Apr. 24, 2018 (6 pages).

* cited by examiner

METHODS FOR FORMING POLYCARBONATE ETHER POLYOLS AND HIGH MOLECULAR WEIGHT POLYETHER CARBONATES

TECHNICAL FIELD

The present invention relates to methods for preparing polycarbonate ether polyols and high molecular weight polyether carbonates. The present invention relates more particularly, but not necessarily exclusively, to methods having improved control through controlled addition of materials during polymerisation.

BACKGROUND

Polycarbonate ether polyols are valuable as starting materials for the synthesis of polyurethanes. Polyurethanes are polymers which are prepared by reacting a di- or polyisocyanate with a polyol. Polyurethanes are used in many different products and applications, including as insulation panels, high performance adhesives, high-resilience foam seating, seals and gaskets, wheels and tyres, synthetic fibres, and the like.

Polyether carbonate polyols can be made by the catalytic addition of epoxides and carbon dioxide to a starter (compounds with H-functionality). One method of preparing polyether carbonate polyols is by using a double metal cyanide (DMC) catalyst. Such methods are described in U.S. Pat. Nos. 4,500,704, 6,762,278, WO2006/103213, WO2015/022290.

"DMC" catalyst is a term commonly used in documents and published patents to refer to catalysts having at least two metal centres and a cyanide ligand. Many patents relating to methods for preparing the DMC catalyst and methods for preparing polyether using the DMC catalyst are disclosed [e.g. US 2008/0167502 (BASF); US 2003/0158449 (Bayer); US 2003/0069389 (Shell); US 2004/0220430 (Repsol Quimica); U.S. Pat. No. 5,536,883 (Arco); US 2005/0065383 (Dow), and U.S. Pat. No. 3,427,256 (The General Tyre and Rubber Company)].

The polyether carbonate polyols formed by DMC catalysts generally have low carbon dioxide content (<20 wt % $CO_2$) and require high pressures such as 40 or 50 bar to incorporate such $CO_2$ levels. WO2006/103213 discloses a semi-batch process where an initial amount of epoxide (such as propylene oxide) is added to pre-activate the catalyst in the reactor in the presence of a starter, generating a polyether oligomer. The remaining epoxide and carbon dioxide is then metered into the reaction in slowly to control the highly exothermic reaction and enable safe operation. This process has the disadvantage that the carbon dioxide content of the polyol is inherently lowered by the initial activation step in the absence of carbon dioxide, where the first segment of the chain contains only polyether linkages. The method is also limited to higher equivalent weight starters (such as polypropylene glycol 460) as lower equivalent weight starters (such as propylene glycol, PG, molecular mass 76 g/mol) inhibit the catalyst activation. Therefore, the method only generates moderate $CO_2$ content at higher molecular weights and cannot be used to incorporate any significant amount of $CO_2$ into lower molecular weight polyols (<1500 Mn).

WO2008/092767 discloses a semi-batch process using a DMC catalyst whereby an initial starter with higher equivalent weight (such as PPG-460) is charged into the reactor with the DMC catalyst for the activation step. A further, lower equivalent weight starter such as PG is metered into the reactor during reaction alongside the epoxide. This enables the use of lower weight starters as they don't hinder the reactivity after initiation, however the catalyst still has to be activated and a proportion of the polyol still contains the polyether product of the activation. The overall $CO_2$ content is still only moderate under high pressures. Operation under high pressures is disadvantageous for industrial scale preparation as it significantly increases cost and complexity of design.

WO2017/037441 discloses a batch method for producing polyether carbonate polyols using a dual catalyst system which enables operation under low pressures (such as 5-10 bar $CO_2$) and can produce polyether carbonate polyols with a greatly increased $CO_2$ content (>30 wt % $CO_2$). Such a batch operation, where all the epoxide is entered into the reactor at the start of the reaction would never be applicable industrially because of the possibility of a highly exothermic reaction occurring between the DMC catalyst and the epoxide.

Surprisingly, it has been found that such a dual catalyst system can be operated in a semi-continuous or continuous mode where the metering of one or more of the contents into the reactor during the reaction enables safe operation of this process. This is particularly surprising as the homogeneous polycarbonate catalyst, generally has been demonstrated in a batch mode (as described in WO2013/034750, WO2016/012786 or WO2016/012785). Furthermore, the semi-continuous or continuous process can be run without the need to pre-activate the DMC, enabling incorporation of $CO_2$ from the beginning of the reaction, increasing the potential $CO_2$ content of the polyol. The process can be operated using only low equivalent weight starters (such as 1,6-hexanediol, equivalent weight 118 g/mol) to produce a full range of molecular weight polyols with higher $CO_2$ contents.

It has been found that continuous addition of the starter and the epoxide to the reactor enables the production of lower weight materials with appreciable $CO_2$ content.

The process can also be surprisingly adopted in a continuous manner in the absence of a starter, to produce a polyether carbonate (e.g. a high molecular weight polyether carbonate).

It is an object of the present invention provide obviate or mitigate problems with existing methods for preparing a polycarbonate ether polyols and/or methods for preparing high molecular weight polyether carbonates, and/or to provide an improved method, and/or to provide an alternative.

SUMMARY OF THE INVENTION

According to the invention, there is provided a method for preparing a polycarbonate ether polyol, the method comprising the steps of:
 (I) (a) mixing catalyst of formula (I), double metal cyanide (DMC) catalyst and optionally carbon dioxide and/or solvent with epoxide and optionally starter compound and/or carbon dioxide to form mixture (α); or
  (b) mixing double metal cyanide (DMC) catalyst and optionally starter compound, carbon dioxide and/or solvent with epoxide and optionally carbon dioxide and/or solvent to form mixture (α); or
  (c) mixing epoxide, catalyst of formula (I), starter compound and carbon dioxide and optionally solvent to form mixture (α); or
  (d) mixing catalyst of formula (I), double metal cyanide (DMC) catalyst and optionally starter compound, epoxide, carbon dioxide and/or solvent to form mixture (α); and (II) adding one or more of starter compound, epoxide, carbon dioxide, catalyst of formula (I), double metal cyanide (DMC) catalyst and/or solvent to mixture (α) to form mixture (β) comprising starter compound, epoxide, carbon dioxide, catalyst of formula (I), double metal cyanide (DMC) catalyst and optionally solvent, wherein the catalyst of formula (I) has the following structure:

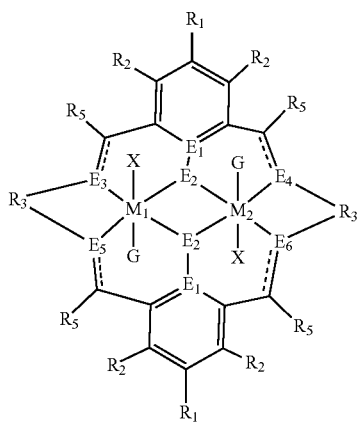

(I)

wherein $M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

$R_1$ and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

$R_5$ is independently selected from H, or optionally substituted aliphatic, heteroaliphatic, alicyclic, heteroalicyclic, aryl, heteroaryl, alkylheteroaryl or alkylaryl; $E_1$ is C, $E_2$ is O, S or NH or $E_1$ is N and $E_2$ is O;

$E_3$, $E_4$, $E_5$ and $E_6$ are selected from N, NR$_4$, O and S, wherein when $E_3$, $E_4$, $E_5$ or $E_6$ are N, ===== is ─────, and wherein when $E_3$, $E_4$, $E_5$ or $E_6$ are NR$_4$, O or S, ===== is ─────;

$R_4$ is independently selected from H, or optionally substituted aliphatic, heteroaliphatic, alicyclic, heteroalicyclic, aryl, heteroaryl, alkylheteroaryl, -alkylC(O)OR$_{19}$ or -alkylC≡N or alkylaryl;

X is independently selected from OC(O)R$_x$, OSO$_2$R$_x$, OSOR$_x$, OSO(R$_x$)$_2$, S(O)R$_x$, OR$_x$, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between $M_1$ and $M_2$;

$R_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

There is also provided a method for preparing high molecular weight polyether carbonates, the method comprising the steps of:

(I) (a) mixing catalyst of formula (I), double metal cyanide (DMC) catalyst and optionally carbon dioxide and/or solvent with epoxide and optionally carbon dioxide to form mixture (α); or (b) mixing double metal cyanide (DMC) catalyst and optionally carbon dioxide and/or solvent with epoxide and optionally carbon dioxide and/or solvent to form mixture (α); or (c) mixing epoxide, catalyst of formula (I) and carbon dioxide and optionally solvent to form mixture (α); or (d) mixing catalyst of formula (I), double metal cyanide (DMC) catalyst and optionally epoxide, carbon dioxide and/or solvent to form mixture (α); and (II) adding one or more of epoxide, carbon dioxide, catalyst of formula (I), double metal cyanide (DMC) catalyst and/or solvent to mixture (α) to form mixture (β) comprising epoxide, carbon dioxide, catalyst of formula (I), double metal cyanide (DMC) catalyst and optionally solvent, wherein the catalyst of formula (I) has the following structure:

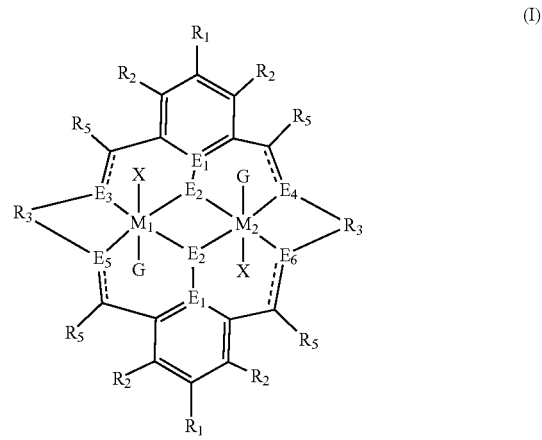

(I)

wherein $M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

$R_1$ and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

$R_5$ is independently selected from H, or optionally substituted aliphatic, heteroaliphatic, alicyclic, heteroalicyclic, aryl, heteroaryl, alkylheteroaryl or alkylaryl; $E_1$ is C, $E_2$ is O, S or NH or $E_1$ is N and $E_2$ is O;

$E_3$, $E_4$, $E_5$ and $E_6$ are selected from N, $NR_4$, O and S, wherein when $E_3$, $E_4$, $E_5$ or $E_6$ are N, ------ is ═══, and wherein when $E_3$, $E_4$, $E_5$ or $E_6$ are $NR_4$, O or S, ------ is ───;

$R_4$ is independently selected from H, or optionally substituted aliphatic, heteroaliphatic, alicyclic, heteroalicyclic, aryl, heteroaryl, alkylheteroaryl, -alkylC(O)$OR_{19}$ or -alkylC≡N or alkylaryl;

X is independently selected from OC(O)$R_x$, $OSO_2R_x$, $OSOR_x$, $OSO(R_x)_2$, $S(O)R_x$, $OR_x$, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between M and $M_2$;

$R_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

There is also provided a product obtainable by the methods described herein.

Definitions

For the purpose of the present invention, an aliphatic group is a hydrocarbon moiety that may be straight chain (i.e. unbranched) branched, or cyclic and may be completely saturated, or contain one or more units of unsaturation, but which is not aromatic. The term "unsaturated" means a moiety that has one or more double and/or triple bonds. The term "aliphatic" is therefore intended to encompass alkyl, cycloalkyl, alkenyl cycloalkenyl, alkynyl or cycloalkenyl groups, and combinations thereof.

An aliphatic group is optionally a $C_{1-30}$ aliphatic group, that is, an aliphatic group with 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 carbon atoms. Optionally, an aliphatic group is a $C_{1-15}$aliphatic, optionally a $C_{1-12}$aliphatic, optionally a $C_{1-10}$aliphatic, optionally a $C_{1-8}$aliphatic, such as a $C_{1-6}$aliphatic group. Suitable aliphatic groups include linear or branched, alkyl, alkenyl and alkynyl groups, and mixtures thereof such as (cycloalkyl)alkyl groups, (cycloalkenyl)alkyl groups and (cycloalkyl)alkenyl groups.

The term "alkyl," as used herein, refers to saturated, straight- or branched-chain hydrocarbon radicals derived by removal of a single hydrogen atom from an aliphatic moiety. An alkyl group is optionally a "$C_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Optionally, an alkyl group is a $C_{1-15}$ alkyl, optionally a $C_{1-12}$ alkyl, optionally a $C_{1-10}$ alkyl, optionally a $C_{1-8}$ alkyl, optionally a $C_{1-6}$ alkyl group. Specifically, examples of "$C_{1-20}$ alkyl group" include methyl group, ethyl group, n-propyl group, iso-propyl group, n-butyl group, iso-butyl group, sec-butyl group, tert-butyl group, sec-pentyl, iso-pentyl, n-pentyl group, neopentyl, n-hexyl group, sec-hexyl, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like.

The term "alkenyl," as used herein, denotes a group derived from the removal of a single hydrogen atom from a straight- or branched-chain aliphatic moiety having at least one carbon-carbon double bond. The term "alkynyl," as used herein, refers to a group derived from the removal of a single hydrogen atom from a straight- or branched-chain aliphatic moiety having at least one carbon-carbon triple bond. Alkenyl and alkynyl groups are optionally "$C_{2-20}$alkenyl" and "$C_{2-20}$alkynyl", optionally "$C_{2-15}$ alkenyl" and "$C_{2-15}$ alkynyl", optionally "$C_{2-12}$ alkenyl" and "$C_{2-12}$ alkynyl", optionally "$C_{2-10}$ alkenyl" and "$C_{2-10}$ alkynyl", optionally "$C_{2-8}$ alkenyl" and "$C_{2-8}$ alkynyl", optionally "$C_{2-6}$ alkenyl" and "$C_{2-6}$ alkynyl" groups, respectively. Examples of alkenyl groups include ethenyl, propenyl, allyl, 1,3-butadienyl, butenyl, 1-methyl-2-buten-1-yl, allyl, 1,3-butadienyl and allenyl. Examples of alkynyl groups include ethynyl, 2-propynyl (propargyl) and 1-propynyl.

The terms "cycloaliphatic", "carbocycle", or "carbocyclic" as used herein refer to a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Optionally, an alicyclic group has from 3 to 15, optionally from 3 to 12, optionally from 3 to 10, optionally from 3 to 8 carbon atoms, optionally from 3 to 6 carbons atoms. The terms "cycloaliphatic", "carbocycle" or "carbocyclic" also include aliphatic rings that are fused to one or more aromatic or nonaromatic rings, such as tetrahydronaphthyl rings, where the point of attachment is on the aliphatic ring. A carbocyclic group may be polycyclic, e.g. bicyclic or tricyclic. It will be appreciated that the alicyclic group may comprise an alicyclic ring bearing one or more linking or non-linking alkyl substituents, such as —$CH_2$-cyclohexyl. Specifically, examples of carbocycles include cyclopropane, cyclobutane, cyclopentane, cyclohexane, bicycle[2,2,1]heptane, norborene, phenyl, cyclohexene, naphthalene, spiro[4.5]decane, cycloheptane, adamantane and cyclooctane.

A heteroaliphatic group (including heteroalkyl, heteroalkenyl and heteroalkynyl) is an aliphatic group as described above, which additionally contains one or more heteroatoms. Heteroaliphatic groups therefore optionally contain from 2 to 21 atoms, optionally from 2 to 16 atoms, optionally from 2 to 13 atoms, optionally from 2 to 11 atoms, optionally from 2 to 9 atoms, optionally from 2 to 7 atoms, wherein at least one atom is a carbon atom. Optional heteroatoms are selected from O, S, N, P and Si. When heteroaliphatic groups have two or more heteroatoms, the heteroatoms may be the same or different. Heteroaliphatic groups may be substituted or unsubstituted, branched or unbranched, cyclic or acyclic, and include saturated, unsaturated or partially unsaturated groups.

An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Optionally, an alicyclic group has from 3 to 15, optionally from 3 to 12, optionally from 3 to 10, optionally from 3 to 8 carbon atoms, optionally from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —CH$_2$-cyclohexyl. Specifically, examples of the $C_{3-20}$ cycloalkyl group include cyclopropyl, cyclobutyl, cyclopentyl, cyclohexyl, cycloheptyl, adamantyl and cyclooctyl.

A heteroalicyclic group is an alicyclic group as defined above which has, in addition to carbon atoms, one or more ring heteroatoms, which are optionally selected from O, S, N, P and Si. Heteroalicyclic groups optionally contain from one to four heteroatoms, which may be the same or different. Heteroalicyclic groups optionally contain from 5 to 20 atoms, optionally from 5 to 14 atoms, optionally from 5 to 12 atoms.

An aryl group or aryl ring is a monocyclic or polycyclic ring system having from 5 to 20 carbon atoms, wherein at least one ring in the system is aromatic and wherein each ring in the system contains three to twelve ring members. The term "aryl" can be used alone or as part of a larger moiety as in "aralkyl", "aralkoxy", or "aryloxyalkyl". An aryl group is optionally a "$C_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "$C_{6-10}$ aryl group" include phenyl group, biphenyl group, indenyl group, anthracyl group, naphthyl group or azulenyl group and the like. It should be noted that condensed rings such as indan, benzofuran, phthalimide, phenanthridine and tetrahydro naphthalene are also included in the aryl group.

The term "heteroaryl" used alone or as part of another term (such as "heteroaralkyl", or "heteroaralkoxy") refers to groups having 5 to 14 ring atoms, optionally 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of nitrogen. The term "heteroaryl" also includes groups in which a heteroaryl ring is fused to one or more aryl, cycloaliphatic, or heterocyclyl rings, where the radical or point of attachment is on the heteroaromatic ring. Examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. Thus, a heteroaryl group may be mono- or polycyclic.

The term "heteroaralkyl" refers to an alkyl group substituted by a heteroaryl, wherein the alkyl and heteroaryl portions independently are optionally substituted.

As used herein, the terms "heterocycle", "heterocyclyl", "heterocyclic radical", and "heterocyclic ring" are used interchangeably and refer to a stable 5- to 7-membered monocyclic or 7-14-membered bicyclic heterocyclic moiety that is saturated, partially unsaturated, or aromatic and having, in addition to carbon atoms, one or more, optionally one to four, heteroatoms, as defined above. When used in reference to a ring atom of a heterocycle, the term "nitrogen" includes a substituted nitrogen.

Examples of alicyclic, heteroalicyclic, aryl and heteroaryl groups include but are not limited to cyclohexyl, phenyl, acridine, benzimidazole, benzofuran, benzothiophene, benzoxazole, benzothiazole, carbazole, cinnoline, dioxin, dioxane, dioxolane, dithiane, dithiazine, dithiazole, dithiolane, furan, imidazole, imidazoline, imidazolidine, indole, indoline, indolizine, indazole, isoindole, isoquinoline, isoxazole, isothiazole, morpholine, napthyridine, oxazole, oxadiazole, oxathiazole, oxathiazolidine, oxazine, oxadiazine, phenazine, phenothiazine, phenoxazine, phthalazine, piperazine, piperidine, pteridine, purine, pyran, pyrazine, pyrazole, pyrazoline, pyrazolidine, pyridazine, pyridine, pyrimidine, pyrrole, pyrrolidine, pyrroline, quinoline, quinoxaline, quinazoline, quinolizine, tetrahydrofuran, tetrazine, tetrazole, thiophene, thiadiazine, thiadiazole, thiatriazole, thiazine, thiazole, thiomorpholine, thianaphthalene, thiopyran, triazine, triazole, and trithiane.

The term "halide", "halo" and "halogen" are used interchangeably and, as used herein mean a fluorine atom, a chlorine atom, a bromine atom, an iodine atom and the like, optionally a fluorine atom, a bromine atom or a chlorine atom, and optionally a fluorine atom.

A haloalkyl group is optionally a "$C_{1-20}$ haloalkyl group", optionally a "$C_{1-15}$ haloalkyl group", optionally a "$C_{1-12}$ haloalkyl group", optionally a "$C_{1-10}$ haloalkyl group", optionally a "$C_{1-8}$ haloalkyl group", optionally a "$C_{1-6}$ haloalkyl group" and is a $C_{1-20}$ alkyl, a $C_{15}$ alkyl, a $C_{1-12}$ alkyl, a $C_{1-10}$ alkyl, a $C_{1-8}$ alkyl, or a $C_{1-6}$ alkyl group, respectively, as described above substituted with at least one halogen atom, optionally 1, 2 or 3 halogen atom(s). The term "haloalkyl" encompasses fluorinated or chlorinated groups, including perfluorinated compounds. Specifically, examples of "$C_{1-20}$ haloalkyl group" include fluoromethyl group, difluoromethyl group, trifluoromethyl group, fluoroethyl group, difluoroethyl group, trifluoroethyl group, chloromethyl group, bromomethyl group, iodomethyl group and the like.

The term "acyl" as used herein refers to a group having a formula —C(O)R where R is hydrogen or an optionally substituted aliphatic, aryl, or heterocyclic group.

An alkoxy group is optionally a "$C_{1-20}$ alkoxy group", optionally a "$C_{1-15}$ alkoxy group", optionally a "$C_{1-12}$ alkoxy group", optionally a "$C_{1-10}$ alkoxy group", optionally a "$C_{1-8}$ alkoxy group", optionally a "$C_{1-6}$ alkoxy group" and is an oxy group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively. Specifically, examples of "$C_{1-20}$ alkoxy group" include methoxy group, ethoxy group, n-propoxy group, iso-propoxy group, n-butoxy group, iso-butoxy group, sec-butoxy group, tert-butoxy group, n-pentyloxy group, iso-pentyloxy group, sec-pentyloxy group, n-hexyloxy group, iso-hexyloxy group, n-hexyloxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosyloxy group, 1,1-dimethylpropoxy group, 1,2-dimethylpropoxy group, 2,2-dimethylpropoxy group, 2-methylbutoxy group, 1-ethyl-2-methylpropoxygroup, 1,1,2-trimethylpropoxygroup, 1,1-dimethylbutoxy group, 1,2-dimethylbutoxy group, 2,2-dimethylbutoxy group, 2,3-dimethylbutoxy group, 1,3-dimethylbutoxy group, 2-ethylbutoxy group, 2-methylpentyloxy group, 3-methylpentyloxy group and the like.

An aryloxy group is optionally a "$C_{5-20}$ aryloxy group", optionally a "$C_{6-12}$ aryloxy group", optionally a "$C_{6-10}$ aryloxy group" and is an oxy group that is bonded to the previously defined $C_{5-20}$ aryl, $C_{6-12}$ aryl, or $C_{6-10}$ aryl group respectively.

An alkylthio group is optionally a "$C_{1-20}$ alkylthio group", optionally a "$C_{15}$ alkylthio group", optionally a "$C_{1-12}$ alkylthio group", optionally a "$C_{1-10}$ alkylthio group", optionally a "$C_{1-16}$ alkylthio group", optionally a "$C_{1-6}$ alkylthio group" and is a thio (—S—) group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively.

An arylthio group is optionally a "$C_{5-20}$ arylthio group", optionally a "$C_{6-12}$ arylthio group", optionally a "$C_{6-10}$ arylthio group" and is a thio (—S—) group that is bonded to the previously defined $C_{5-20}$ aryl, $C_{6-12}$ aryl, or $C_{6-10}$ aryl group respectively.

An alkylaryl group is optionally a "$C_{6-12}$ aryl $C_{1-20}$ alkyl group", optionally a a "$C_{6-12}$ aryl $C_{1-16}$ alkyl group", optionally a "$C_{6-12}$ aryl $C_{1-6}$ alkyl group" and is an aryl group as defined above bonded at any position to an alkyl group as defined above. The point of attachment of the alkylaryl group to a molecule may be via the alkyl portion and thus, optionally, the alkylaryl group is —CH$_2$-Ph or —CH$_2$CH$_2$-Ph. An alkylaryl group can also be referred to as "aralkyl".

A silyl group is optionally —Si(R$_s$)$_3$, wherein each R$_s$ can be independently an aliphatic, heteroaliphatic, alicyclic, heteroalicyclic, aryl or heteroaryl group as defined above. Optionally, each R$_s$ is independently an unsubstituted aliphatic, alicyclic or aryl. Optionally, each R$_s$ is an alkyl group selected from methyl, ethyl or propyl.

A silyl ether group is optionally a group OSi(R$_6$)$_3$ wherein each R$_6$ can be independently an aliphatic, heteroaliphatic, alicyclic, heteroalicyclic, aryl or heteroaryl group as defined above. Each R$_6$ can be independently an unsubstituted aliphatic, alicyclic or aryl. Optionally, each R$_6$ is an optionally substituted phenyl or optionally substituted alkyl group selected from methyl, ethyl, propyl or butyl (such as n-butyl (nBu) or tert-butyl (tBu)). Exemplary silyl ether groups include OSi(Me)$_3$, OSi(Et)$_3$, OSi(Ph)$_3$, OSi(Me)$_2$(tBu), OSi(tBu)$_3$ and OSi(Ph)$_2$(tBu).

A nitrile group (also referred to as a cyano group) is a group CN.

An imine group is a group —CRNR, optionally —CHNR$_7$ wherein R$_7$ is an aliphatic, heteroaliphatic, alicyclic, heteroalicyclic, aryl or heteroaryl group as defined above. R$_7$ may be unsubstituted aliphatic, alicyclic or aryl. Optionally R$_7$ is an alkyl group selected from methyl, ethyl or propyl.

An acetylide group contains a triple bond —C≡C—R$_9$, optionally wherein R$_9$ can be hydrogen, an aliphatic, heteroaliphatic, alicyclic, heteroalicyclic, aryl or heteroaryl group as defined above. For the purposes of the invention when R$_9$ is alkyl, the triple bond can be present at any position along the alkyl chain. R$_9$ may be unsubstituted aliphatic, alicyclic or aryl. Optionally R$_9$ is methyl, ethyl, propyl or phenyl.

An amino group is optionally —NH$_2$, —NHR$_{10}$ or —N(R$_{10}$)$_2$ wherein R$_{10}$ can be an aliphatic, heteroaliphatic, alicyclic, heteroalicyclic, a silyl group, aryl or heteroaryl group as defined above. It will be appreciated that when the amino group is N(R$_{10}$)$_2$, each R$_{10}$ group can be the same or different. Each R$_{10}$ may independently an unsubstituted aliphatic, alicyclic, silyl or aryl. Optionally R$_{10}$ is methyl, ethyl, propyl, SiMe$_3$ or phenyl.

An amido group is optionally —NR$_{11}$C(O)— or —C(O)—NR$_{11}$— wherein R$_{11}$ can be hydrogen, an aliphatic, heteroaliphatic, alicyclic, heteroalicyclic, aryl or heteroaryl group as defined above. R$_{11}$ may be unsubstituted aliphatic, alicyclic or aryl. Optionally R$_{11}$ is hydrogen, methyl, ethyl, propyl or phenyl. The amido group may be terminated by hydrogen, an aliphatic, heteroaliphatic, alicyclic, heteroalicyclic, aryl or heteroaryl group.

An ester group is optionally —OC(O)R$_{12}$— or —C(O)OR$_{12}$— wherein R$_{12}$ can be an aliphatic, heteroaliphatic, alicyclic, heteroalicyclic, aryl or heteroaryl group as defined above. R$_{12}$ may be unsubstituted aliphatic, alicyclic or aryl. Optionally R$_{12}$ is methyl, ethyl, propyl or phenyl.

The ester group may be terminated by an aliphatic, heteroaliphatic, alicyclic, heteroalicyclic, aryl or heteroaryl group. It will be appreciated that if R$_{12}$ is hydrogen, then the group defined by —OC(O)R$_{12}$— or —C(O)OR$_{12}$— will be a carboxylic acid group.

A sulfoxide is optionally —S(O)R$_{13}$ and a sulfonyl group is optionally —S(O)$_2$R$_{13}$ wherein R$_{13}$ can be an aliphatic, heteroaliphatic, alicyclic, heteroalicyclic, aryl or heteroaryl group as defined above. R$_{13}$ may be unsubstituted aliphatic, alicyclic or aryl. Optionally R$_{13}$ is methyl, ethyl, propyl or phenyl.

A carboxylate group is optionally —OC(O)R$_{14}$, wherein R$_{14}$ can be hydrogen, an aliphatic, heteroaliphatic, alicyclic, heteroalicyclic, aryl or heteroaryl group as defined above. R$_{14}$ may be unsubstituted aliphatic, alicyclic or aryl. Optionally R$_{14}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

An acetamide is optionally MeC(O)N(R$_{15}$)$_2$ wherein R$_{15}$ can be hydrogen, an aliphatic, heteroaliphatic, alicyclic, heteroalicyclic, aryl or heteroaryl group as defined above. R$_{15}$ may be unsubstituted aliphatic, alicyclic or aryl. Optionally R$_{15}$ is hydrogen, methyl, ethyl, propyl or phenyl.

A phosphinate group is optionally-OP(O)(R$_{16}$)$_2$ or —P(O)(OR$_{16}$)(R$_{16}$) wherein each R$_{16}$ is independently selected from hydrogen, or an aliphatic, heteroaliphatic, alicyclic, heteroalicyclic, aryl or heteroaryl group as defined above. R$_{16}$ may be aliphatic, alicyclic or aryl, which are optionally substituted by aliphatic, alicyclic, aryl or $C_{1-6}$alkoxy. Optionally R$_{16}$ is optionally substituted aryl or $C_{1-20}$ alkyl, optionally phenyl optionally substituted by $C_{1-6}$alkoxy (optionally methoxy) or unsubstituted $C_{1-20}$alkyl (such as hexyl, octyl, decyl, dodecyl, tetradecyl, hexadecyl, stearyl).

A phosphonate group is optionally —P(O)(OR$_{16}$)$_2$ wherein R$_{16}$ is as defined above. It will be appreciated that when either or both of R$_{16}$ is hydrogen for the group —P(O)(OR$_{16}$)$_2$, then the group defined by —P(O)(OR$_{16}$)$_2$ will be a phosphonic acid group.

A sulfinate group is optionally —S(O)OR$_{17}$ or —OS(O)R$_{17}$ wherein R$_{17}$ can be hydrogen, an aliphatic, heteroaliphatic, haloaliphatic, alicyclic, heteroalicyclic, aryl or heteroaryl group as defined above. R$_{17}$ may be unsubstituted aliphatic, alicyclic or aryl. Optionally R$_{17}$ is hydrogen, methyl, ethyl, propyl or phenyl. It will be appreciated that if R$_{17}$ is hydrogen, then the group defined by —S(O)OR$_{17}$ will be a sulfonic acid group.

A carbonate group is optionally —OC(O)OR$_{18}$, wherein R$_{18}$ can be hydrogen, an aliphatic, heteroaliphatic, alicyclic, heteroalicyclic, aryl or heteroaryl group as defined above. R$_{18}$ may be optionally substituted aliphatic, alicyclic or aryl. Optionally R$_{18}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl, cyclohexyl, benzyl or adamantyl. It will be appreciated that if $R_{17}$ is hydrogen, then the group defined by —OC(O)O$R_{18}$ will be a carbonic acid group.

In an -alkylC(O)O$R_{19}$ or -alkylC(O)$R_{19}$ group, $R_{19}$ can be hydrogen, an aliphatic, heteroaliphatic, alicyclic, heteroalicyclic, aryl or heteroaryl group as defined above. $R_{19}$ may be unsubstituted aliphatic, alicyclic or aryl. Optionally $R_{19}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

It will be appreciated that where any of the above groups are present in a Lewis base G, one or more additional R groups may be present, as appropriate, to complete the valency. For example, in the context of an amino group, an additional R group may be present to give RNH$R_{10}$, wherein R is hydrogen, an optionally substituted aliphatic, heteroaliphatic, alicyclic, heteroalicyclic, aryl or heteroaryl group as defined above. Optionally, R is hydrogen or aliphatic, alicyclic or aryl.

As used herein, the term "optionally substituted" means that one or more of the hydrogen atoms in the optionally substituted moiety is replaced by a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are optionally those that result in the formation of stable compounds. The term "stable", as used herein, refers to compounds that are chemically feasible and can exist for long enough at room temperature i.e. (16-25° C.) to allow for their detection, isolation and/or use in chemical synthesis.

Optional substituents for use in the present invention include, but are not limited to, halogen, hydroxy, nitro, carboxylate, carbonate, alkoxy, aryloxy, alkylthio, arylthio, heteroaryloxy, alkylaryl, amino, amido, imine, nitrile, silyl, silyl ether, ester, sulfoxide, sulfonyl, acetylide, phosphinate, sulfonate or optionally substituted aliphatic, heteroaliphatic, alicyclic, heteroalicyclic, aryl or heteroaryl groups (for example, optionally substituted by halogen, hydroxy, nitro, carbonate, alkoxy, aryloxy, alkylthio, arylthio, amino, imine, nitrile, silyl, sulfoxide, sulfonyl, phosphinate, sulfonate or acetylide).

It will be appreciated that although in formula (I), the groups X and G are illustrated as being associated with a single $M_1$ or $M_2$ metal centre, one or more X and G groups may form a bridge between the $M_1$ and $M_2$ metal centres.

For the purposes of the present invention, the epoxide substrate is not limited. The term epoxide therefore relates to any compound comprising an epoxide moiety (i.e. a substituted or unsubstituted oxirane compound). Substituted oxiranes include monosubstituted oxiranes, disubstituted oxiranes, trisubstituted oxiranes, and tetrasubstituted oxiranes. Epoxides may comprise a single oxirane moiety. Epoxides may comprise two or more oxirane moieties.

Examples of epoxides which may be used in the present invention include, but are not limited to, cyclohexene oxide, styrene oxide, ethylene oxide, propylene oxide, butylene oxide, substituted cyclohexene oxides (such as limonene oxide, $C_{10}H_{16}O$ or 2-(3,4-epoxycyclohexyl)ethyltrimethoxysilane, $C_{11}H_{22}O$), alkylene oxides (such as ethylene oxide and substituted ethylene oxides), unsubstituted or substituted oxiranes (such as oxirane, epichlorohydrin, 2-(2-methoxyethoxy)methyl oxirane (MEMO), 2-(2-(2-methoxyethoxy)ethoxy)methyl oxirane (ME2MO), 2-(2-(2-(2-methoxyethoxy)ethoxy)ethoxy)methyl oxirane (ME3MO), 1,2-epoxybutane, glycidyl ethers, vinyl-cyclohexene oxide, 3-phenyl-1,2-epoxypropane, 1,2- and 2,3-epoxybutane, isobutylene oxide, cyclopentene oxide, 2,3-epoxy-1,2,3,4-tetrahydronaphthalene, indene oxide, and functionalized 3,5-dioxaepoxides. Examples of functionalized 3,5-dioxaepoxides include:

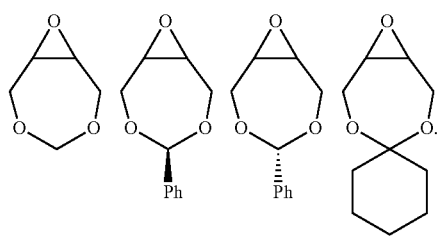

The epoxide moiety may be a glycidyl ether, glycidyl ester or glycidyl carbonate. Examples of glycidyl ethers, glycidyl esters glycidyl carbonates include:

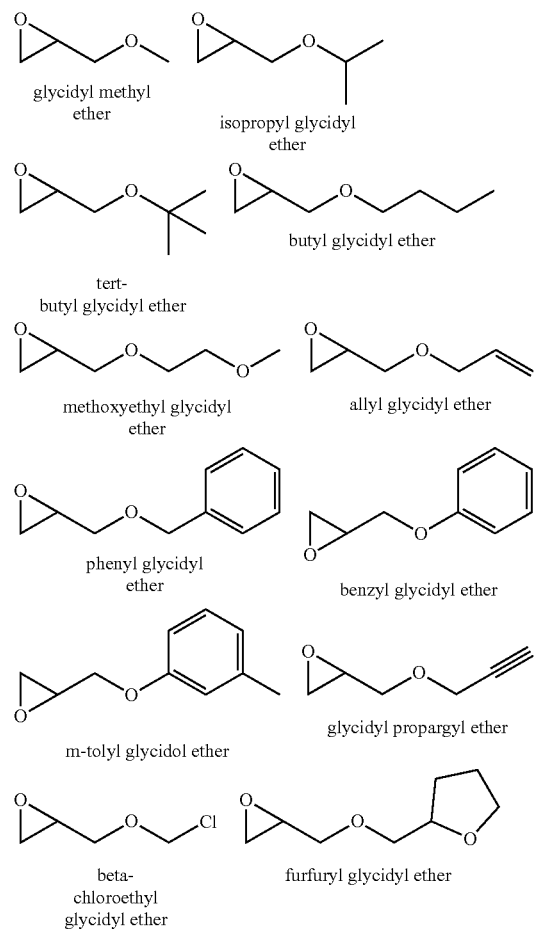

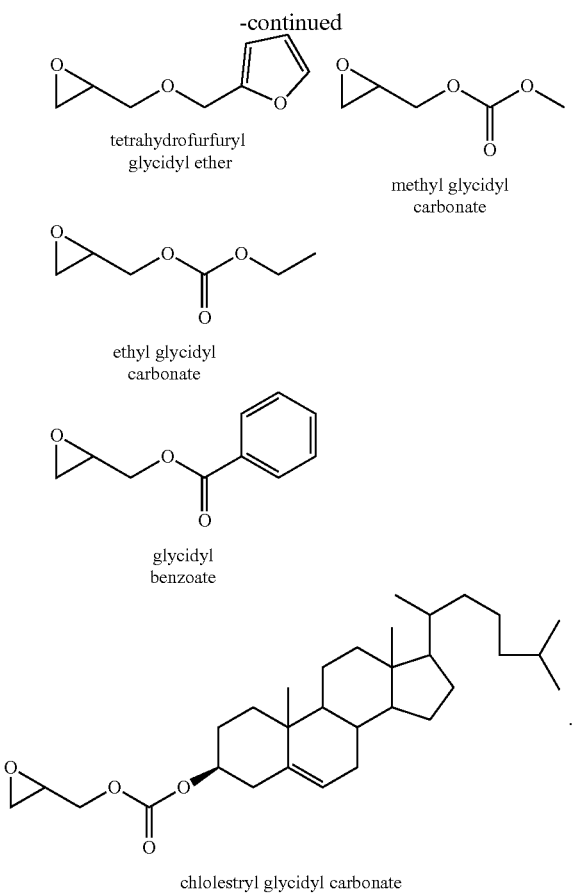

tetrahydrofurfuryl glycidyl ether methyl glycidyl carbonate ethyl glycidyl carbonate glycidyl benzoate chlolestryl glycidyl carbonate As noted above, the epoxide substrate may contain more than one epoxide moiety, i.e. it may be a bis-epoxide, a tris-epoxide, or a multi-epoxide containing moiety. Examples of compounds including more than one epoxide moiety include bisphenol A diglycidyl ether and 3,4-epoxy-cyclohexylmethyl 3,4-epoxycyclohexanecarboxylate. It will be understood that reactions carried out in the presence of one or more compounds having more than one epoxide moiety may lead to cross-linking in the resulting polymer.

The skilled person will appreciate that the epoxide can be obtained from "green" or renewable resources. The epoxide may be obtained from a (poly)unsaturated compound, such as those deriving from a fatty acid and/or terpene, obtained using standard oxidation chemistries.

The epoxide moiety may contain —OH moieties, or protected —OH moieties. The —OH moieties may be protected by any suitable protecting group. Suitable protecting groups include methyl or other alkyl groups, benzyl, allyl, tert-butyl, tetrahydropyranyl (THP), methoxymethyl (MOM), acetyl (C(O)alkyl), benzolyl (C(O)Ph), dimethoxytrityl (DMT), methoxyethoxymethyl (MEM), p-methoxybenzyl (PMB), trityl, silyl (such as trimethylsilyl (TMS), t-butyldimethylsilyl (TBDMS), t-butyldiphenylsilyl (TBDPS), tri-so-propylsilyloxymethyl (TOM), and triisopropylsilyl (TIPS)), (4-methoxyphenyl)diphenylmethyl (MMT), tetrahydrofuranyl (THF), and tetrahydropyranyl (THP).

The epoxide optionally has a purity of at least 98%, optionally >99%.

It will be understood that the term "an epoxide" is intended to encompass one or more epoxides. In other words, the term "an epoxide" refers to a single epoxide, or a mixture of two or more different epoxides. For example, the epoxide substrate may be a mixture of ethylene oxide and propylene oxide, a mixture of cyclohexene oxide and propylene oxide, a mixture of ethylene oxide and cyclohexene oxide, or a mixture of ethylene oxide, propylene oxide and cyclohexene oxide.

Polyether carbonate and polycarbonate ether is used herein interchangeably and both refer to a polymer having multiple ether and multiple carbonate linkages.

The term polyether carbonate polyol generally refers to polymers which are substantially terminated at each end with —OH, —SH, and/or —NHR' groups (encompassing C—OH, P—OH, —C(O)OH, etc. moieties). R' may be H, or optionally substituted alkyl, heteroalkyl, aryl, heteroaryl, cycloalkyl or heterocycloalkyl, optionally R' is H or optionally substituted alkyl.

By way of example, at least about 90%, at least about 95%, at least about 98% or at least about 99% of polymers may be terminated at each end with —OH groups. The skilled person will appreciate that if the polymer is linear, then it may be capped at both ends with —OH groups. If the polymer is branched, each of the branches may be capped with —OH groups. Such polymers are generally useful in preparing higher polymers such as polyurethanes. the chains may comprise a mixture of functional groups (e.g. —OH and —SH) groups, or may contain the same functional group (e.g. all-OH groups).

The term "continuous" used herein can be defined as the mode of addition of materials or may refer to the nature of the reaction method as a whole.

In terms of continuous mode of addition, the relevant materials are continually or constantly added during the course of a reaction. This may be achieved by, for example, adding a stream of material with either a constant flow rate or with a variable flow rate. In other words, the one or more materials are added in an essentially non-stop fashion. It is noted, however, that non-stop addition of the materials may need to be briefly interrupted for practical considerations, for example to refill or replace a container of the materials from which these materials are being added.

In terms of a whole reaction being continuous, the reaction may be conducted over a long period of time, such as a number of days, weeks, months, etc. In such a continuous reaction, reaction materials may be continually topped-up and/or products of the reaction may be tapped-off. It will be appreciated that although catalysts may not be consumed during a reaction, catalysts may in any case require topping-up, since tapping-off may deplete the amount of catalyst present.

A continuous reaction may employ continuous addition of materials.

The term "discontinuous" used herein means that the addition of the materials takes place in a portion-wise manner. This may be achieved by, for example, dropwise addition of the materials. Alternatively, the materials may be added in portions (i.e. batch fed) into the vessel, with timed intervals between additions. These timed intervals may be regular, or may change during the course of the reaction. Such timed intervals may be as little as a few minutes, or may be several hours. For example, the timed intervals may be between 1 minute and 12 hours; between 5 minutes and 6 hours; between 10 minutes and 4 hours; between 15 minutes and 3 hours; between 20 minutes and 2 hours; or between 30 minutes and 1 hour. If the materials are to be added in portions (i.e. batch fed), then there must be at least two discrete additions of the materials during the course of the reaction as a whole.

A continuous reaction may employ a discontinuous (i.e. batch-wise) addition of materials.

DETAILED DESCRIPTION

The present invention relates to continuous and discontinuous methods for preparing polycarbonate ether polyols, by reacting an epoxide and carbon dioxide in the presence of a catalyst of formula (I), a double metal cyanide (DMC) catalyst and a starter compound.

The present invention further relates to continuous and discontinuous methods for preparing high molecular weight polyether carbonates, by reacting an epoxide and carbon dioxide in the presence of a catalyst of formula (I), and a double metal cyanide (DMC) catalyst.

Accordingly, the present invention relates to a method for preparing a polycarbonate ether polyol, the method comprising the steps of:

(I) (a) mixing catalyst of formula (I), double metal cyanide (DMC) catalyst and optionally carbon dioxide and/or solvent with epoxide and optionally starter compound and/or carbon dioxide to form mixture (α); or
(b) mixing double metal cyanide (DMC) catalyst and optionally starter compound, carbon dioxide and/or solvent with epoxide and optionally carbon dioxide and/or solvent to form mixture (α); or
(c) mixing epoxide, catalyst of formula (I), starter compound and carbon dioxide and optionally solvent to form mixture (α); or
(d) mixing catalyst of formula (I), double metal cyanide (DMC) catalyst and optionally starter compound, epoxide, carbon dioxide and/or solvent to form mixture (α); and (II) adding one or more of starter compound, epoxide, carbon dioxide, catalyst of formula (I), double metal cyanide (DMC) catalyst and/or solvent to mixture (α) to form mixture (β) comprising starter compound, epoxide, carbon dioxide, catalyst of formula (I), double metal cyanide (DMC) catalyst and optionally solvent, wherein the catalyst of formula (I) has the following structure:

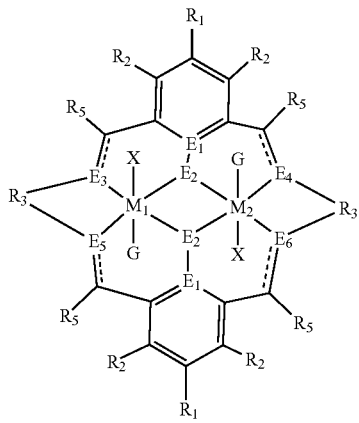

(I)

wherein $M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

$R_1$ and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

$R_5$ is independently selected from H, or optionally substituted aliphatic, heteroaliphatic, alicyclic, heteroalicyclic, aryl, heteroaryl, alkylheteroaryl or alkylaryl; $E_1$ is C, $E_2$ is O, S or NH or $E_1$ is N and $E_2$ is O;

$E_3$, $E_4$, $E_5$ and $E_6$ are selected from N, $NR_4$, O and S, wherein when $E_3$, $E_4$, $E_5$ or $E_6$ are N, ====== is ════, and wherein when $E_3$, $E_4$, $E_5$ or $E_6$ are $NR_4$, O or S, ====== is ────;

$R_4$ is independently selected from H, or optionally substituted aliphatic, heteroaliphatic, alicyclic, heteroalicyclic, aryl, heteroaryl, alkylheteroaryl, -alkylC(O)OR$_{19}$ or -alkylC≡N or alkylaryl;

X is independently selected from OC(O)R$_x$, OSO$_2$R$_x$, OSOR$_x$, OSO(R$_x$)$_2$, S(O)R$_x$, OR$_x$, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between M and $M_2$;

$R_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

The present invention relates to methods for preparing polycarbonate ether polyols and high molecular weight polyether carbonates. The method is conducted in two or more stages. In this way, part of the reaction is allowed to start and then more of one or more of the reaction materials are added (in either a continuous or discontinuous manner) as the reaction continues.

Adding certain components in the second step may be useful to increase activity of the catalysts and may lead to a more efficient process, compared with a process in which all of the materials are provided at the start of the reaction. Large amounts of some of the components present throughout the reaction may reduce efficiency of the catalysts. Adding material slowly to the reaction may prevent this reduced efficiency of the catalysts and/or may optimise catalyst activity.

Additionally, not loading the total amount of each component at the start of the reaction may lead to even catalysis, and more uniform polymer products. This in turn may lead to polymers having a narrower molecular weight distribution, desired ratio of ether to carbonate linkages, and/or an improved (i.e. a lower) polydispersity index.

Mixing only certain components in the first step and adding the remainder in the second step may also be useful for pre-activating catalysts. Such pre-activation may be achieved by mixing one or both catalysts with epoxide (and optionally other components), per step (I)(a) or (b) above. Pre-activation may be useful to prime one or both catalyst such that, upon addition of the remaining components in step (II), the efficiency of the reaction may increase.

It will be appreciated that the present invention relates to a reaction in which carbonate and ether linkages are added to a growing polymer chain. Mixing only certain components in the first step and adding the remainder in the second step may be useful for allowing part of the reaction to proceed before a second stage in the reaction. By way of example, mixing epoxide, catalyst of formula (I), starter compound and carbon dioxide and optionally solvent, per step (I)(c) above, may permit growth of a polymer having a high number of carbonate linkages. Thereafter, adding the remaining components (including the DMC catalyst) permits the reaction to proceed by adding ether linkages (as well as continuing to add carbonate linkages) to the growing polymer chain.

In general terms, an aim of the present invention is to control the polymerisation reaction through controlled addition of materials. The methods herein may allow the product prepared by such methods to be tailored to the necessary requirements.

Mixture ($\alpha$) formed by steps (I)(a) or (b) may be held at a temperature of between about 50 to 150° C. prior to step (II), optionally between about 80 to 130° C.

Mixture ($\alpha$) formed by steps (I)(c) or (d) may be held at a temperature of between about 0 to 120° C. prior to step (II), optionally between about 40 to 100° C., optionally between about 50 to 90° C.

Mixture ($\alpha$) may be held for at least about 1 minute prior to step (II), optionally at least about 5 minutes, optionally at least about 15 minutes, optionally at least about 30 minutes, optionally at least about 1 hour, optionally at least about 2 hours, optionally at least about 5 hours.

Mixture ($\alpha$) formed by steps (I)(c) may be held for at least about 1 minutes prior to step (II), optionally at least about 5 minutes, optionally at least about 15 minutes, optionally at least about 30 minutes, optionally at least about 1 hour, optionally at least about 2 hours, optionally at least about 3 hours, optionally at least about 4 hours, optionally at least about 8 hours, optionally at least about 16 hours.

Mixture ($\alpha$) may comprise less than about 1 wt. % water, optionally less than about 0.5 wt. % water, optionally less than about 0.1 wt. % water, optionally less than about 0.05 wt. % water, optionally about 0 wt. % water. The presence of water in the mixture may cause de-activation of the or each catalyst. Thus, minimising the water content in the mixture is desired.

Step (I)(a) may comprise firstly mixing catalyst of formula (I), double metal cyanide (DMC) catalyst and optionally carbon dioxide to form mixture ($\alpha'$), and subsequently adding epoxide and optionally starter compound and/or carbon dioxide to form mixture ($\alpha$). Conducting the method in this way may be useful for pre-activating one or both catalysts, as previously described.

Mixture ($\alpha'$) may be held at a temperature of between about 0 to 250° C. prior to said subsequently adding, optionally about 40 to 150° C., optionally about 50 to 150° C., optionally about 70 to 140° C., optionally about 80 to 130° C.

Subsequent to step (I)(c), step (II) may comprise mixing double metal cyanide (DMC) catalyst epoxide, and optionally starter compound, carbon dioxide and/or solvent to form a pre-activated mixture and adding the pre-activated mixture to mixture ($\alpha$) to form mixture ($\beta$).

The pre-activated mixture may be held at a temperature of between about 50 to 110° C. prior to adding, optionally between about 60 to 90° C.

The reaction method as a whole may be conducted on a batch-wise basis. In such instances, the method may employ a total amount of each of the relevant materials used in the reaction (such as the epoxide, starter compound, etc.), and a proportion of that total amount may be added in different steps in the reaction.

The method may employ a total amount of epoxide, and wherein about 1 to 95% of the total amount of epoxide may be mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of starter compound, and wherein about 1 to 95% of the total amount of starter compound may be mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of catalyst of formula (I), and wherein about 1 to 100% of the total amount of catalyst of formula (I) may be mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of double metal cyanide (DMC) catalyst, and wherein about 1 to 100% of the total amount of double metal cyanide (DMC) catalyst mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of carbon dioxide, and wherein about 1 to 100% of the total amount of carbon dioxide may be mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of solvent, and wherein about 1 to 100% of the total amount of solvent may be mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The total amount of the catalyst of formula (I) may be low, such that the methods of the invention may be carried out at low catalytic loading. For example, the catalytic loading of the catalyst of formula (I) may be in the range of about 1:100,000-300,000 [total catalyst of formula (I)]:[total epoxide], such as about 1:10,000-100,000 [total catalyst of formula (I)]:[total epoxide], e.g. in the region of about 1:10,000-50,000 [total catalyst of formula (I)]:[total epoxide], for example in the region of about 1:10,000 [total catalyst of formula (I)]:[total epoxide]. The ratios above are molar ratios. These ratios are the ratios of the total amount of catalyst of formula (I) to the total amount of epoxide used in the method.

The method may be continuous, wherein there is a predetermined molar ratio or weight ratio of epoxide to catalyst of formula (I) in mixture (β), and wherein the method further comprises:

(III) adding epoxide to mixture (β) to form mixture (y), said epoxide being added at an amount sufficient to bring the molar ratio or weight ratio of epoxide to catalyst of formula (I) in mixture (y) to at least about 75% of said predetermined molar ratio or weight ratio, optionally wherein step (III) is repeated.

The method may be continuous, wherein there is a predetermined molar ratio or weight ratio of starter compound to catalyst of formula (I) in mixture (β), and wherein the method further comprises:

(III) adding starter compound to mixture (β) to form mixture (y), said starter compound being added in an amount sufficient to bring the molar ratio or weight ratio of starter compound to catalyst of formula (I) in mixture (y) to at least about 75% of said predetermined molar ratio or weight ratio, optionally wherein step (III) is repeated.

The method may be continuous, wherein there is a predetermined molar ratio or weight ratio of carbon dioxide to catalyst of formula (I) in mixture (β), and wherein the method further comprises:

(III) adding carbon dioxide to mixture (β) to form mixture (y), said carbon dioxide being added in an amount sufficient to bring the molar ratio or weight ratio of carbon dioxide to catalyst of formula (I) in mixture (y) to at least about 75% of said predetermined molar ratio or weight ratio, optionally wherein step (III) is repeated.

Step (III) may be conducted such that the molar ratio or weight ratio of epoxide, starter compound, carbon dioxide and/or solvent to catalyst of formula (I) in the mixture (y) does not fall below about 75% of said predetermined molar or weight ratio.

Step (III) may be conducted such that the molar ratios or weight ratios of epoxide, starter compound, carbon dioxide and solvent to catalyst of formula (I) in mixture (y) do not fall below about 75% of said predetermined molar or weight ratios.

The method may be continuous, wherein there is a predetermined amount of catalyst of formula (I) in mixture (β), and wherein the method further comprises:

(III) adding catalyst of formula (I) to mixture (β) to form mixture (y), said catalyst of formula (I) being added in an amount sufficient to bring the amount of catalyst of formula (I) in mixture (y) to about 50 to 550% of said predetermined amount, optionally wherein step (II) is repeated.

Step (III) may be conducted such that the amount of catalyst of formula (I) in the mixture (y) does not fall below about 50% of said predetermined amount.

The method may be continuous, wherein there is a predetermined amount of double metal cyanide (DMC) catalyst in mixture (β), and wherein the method further comprises:

(III) adding double metal cyanide (DMC) catalyst to mixture (β) to form mixture (y), said double metal cyanide (DMC) catalyst being added in an amount sufficient to bring the amount of double metal cyanide (DMC) catalyst in mixture (y) to about 50 to 550% of said predetermined amount, optionally wherein step (III) is repeated.

Step (III) may be conducted such that the amount of double metal cyanide (DMC) catalyst in mixture (y) does not fall below about 50% of said predetermined amount.

The rate at which the materials are added may be selected such that the temperature of the (exothermic) reaction does not exceed a selected temperature (i.e. that the materials are added slowly enough to allow any excess heat to dissipate such that the temperature of the remains approximately constant).

In instances where addition of materials (i.e. per step Ill) are repeated, the addition may be repeated one, two, three, four, five, six, seven, eight, nine, ten or more times.

In mixture (α), the amount of said catalyst of formula (I) and the amount of said double metal cyanide (DMC) catalyst may be at a predetermined weight ratio of from about 300:1 to about 1:100 to one another, for example, from about 120:1 to about 1:75, such as from about 40:1 to about 1:50, e.g. from about 30:1 to about 1:30 such as from about 20:1 to about 1:1, for example from about 10:1 to about 2:1, e.g. from about 5:1 to about 1:5.

In step (I), said double metal cyanide (DMC) catalyst may be dry-mixed with the other components.

In step (I), said double metal cyanide (DMC) catalyst may be mixed as a slurry, said slurry comprising the double metal cyanide (DMC) catalyst and the starter compound and/or solvent.

In step (I), said catalyst of formula (I) may be dry-mixed with the other components.

In step (I), said catalyst of formula (I) may be mixed as a solution, said solution comprising the catalyst of formula (I) and one or more of the starter compound, epoxide and/or a solvent.

Epoxide may be added in step (II).

Catalyst of formula (I) may be added in step (II).

Double metal cyanide (DMC) catalyst may be added in step (II).

Starter compound may be added in step (II).

Both epoxide and starter compound may be added in step (II).

Epoxide, catalyst of formula (I), double metal cyanide (DMC) catalyst and/or starter compound may be, independently, continuously added in step (II).

Epoxide, catalyst of formula (I), double metal cyanide (DMC) catalyst and/or starter compound may be, independently, discontinuously added in step (II).

Carbon dioxide may be provided continuously.

The method may be carried out at a pressure of between about 1 bar and about 60 bar carbon dioxide, optionally about 1 bar and about 40 bar, optionally about 1 bar and about 20 bar, optionally between about 1 bar and about 15 bar, optionally about 1 bar and about 10 bar, optionally about 1 bar and about 5 bar.

The temperature of the reaction may increase during the course of the method.

The starter compound which may be used in the methods for forming polycarbonate ether polyols comprises at least two groups selected from a hydroxyl group (—OH), a thiol (—SH), an amine having at least one N—H bond (—NHR'), a group having at least one P—OH bond (e.g. —PR'(O)OH, PR'(O)(OH)$_2$ or —P(O)(OR')(OH)), or a carboxylic acid group (—C(O)OH).

Thus, the starter compound which may be used in the methods for forming polycarbonate ether polyols may be of the formula (III):

$$Z-(R^z)_a \qquad (III)$$

Z can be any group which can have 2 or more —R$^z$ groups attached to it. Thus, Z may be selected from optionally substituted alkylene, alkenylene, alkynylene, heteroalkylene, heteroalkenylene, heteroalkynylene, cycloalkylene, cycloalkenylene, hererocycloalkylene, heterocycloalkenylene, arylene, heteroarylene, or Z may be a combination of any of these groups, for example Z may be an alkylarylene, heteroalkylarylene, heteroalkylheteroarylene or alkylheteroarylene group. Optionally Z is alkylene, heteroalkylene, arylene, or heteroarylene.

It will be appreciated that a is an integer which is at least 2, optionally a is in the range of between 2 and 8, optionally a is in the range of between 2 and 6.

Each $R^z$ may be —OH, —NHR', —SH, —C(O)OH, —P(O)(OR')(OH), —PR'(O)(OH)$_2$ or —PR'(O)OH, optionally $R^z$ is selected from —OH, —NHR' or —C(O)OH, optionally each $R^z$ is —OH, —C(O)OH or a combination thereof (e.g. each $R^z$ is —OH).

R' may be H, or optionally substituted alkyl, heteroalkyl, aryl, heteroaryl, cycloalkyl or heterocycloalkyl, optionally R' is H or optionally substituted alkyl.

There may be two starter compounds in mixture (β), wherein the starter compound in step (I) is a first starter compound, and wherein step (II) comprises:
(A) adding one or more of first starter compound, epoxide, carbon dioxide, catalyst of formula (I), double metal cyanide (DMC) catalyst and/or solvent to mixture (α); and
(B) adding a second starter compound and optionally epoxide, carbon dioxide, catalyst of formula (I), double metal cyanide (DMC) catalyst and/or solvent to form mixture (β) comprising first starter compound, second starter compound, epoxide, carbon dioxide, catalyst of formula (I), double metal cyanide (DMC) catalyst and optionally solvent.

Step (B) may be conducted at least about 1 minutes after step (A), optionally at least about 5 minutes, optionally at least about 15 minutes, optionally at least about 30 minutes, optionally at least about 1 hour, optionally at least about 2 hours, optionally at least about 5 hours.

Said first starter compound may have a molecular weight of at least about 200 Da and said second starter compound has a molecular weight of at most about 200 Da.

Said second starter compound may be polypropylene glycol having a molecular weight of about 200 to 1000 Da, optionally about 300 to 700 Da, optionally about 400 Da.

The or each starter compound has two or more hydroxyl groups, optionally three or more, optionally four or more, optionally five or more, optionally six or more, optionally seven or more, optionally eight or more hydroxyl groups.

It will be appreciated that any of the above features may be combined. For example, a may be between 2 and 8, each R may be —OH, —C(O)OH or a combination thereof, and Z may be selected from alkylene, heteroalkylene, arylene, or heteroarylene.

Exemplary starter compounds include diols such as 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,4-cyclohexanediol, 1,2-diphenol, 1,3-diphenol, 1,4-diphenol, neopentyl glycol, catechol, cyclohexenediol, 1,4-cyclohexanedimethanol, dipropylene glycol, diethylene glycol, tripropylene glycol, triethylene glycol, tetraethylene glycol, polypropylene glycols (PPGs) or polyethylene glycols (PEGs) having an Mn of up to about 1500 g/mol, such as PPG 425, PPG 725, PPG 1000 and the like, triols such as glycerol, benzenetriol, 1,2,4-butanetriol, 1,2,6-hexanetriol, tris(methylalcohol)propane, tris(methylalcohol)ethane, tris(methylalcohol)nitropropane, trimethylol propane, polypropylene oxide triols and polyester triols, tetraols such as calix[4]arene, 2,2-bis(methylalcohol)-1,3-propanediol, erythritol, pentaerythritol or polyalkylene glycols (PEGs or PPGs) having 4-OH groups, polyols, such as sorbitol or polyalkylene glycols (PEGs or PPGs) having 5 or more —OH groups, or compounds having mixed functional groups including ethanolamine, diethanolamine, methyldiethanolamine, and phenyldiethanolamine.

For example, the starter compound may be a diol such as 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,12-dodecanediol, 1,4-cyclohexanediol, 1,2-diphenol, 1,3-diphenol, 1,4-diphenol, neopentyl glycol, catechol, cyclohexenediol, 1,4-cyclohexanedimethanol, poly(caprolactone) diol, dipropylene glycol, diethylene glycol, tripropylene glycol, triethylene glycol, tetraethylene glycol, polypropylene glycols (PPGs) or polyethylene glycols (PEGs) having an Mn of up to about 1500 g/mol, such as PPG 425, PPG 725, PPG 1000 and the like. It will be appreciated that the starter compound may be 1,6-hexanediol, 1,4-cyclohexanedimethanol, 1,12-dodecanediol, poly(caprolactone) diol, PPG 425, PPG 725, or PPG 1000.

Further exemplary starter compounds may include diacids such as oxalic acid, malonic acid, succinic acid, glutaric acid, adipic acid, pimelic acid, suberic acid, azelaic acid, sebacic acid, undecanedioic acid, dodecanedioic acid or other compounds having mixed functional groups such as lactic acid, glycolic acid, 3-hydroxypropanoic acid, 4-hydroxybutanoic acid, 5-hydroxypentanoic acid.

The ratio of the starter compound, if present, to the catalyst of formula (I) may be in amounts of from about 1000:1 to about 1:1, for example, from about 750:1 to about 5:1, such as from about 500:1 to about 10:1, e.g. from about 250:1 to about 20:1, or from about 125:1 to about 30:1, or from about 50:1 to about 20:1. These ratios are molar ratios. These ratios are the ratios of the total amount of starter to the total amount of the catalyst of formula (I) used in the method. These ratios may be maintained during the course of addition of materials.

The starter may be pre-dried (for example with molecular sieves) to remove moisture. It will be understood that any of the above reaction conditions described may be combined. For example, the reaction may be carried out at 60 bar or less, such as about 30 bar or less, optionally 20 bar or less (e.g. 10 bar or less) and at a temperature in the range of from about 5° C. to about 200° C., e.g. from about 10° C. to about 150° C., such as from about 15° C. to about 100° C., for example, from about 20° C. to about 90° C. The method of the invention may be carried out at from about 45° C. to about 90° C.

The methods of the invention are capable of preparing polycarbonate ether polyols, which can be used, for example, to prepare polyurethanes. In particular, the continuous and discontinuous methods of the present invention may provide polycarbonate ether polyols having a low polydispersity index (PDI).

The methods of the invention are capable of producing polycarbonate ether polyols in which the amount of ether and carbonate linkages can be controlled. Thus, the invention may provide a polycarbonate ether polyol which has n ether linkages and m carbonate linkages, wherein n and m are integers, and wherein m/(n+m) is from greater than zero to less than 1.

It will therefore be appreciated that n≥1 and m≥1.

For example, the methods of the invention are capable of preparing polycarbonate ether polyols having a wide range of m/(n+m) values. It will be understood that m/(n+m) may be about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, m/(n+m) may be from about 0.05 to about 0.95, from about 0.10 to about 0.90, from about 0.15 to about 0.85, from about 0.20 to about 0.80, or from about 0.25 to about 0.75, etc.

As set out above, the methods of the invention are capable of preparing polycarbonate ether polyols where m/(n+m) is from about 0.7 to about 0.95, e.g. from about 0.75 to about 0.95.

Thus, the methods of the invention make it possible to prepare polycarbonate ether polyols having a high proportion of carbonate linkages, e.g. m/(n+m) may be greater than about 0.50, such as from greater than about 0.55 to less than about 0.95, e.g. about 0.65 to about 0.90, e.g. about 0.75 to about 0.90.

For example, the polycarbonate ether polyols produced by the methods of the invention may have the following formula (IV):

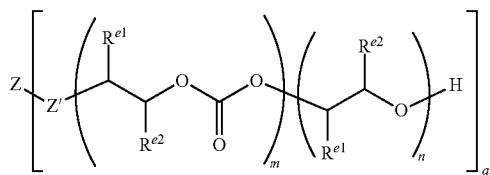

It will be appreciated that the identity of Z and Z' will depend on the nature of the starter compound, and that the identity of $R^{e1}$ and $R^{e2}$ will depend on the nature of the epoxide used to prepare the polycarbonate ether polyol. m and n define the amount of the carbonate and ether linkages in the polycarbonate ether polyol.

The skilled person will understand that in the polymers of formula (IV), the adjacent epoxide monomer units in the backbone may be head-to-tail linkages, head-to-head linkages or tail-to-tail linkages.

It will also be appreciated that formula (IV) does not require the carbonate links and the ether links to be present in two distinct "blocks" in each of the sections defined by "a", but instead the carbonate and ether repeating units may be statistically distributed along the polymer backbone, or may be arranged so that the carbonate and ether linkages are not in two distinct blocks.

Thus, the polycarbonate ether polyol prepared by the methods of the invention (e.g. a polymer of formula (IV)) may be referred to as a random copolymer, a statistical copolymer, an alternating copolymer, or a periodic copolymer.

The skilled person will appreciate that the wt % of carbon dioxide incorporated into a polymer cannot be definitively used to determine the amount of carbonate linkages in the polymer backbone. For example, two polymers which incorporate the same wt % of carbon dioxide may have very different ratios of carbonate to ether linkages. This is because the "wt % incorporation" of carbon dioxide does not take into account the length and nature of the starter compound. For instance, if one polymer (Mn 2000 g/mol) is prepared using a starter with a molar mass of 100 g/mol, and another polymer (Mn also 2000 g/mol) is prepared using a starter having a molar mass of 500 g/mol, and both the resultant polymers have the same ratio of m/n then the wt % of carbon dioxide in the polymers will be different due to the differing proportion of the mass of the starter in the overall polymer molecular weight (Mn). For example, if m/(m+n) was 0.5, the two polyols described would have carbon dioxide contents of 26.1 wt % and 20.6 wt % respectively.

As highlighted above, the methods of the invention are capable of preparing polyols which have a wide range of carbonate to ether linkages (e.g. m/(n+m) can be from greater than zero to less than 1), which, when using propylene oxide, corresponds to incorporation of up to about 43 wt % carbon dioxide. This is surprising, as DMC catalysts which have previously reported can generally only prepare polyols having a ratio of carbonate to ether linkages of up to 0.75, and these amounts can usually only be achieved at high pressures of carbon dioxide, such as 30 bar, more commonly 40 bar or above.

Furthermore, catalysts which are used to prepare polycarbonate polyols can typically achieve a ratio of carbonate to ether linkages of about 0.95 or above (usually about 0.98 or above), and thus also incorporate a high wt % of carbon dioxide. However, these catalysts are not capable of preparing polyols having a ratio of carbonate to ether linkages below 0.95. The carbon dioxide wt % can be moderated by changing the mass of the starter: the resultant polyols contain blocks of polycarbonate. For many applications this is not desirable, as polycarbonates produced from epoxides and carbon dioxide are less thermally stable than polyethers and block copolymers can have very different properties from random or statistical copolymers.

All other things being equal, polyethers have higher temperatures of degradation than polycarbonates produced from epoxides and carbon dioxide. Therefore, a polyol having a statistical or random distribution of ether and carbonate linkages will have a higher temperature of degradation than a polycarbonate polyol, or a polyol having blocks of carbonate linkages. Temperature of thermal degradation can be measured using thermal gravimetric analysis (TGA).

As set out above, the methods of the invention prepare random copolymers, statistical copolymers, alternating copolymers, or periodic copolymers. Thus, the carbonate linkages are not in a single block, thereby providing a polymer which has improved properties, such as improved thermal degradation, as compared to a polycarbonate polyol. The polymer prepared by the methods of the invention may be a random copolymer or a statistical copolymer.

The polycarbonate ether polyol prepared by the methods of the invention may be of formula (IV), in which n and m are integers of 1 or more, the sum of all m and n groups is from 4 to 200, and wherein m/(m+n) is in the range of from greater than zero to less than 1.00. As set out above, m/(n+m) may be from about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, m/(n+m) may be from about 0.05 to about 0.95, from about 0.10 to about 0.90, from about 0.15 to about 0.85, from about 0.20 to about 0.80, or from about 0.25 to about 0.75, etc.

The skilled person will also appreciate that the polyol must contain at least one carbonate and at least one ether linkage. Therefore, it will be understood that the number of ether and carbonate linkages (n+m) in the polyol will be ≥a. The sum of n+m must be greater than or equal to "a".

Each $R^{e1}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. $R^{e1}$ may be selected from H or optionally substituted alkyl.

Each $R^{e2}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. $R^{e2}$ may be selected from H or optionally substituted alkyl.

It will also be appreciated that $R^{e1}$ and $R^{e2}$ may together form a saturated, partially unsaturated or unsaturated ring containing carbon and hydrogen atoms, and optionally one or more heteroatoms (e.g. O, N or S). For example, $R^{e1}$ and $R^{e2}$ may together form a 5 or six membered ring.

As set out above, the nature of $R^{e1}$ and $R^{e2}$ will depend on the epoxide used in the reaction.

If the epoxide is cyclohexene oxide (CHO), then $R^{e1}$ and $R^{e2}$ will together form a six-membered alkyl ring (e.g. a cyclohexyl ring). If the epoxide is ethylene oxide, then $R^{e1}$ and $R^{e2}$ will both be H. If the epoxide is propylene oxide, then $R^{e1}$ will be H and $R^{e2}$ will be methyl (or $R^{e1}$ will be methyl and $R^{e2}$ will be H, depending on how the epoxide is added into the polymer backbone). If the epoxide is butylene oxide, then $R^{e1}$ will be H and $R^{e2}$ will be ethyl (or vice versa). If the epoxide is styrene oxide, then $R^{e1}$ may be hydrogen, and $R^{e2}$ may be phenyl (or vice versa).

It will also be appreciated that if a mixture of epoxides is used, then each occurrence of $R^{e1}$ and/or $R^{e2}$ may not be the same, for example if a mixture of ethylene oxide and propylene oxide are used, $R^{e1}$ may be independently hydrogen or methyl, and $R^{e2}$ may be independently hydrogen or methyl.

Thus, $R^{e1}$ and $R^{e2}$ may be independently selected from hydrogen, alkyl or aryl, or $R^{e1}$ and $R^{e2}$ may together form a cyclohexyl ring, $R^{e1}$ and $R^{e2}$ may be independently selected from hydrogen, methyl, ethyl or phenyl, or $R^{e1}$ and $R^{e2}$ may together form a cyclohexyl ring.

Z' corresponds to $R^z$, except that a bond replaces the labile hydrogen atom. Therefore, the identity of each Z' depends on the definition of $R^z$ in the starter compound. Thus, it will be appreciated that each Z' may be —O—, —NR'—, —S—, —C(O)O—, —P(O)(OR')O—, —PR'(O)(O—)$_2$ or —PR'(O)O— (wherein R' may be H, or optionally substituted alkyl, heteroalkyl, aryl, heteroaryl, cycloalkyl or heterocycloalkyl, optionally R' is H or optionally substituted alkyl), optionally Z' may be —C(O)O—, —NR'— or —O—, each Z' may be —O—, —C(O)O— or a combination thereof, optionally each Z' may be —O—.

Z also depends on the nature of the starter compound. Thus, Z may be selected from optionally substituted alkylene, alkenylene, alkynylene, heteroalkylene, heteroalkenylene, heteroalkynylene, cycloalkylene, cycloalkenylene, hererocycloalkylene, heterocycloalkenylene, arylene, heteroarylene, or Z may be a combination of any of these groups, for example Z may be an alkylarylene, heteroalkylarylene, heteroalkylheteroarylene or alkylheteroarylene group. Optionally Z is alkylene, heteroalkylene, arylene, or heteroarylene, e.g. alkylene or heteroalkylene. It will be appreciated that each of the above groups may be optionally substituted, e.g. by alkyl.

The variable a will also depend on the nature of the starter compound. The skilled person will appreciate that the value of a in formula (IV) will be the same as a in formula (III). Therefore, for formula (IV), a is an integer of at least 2, optionally a is in the range of between 2 and 8, optionally a is in the range of between 2 and 6.

The skilled person will also appreciate that the value of a influences the shape of the polyol prepared by the method of the invention. For example, when a is 2, the polyol of formula (IV) may have the following structure:

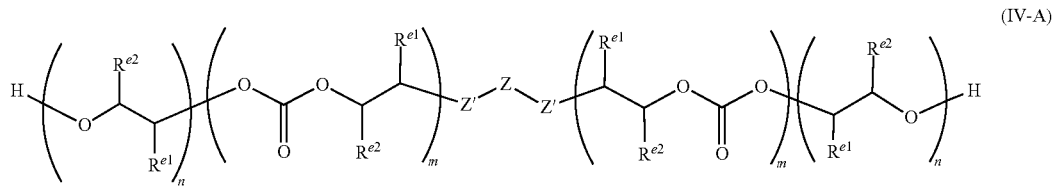

(IV-A)

where Z, Z', m, n, $R^{e1}$ and $R^{e2}$ are as described above for formula (IV).

For example, when a is 3, the polyol of formula (IV) may have the following formula:

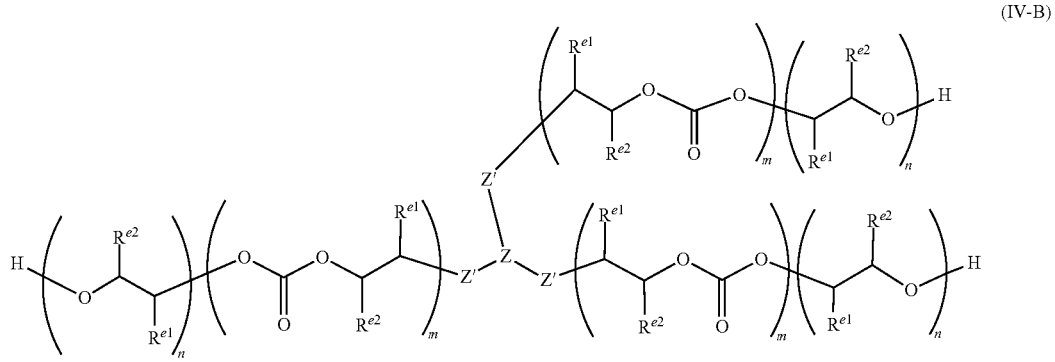

(IV-B)

where Z, Z', m, n, $R^{e1}$ and $R^{e2}$ are as described above for formula (IV).

The skilled person will understand that each of the above features may be combined. For example, $R^{e1}$ and $R^{e2}$ may be independently selected from hydrogen, alkyl or aryl, or $R^{e1}$ and $R^{e2}$ may together form a cyclohexyl ring, each Z' may be —O—, —C(O)O— or a combination thereof (optionally each Z' may be —O—), and Z may be optionally substituted alkylene, heteroalkylene, arylene, or heteroarylene, e.g. alkylene or heteroalkylene, and a may be between 2 and 8.

The polyols produced by the methods of the invention are optionally low molecular weight polyols. It will be appreciated that the nature of the epoxide used to prepare the polycarbonate ether polyol will have an impact on the resulting molecular weight of the product. Thus, the upper limit of n+m is used herein to define "low molecular weight" polymers of the invention.

The methods of the invention can advantageously prepare a polycarbonate ether polyol having a narrow molecular weight distribution. In other words, the polycarbonate ether polyol may have a low polydispersity index (PDI). The PDI of a polymer is determined by dividing the weight average molecular weight ($M_w$) by the number average molecular weight ($M_n$) of a polymer, thereby indicating the distribution of the chain lengths in the polymer product. It will be appreciated that PDI becomes more important as the molecular weight of the polymer decreases, as the percent variation in the polymer chain lengths will be greater for a short chain polymer as compared to a long chain polymer, even if both polymers have the same PDI.

Optionally the polymers produced by the methods of the invention have a PDI of from about 1 to less than about 2, optionally from about 1 to less than about 1.75, such as from about 1 to less than about 1.5, from about 1 to less than about 1.3, from about 1 to less than about 1.2, and from about 1 to less than about 1.1.

The $M_n$ and $M_w$, and hence the PDI of the polymers produced by the methods of the invention may be measured using Gel Permeation Chromatography (GPC). For example, the GPC may be measured using an Agilent 1260 Infinity GPC machine with two Agilent PLgel μ-m mixed-E columns in series. The samples may be measured at room temperature (293K) in THF with a flow rate of 1 mL/min against narrow polystyrene standards (e.g. polystyrene low EasiVials supplied by Agilent Technologies with a range of Mn from 405 to 49,450 g/mol). Optionally, the samples may be measured against poly(ethylene glycol) standards, such as polyethylene glycol easivials supplied by Agilent Technologies.

Optionally, the polyether carbonate polyols produced by the methods of the invention may have a molecular weight in the range of from about 500 to about 6,000 Da, optionally from about 700 to about 5,000 Da or from about 500 to about 3,000 Da.

The present invention also relates to a method for preparing a high molecular weight polyether carbonate, the method comprising the steps of:

(I) (a) mixing catalyst of formula (I), double metal cyanide (DMC) catalyst and optionally carbon dioxide and/or solvent with epoxide and optionally carbon dioxide to form mixture (α); or (b) mixing double metal cyanide (DMC) catalyst and optionally carbon dioxide and/or solvent with epoxide and optionally carbon dioxide and/or solvent to form mixture (α); or (c) mixing epoxide, catalyst of formula (I) and carbon dioxide and optionally solvent to form mixture (α); or (d) mixing catalyst of formula (I), double metal cyanide (DMC) catalyst and optionally epoxide, carbon dioxide and/or solvent to form mixture (α); and (II) adding one or more of epoxide, carbon dioxide, catalyst of formula (I), double metal cyanide (DMC) catalyst and/or solvent to mixture (α) to form mixture (p) comprising epoxide, carbon dioxide, catalyst of formula (I), double metal cyanide (DMC) catalyst and optionally solvent, wherein the catalyst of formula (I) has the following structure:

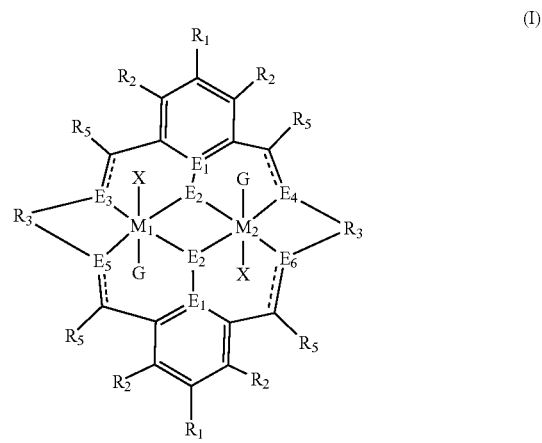

(I)

wherein $M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

$R_1$ and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

$R_5$ is independently selected from H, or optionally substituted aliphatic, heteroaliphatic, alicyclic, heteroalicyclic, aryl, heteroaryl, alkylheteroaryl or alkylaryl; $E_1$ is C, $E_2$ is O, S or NH or $E_1$ is N and $E_2$ is O;

$E_3$, $E_4$, $E_5$ and $E_6$ are selected from N, NR$_4$, O and S, wherein when $E_3$, $E_4$, $E_5$ or $E_6$ are N, ------ is ══════, and wherein when $E_3$, $E_4$, $E_5$ or $E_6$ are NR$_4$, O or S, ------ is ———;

$R_4$ is independently selected from H, or optionally substituted aliphatic, heteroaliphatic, alicyclic, heteroalicyclic, aryl, heteroaryl, alkylheteroaryl, -alkylC(O)OR$_{19}$ or -alkylC≡N or alkylaryl;

X is independently selected from OC(O)R$_x$, OSO$_2$R$_x$, OSOR$_x$, OSO(R$_x$)$_2$, S(O)R$_x$, OR$_x$, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between $M_1$ and $M_2$;

$R_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

Advantages set out above with respect to the method for preparing a polycarbonate ether polyol, such as to control the polymerisation reaction through controlled addition of materials, apply equally to the method for preparing high molecular weight polyether carbonates.

It will be appreciated that the method of the invention can advantageously prepare a high high molecular weight polyether carbonate having a large molecular weight distribution. In other words, the polyether carbonate may have a relatively high polydispersity index (PDI).

Mixture ($\alpha$) formed by steps (I)(a) or (b) may be held at a temperature of between about 50 to 110° C. prior to step (II), optionally between about 60 to 90° C.

Mixture ($\alpha$) formed by steps (I)(c) or (d) may be held at a temperature of between about 0 to 120° C. prior to step (II), optionally between about 40 to 100° C. optionally between about 50 to 90° C.

Mixture ($\alpha$) may be held for at least about 1 minute prior to step (II), optionally at least about 5 minutes, optionally at least about 15 minutes, optionally at least about 30 minutes, optionally at least about 1 hour, optionally at least about 2 hours, optionally at least about 5 hours.

Mixture ($\alpha$) formed by steps (I)(c) may be held for at least about 5 minutes prior to step (II), optionally at least about 15 minutes, optionally at least about 30 minutes, optionally at least about 1 hour, optionally at least about 2 hours, optionally at least about 3 hours, optionally at least about 4 hours, optionally at least about 8 hours, optionally at least about 16 hours.

Mixture ($\alpha$) may comprise less than about 1 wt. % water, optionally less than about 0.5 wt. % water, optionally less than about 0.1 wt. % water, optionally less than about 0.05 wt. % water, optionally about 0 wt. % water. The presence of water in the mixture may cause de-activation of the or each catalyst. Thus, minimising the water content in the mixture is desired.

Step (I) (a) may comprise firstly mixing catalyst of formula (I), double metal cyanide (DMC) catalyst and optionally carbon dioxide to form mixture ($\alpha$'), and subsequently adding epoxide and optionally carbon dioxide to form mixture ($\alpha$). Conducting the method in this way may be useful for pre-activating one or both catalysts, as previously described.

Mixture ($\alpha$') may be held at a temperature of between about 0 to 250° C. prior to said subsequently adding, optionally about 40 to 150° C., optionally about 50 to 150° C., optionally about 70 to 140° C., optionally about 80 to 130° C.

Subsequent to step (I) (c), step (II) may comprise mixing double metal cyanide (DMC) catalyst epoxide, and optionally carbon dioxide and/or solvent to form a pre-activated mixture and adding the pre-activated mixture to mixture ($\alpha$) to form mixture ($\beta$).

The pre-activated mixture may be held at a temperature of between about 50 to 110° C. prior to adding, optionally between about 60 to 90° C.

The reaction method as a whole may be conducted on a batch-wise basis. In such instances, the method may employ a total amount of each of the relevant materials used in the reaction (such as the epoxide, starter compound, etc.), and a proportion of that total amount may be added in different steps in the reaction.

The method may employ a total amount of epoxide, wherein about 1 to 95% of the total amount of epoxide is mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of catalyst of formula (I), wherein about 1 to 100% of the total amount of catalyst of formula (I) is mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of double metal cyanide (DMC) catalyst, wherein about 1 to 100% of the total amount of double metal cyanide (DMC) catalyst mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of carbon dioxide, wherein about 1 to 100% of the total amount of carbon dioxide is mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The method may employ a total amount of solvent, and wherein about 1 to 100% of the total amount of solvent is mixed in step (I), with the remainder added in step (II); optionally about 1 to 75% being mixed in step (I), optionally about 1 to 50%, optionally about 1 to 40%, optionally about 1 to 30%, optionally about 1 to 20%, optionally about 5 to 20%.

The total amount of the catalyst of formula (I) may be low, such that the methods of the invention may be carried out at low catalytic loading. For example, the catalytic loading of the catalyst of formula (I) may be in the range of about 1:100,000-300,000 [total catalyst of formula (I)]:[total epoxide], such as about 1:10,000-100,000 [total catalyst of formula (I)]:[total epoxide], e.g. in the region of about 1:10,000-50,000 [total catalyst of formula (I)]:[total epoxide], for example in the region of about 1:10,000 [total catalyst of formula (I)]:[total epoxide]. The ratios above are molar ratios. These ratios are the ratios of the total amount of catalyst of formula (I) to the total amount of epoxide used in the method.

The method may be continuous, wherein there is a predetermined molar ratio or weight ratio of epoxide to catalyst of formula (I) in mixture ($\beta$), and wherein the method further comprises:

(III) adding epoxide to mixture ($\beta$) to form mixture ($\gamma$), said epoxide being added at an amount sufficient to bring the molar ratio or weight ratio of epoxide to catalyst of formula (I) in mixture ($\gamma$) to at least about 75% of said predetermined molar ratio, optionally wherein step (III) is repeated.

The method may be continuous, wherein there is a predetermined molar ratio or weight ratio of carbon dioxide to catalyst of formula (I) in mixture ($\beta$), and wherein the method further comprises:

(III) adding carbon dioxide to mixture ($\beta$) to form mixture ($\gamma$), said carbon dioxide being added in an amount sufficient to bring the molar ratio or weight ratio of carbon dioxide to catalyst of formula (I) in mixture (γ) to at least about 75% of said predetermined molar ratio, optionally wherein step (III) is repeated.

The method may be continuous, wherein there is a predetermined molar ratio or weight ratio of solvent to catalyst of formula (I) in mixture (β), and wherein the method further comprises:

(III) adding solvent to mixture (β) to form mixture (γ), said solvent being added in an amount sufficient to bring the molar ratio or weight ratio of solvent to catalyst of formula (I) in mixture (γ) to at least about 75% of said predetermined molar ratio, optionally wherein step (III) is repeated.

Step (III) may be conducted such that the molar ratio or weight ratio of epoxide, carbon dioxide and/or solvent to catalyst of formula (I) in mixture (γ) does not fall below about 75% of said predetermined molar ratio or weight ratio.

Step (III) may be conducted such that the molar ratios or weight ratios of epoxide, carbon dioxide and solvent to catalyst of formula (I) in mixture (γ) do not fall below about 75% of said predetermined molar ratios or weight ratios.

The method may be continuous, wherein there is a predetermined amount of catalyst of formula (I) in mixture (β), and wherein the method further comprises:

(III) adding catalyst of formula (I) to mixture (β) to form mixture (γ), said catalyst of formula (I) being added in an amount sufficient to bring the amount of catalyst of formula (I) in mixture (γ) to about 50 to 550% of said predetermined amount, optionally wherein step (II) is repeated.

Step (III) may be conducted such that the amount of catalyst of formula (I) in the mixture (γ) does not fall below about 50% of said predetermined amount.

The method may be continuous, wherein there is a predetermined amount of double metal cyanide (DMC) catalyst in mixture (β), and wherein the method further comprises:

(III) adding double metal cyanide (DMC) catalyst to mixture (β) to form mixture (γ), said double metal cyanide (DMC) catalyst being added in an amount sufficient to bring the amount of double metal cyanide (DMC) catalyst in mixture (γ) to about 50 to 550% of said predetermined amount, optionally wherein step (III) is repeated.

Step (III) may be conducted such that the amount of double metal cyanide (DMC) catalyst in mixture (γ) does not fall below about 50% of said predetermined amount.

The rate at which the materials are added may be selected such that the temperature of the (exothermic) reaction does not exceed a selected temperature (i.e. that the materials are added slowly enough to allow any excess heat to dissipate such that the temperature of the remains approximately constant).

In instances where addition of materials (i.e. per step III) are repeated, the addition may be repeated one, two, three, four, five, six, seven, eight, nine, ten or more times.

In mixture (α), the amount of said catalyst of formula (I) and the amount of said double metal cyanide (DMC) catalyst may be at a predetermined weight ratio of from about 300:1 to about 1:100 to one another, for example, from about 120:1 to about 1:75, such as from about 40:1 to about 1:50, e.g. from about 30:1 to about 1:30 such as from about 20:1 to about 1:1, for example from about 10:1 to about 2:1, e.g. from about 5:1 to about 1:5.

In step (I), said double metal cyanide (DMC) catalyst may be dry-mixed with the other components.

In step (I), said double metal cyanide (DMC) catalyst may be mixed as a slurry, said slurry comprising the double metal cyanide (DMC) catalyst and solvent.

In step (I), said catalyst of formula (I) may be dry-mixed with the other components.

In step (I), said catalyst of formula (I) may be mixed as a solution, said solution comprising the catalyst of formula (I) and one or more of the epoxide and/or a solvent.

Epoxide may be added in step (II).

Catalyst of formula (I) may be added in step (II).

Double metal cyanide (DMC) catalyst may be added in step (II).

Epoxide, catalyst of formula (I) and/or double metal cyanide (DMC) catalyst may be, independently, continuously added in step (II).

Epoxide, catalyst of formula (I) and/or double metal cyanide (DMC) catalyst may be, independently, discontinuously added in step (II).

Carbon dioxide may be provided continuously.

The method may be carried out at a pressure of between about 1 bar and about 60 bar carbon dioxide, optionally about 1 bar and about 40 bar, optionally about 1 bar and about 20 bar, optionally between about 1 bar and about 15 bar, optionally about 1 bar and about 10 bar, optionally about 1 bar and about 5 bar.

The temperature of the reaction may increase during the course of the method.

The method of the invention is capable of preparing polyether carbonates. The method of the invention is capable of producing polyether carbonates in which the amount of ether and carbonate linkages can be controlled. Thus, the invention provides a polyether carbonate which has n ether linkages and m carbonate linkages, wherein n and m are integers, and wherein $m/(n+m)$ is from greater than zero to less than 1.

For example, the method of the invention is capable of preparing polyether carbonates having a wide range of $m/(n+m)$ values. It will be understood that $m/(n+m)$ may be about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, $m/(n+m)$ may be from about 0.05 to about 0.95, from about 0.10 to about 0.90, from about 0.15 to about 0.85, from about 0.20 to about 0.80, or from about 0.25 to about 0.75, etc.

Thus, the method of the invention makes it possible to prepare polyether carbonates having a high proportion of carbonate linkages, e.g. $m/(n+m)$ may be greater than about 0.50, such as from greater than about 0.55 to less than about 0.95, e.g. about 0.65 to about 0.90, e.g. about 0.75 to about 0.90. The method of the invention is able to prepare polymers having a high ratio of $m/(n+m)$ under mild conditions, for example, under pressures of about 20 bar or below, such as 10 bar or below.

For example, the polyether carbonates produced by the method of the invention may have the following formula (IV):

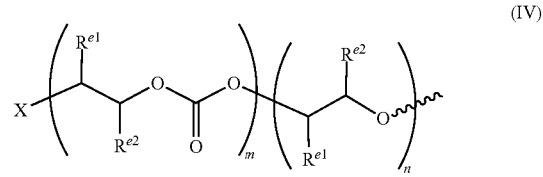

(IV)

It will be appreciated that the identity of X will depend on the nature of X in the compound of formula (I), and that the identity of $R^{e1}$ and $R^{e2}$ will depend on the nature of the epoxide used to prepare the polyether carbonate. "m" and "n" define the amount of the carbonate and ether linkages in the polyether carbonate. It will be appreciated that n≤1 and m≤1.

It will be understood that X may not be a group containing —OH.

The skilled person will understand that in the polymers of formula (IV), the adjacent epoxide monomer units in the backbone may be head-to-tail linkages, head-to-head linkages or tail-to-tail linkages.

It will also be appreciated that formula (IV) does not require the carbonate links and the ether links to be present in two distinct "blocks" in each of the sections defined by "m" and "n", but instead the carbonate and ether repeating units may be statistically distributed along the polymer backbone, or may be arranged so that the carbonate and ether linkages are not in two distinct blocks.

Thus, the polyether carbonate prepared by the method of the invention (e.g. a polymer of formula (IV)) may be referred to as a random copolymer, a statistical copolymer, an alternating copolymer, or a periodic copolymer.

The skilled person will appreciate that the wt % of carbon dioxide incorporated into a polymer will be directly proportional to the number of carbonate linkages in the polymer backbone.

All other things being equal, polyethers have higher temperatures of degradation than polycarbonates produced from epoxides and carbon dioxide. Therefore, a polyether carbonate having a statistical or random distribution of ether and carbonate linkages will have a higher temperature of degradation than a polycarbonate, or a polyether carbonate having blocks of carbonate linkages. Temperature of thermal degradation can be measured using thermal gravimetric analysis (TGA).

As set out above, the method of the invention prepares a random copolymer, a statistical copolymer, an alternating copolymer, or a periodic copolymer. Thus, the carbonate linkages are not in a single block, thereby providing a polymer which has improved properties, such as improved thermal degradation, as compared to a polycarbonate. Optionally, the polyether carbonate prepared by the method of the invention is a random copolymer or a statistical copolymer.

The polyether carbonate prepared by the method of the invention may be of formula (IV), in which n and m are integers of 1 or more, the sum of all m and n groups is from 4 to 200, and wherein m/(m+n) is in the range of from greater than zero to less than 1.00. As set out above, m/(n+m) may be from about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, m/(n+m) may be from about 0.05 to about 0.95, from about 0.10 to about 0.90, from about 0.15 to about 0.85, from about 0.20 to about 0.80, or from about 0.25 to about 0.75, etc.

The skilled person will also appreciate that the polyether carbonate must contain at least one carbonate and at least one ether linkage e.g. n 1 and m 1. Therefore, it will be understood that the number of ether and carbonate linkages (n+m) in the polyether carbonate will define the molecular weight of the polymer. For example, optionally n≥5 and m≥5, or n≥10 and m≥10, or n≥20 and m≥20, or n≥50 and m≥50.

Optionally, m+n≥10, or m+n≥20, or m+n≥100, or m+n≥200, or m+n≥500, or m+n≥1,000.

Each $R^{e1}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. Optionally $R^{e1}$ may be selected from H or optionally substituted alkyl.

Each $R^{e2}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. Optionally $R^{e2}$ may be selected from H or optionally substituted alkyl.

It will also be appreciated that $R^{e1}$ and $R^{e2}$ may together form a saturated, partially unsaturated or unsaturated ring containing carbon and hydrogen atoms, and optionally one or more heteroatoms (e.g. O, N or S). For example, $R^{e1}$ and $R^{e2}$ may together form a 5 or six membered ring.

As set out above, the nature of $R^{e1}$ and $R^{e2}$ will depend on the epoxide used in the reaction. If the epoxide is cyclohexene oxide (CHO), then $R^{e1}$ and $R^{e2}$ will together form a six-membered alkyl ring (e.g. a cyclohexyl ring). If the epoxide is ethylene oxide, then $R^{e1}$ and $R^{e2}$ will both be H. If the epoxide is propylene oxide, then $R^{e1}$ will be H and $R^{e2}$ will be methyl (or $R^{e1}$ will be methyl and $R^{e2}$ will be H, depending on how the epoxide is added into the polymer backbone). If the epoxide is butylene oxide, then $R^{e1}$ will be H and $R^{e2}$ will be ethyl (or vice versa). If the epoxide is styrene oxide, then $R^{e1}$ may be hydrogen, and $R^{e2}$ may be phenyl (or vice versa).

It will also be appreciated that if a mixture of epoxides is used, then each occurrence of $R^{e1}$ and/or $R^{e2}$ may not be the same, for example if a mixture of ethylene oxide and propylene oxide are used, $R^{e1}$ may be independently hydrogen or methyl, and $R^{e2}$ may be independently hydrogen or methyl.

Thus, $R^{e1}$ and $R^{e2}$ may be independently selected from hydrogen, alkyl or aryl, or $R^{e1}$ and $R^{e2}$ may together form a cyclohexyl ring, optionally $R^{e1}$ and $R^{e2}$ may be independently selected from hydrogen, methyl, ethyl or phenyl, or $R^{e1}$ and $R^{e2}$ may together form a cyclohexyl ring.

X depends on the nature of the group X used in the compound of formula (I). Thus, X may be selected from $OC(O)R^x$, $OSO_2R^x$, $OSOR^x$, $OSO(R^x)_2$, $S(O)R^x$, $OR^x$, phosphinate, halide, nitrate, hydroxyl, carbonate, amino, amido or optionally substituted aliphatic, heteroaliphatic, alicyclic, heteroalicyclic, aryl or heteroaryl, where $R_x$ is independently hydrogen, or optionally substituted aliphatic, haloaliphatic, heteroaliphatic, alicyclic, heteroalicyclic, aryl, alkylaryl or heteroaryl.

Optionally each X is independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl. Optionally, each X is independently $OC(O)R^x$, $OR^x$, halide, carbonate, amino, nitro, alkyl, aryl, heteroaryl, phosphinate or $OSO_2R^x$. Optional substituents for when X is aliphatic, heteroaliphatic, alicyclic, heteroalicyclic, aryl or heteroaryl include halogen, hydroxyl, nitro, cyano, amino, or substituted or unsubstituted aliphatic, heteroaliphatic, alicyclic, heteroalicyclic, aryl or heteroaryl.

Exemplary options for X include OAc, $OC(O)CF_3$, halogen, $OSO(CH_3)_2$, Et, Me, OMe, OiPr, OtBu, Cl, Br, I, F, $N(iPr)_2$ or $N(SiMe_3)_2$, OPh, OBn, salicylate, dioctyl phosphinate, etc.

If more than one X group is present, for example in a compound of formula (IV-A) as shown below, each X may be the same or different and optionally each X is the same.

Optionally, $R^x$ is alkyl, alkenyl, alkynyl, heteroalkyl, aryl, heteroaryl, cycloalkyl, or alkylaryl. Optional substituents for $R^x$ include halogen, hydroxyl, cyano, nitro, amino, alkoxy, alkylthio, or substituted or unsubstituted aliphatic, heteroaliphatic, alicyclic, heteroalicyclic, aryl or heteroaryl (e.g. optionally substituted alkyl, aryl, or heteroaryl).

Optionally each X is the same, and is selected from $OC(O)R^x$, $OR^x$, halide, carbonate, amino, nitro, alkyl, aryl, heteroaryl, phosphinate or $OSO_2R^x$, $R^x$ is alkyl, alkenyl, alkynyl, heteroalkyl, aryl, heteroaryl or alkylaryl. Optionally each X is the same and is $OC(O)R^x$, $OR^x$, halide, alkyl, aryl, heteroaryl, phosphinate or $OSO_2R^x$. Optionally each X is the same and is $OC(O)R^x$. Optionally still each X is the same and is selected from OAc, $O_2CCF_3$, or $O_2C(CH_2)_3Cy$. Optionally each X is the same and is OAc.

Optionally each $R^x$ is the same and is selected from an optionally substituted alkyl, alkenyl, alkynyl, heteroalkyl, aryl, heteroaryl, cycloalkyl or alkylaryl. Optionally each $R^x$ is the same and is an optionally substituted alkyl, alkenyl, heteroalkyl, aryl, heteroaryl, cycloalkyl or alkylaryl. Optionally each $R^x$ is the same and is an optionally substituted alkyl, alkenyl, heteroalkyl; or cycloalkyl. Optionally still $R^x$ is an optionally substituted alkyl, heteroalkyl or cycloalkyl. Optionally $R^x$ is an optionally substituted alkyl.

It will be appreciated that optional definitions for X and optional definitions for $R^x$ may be combined. For example, each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$, and $R^x$ may be optionally substituted alkyl, alkenyl, alkynyl, heteroalkyl, aryl, heteroaryl, cycloalkyl, or alkylaryl.

The skilled person will understand that each of the above features may be combined. For example, $R^{e1}$ and $R^{e2}$ may be independently selected from hydrogen, alkyl or aryl, or $R^{e1}$ and $R^e$ may together form a cyclohexyl ring, X may be optionally substituted aliphatic or heteroaliphatic, e.g. alkylene or heteroalkylene.

The polyether carbonates produced by the method of the invention are optionally high molecular weight polyether carbonates. It will be appreciated that the nature of the epoxide used to prepare the polyether carbonate will have an impact on the resulting molecular weight of the product. Thus, the lower limit of n+m is used herein to define "high molecular weight" polymers of the invention.

Optionally, the polyether carbonates produced by the method of the invention may have a molecular weight of at least about 25,000 Daltons, such as at least about 40,000 Daltons, e.g. at least about 50,000 Daltons, or at least about 100,000 Daltons, such as between about 50,000 Daltons and 1,000,000 Daltons. High molecular weight polymers formed by the method of the present invention typically have molecular weights above about 100,000 Daltons, such as at least about 500,000 Daltons, optionally at least about 1,000,000 Daltons.

The method of the invention can advantageously prepare a polyether carbonate having a large molecular weight distribution. In other words, the polyether carbonate may have a relatively high polydispersity index (PDI). The PDI of a polymer is determined by dividing the weight average molecular weight ($M_w$) by the number average molecular weight ($M_n$) of a polymer, thereby indicating the distribution of the chain lengths in the polymer product. For high molecular weight polymers, a large PDI can be desirable as the short chains act as plasticisers for the longer chains, thereby preventing the polymer from becoming too brittle.

Optionally the polymers produced by the method of the invention have a PDI of greater than about 1, optionally greater than about 2, optionally greater than about 3.

The $M_n$ and $M_w$, and hence the PDI of the polymers produced by the method of the invention may be measured using Gel Permeation Chromatography (GPC). For example, the GPC may be measured using an Agilent 1260 Infinity GPC machine with two Agilent PLgel µ-m mixed-E columns in series. The samples may be measured at room temperature (293K) in THF with a flow rate of 1 mL/min against narrow polystyrene standards (e.g. polystyrene low easivials supplied by Agilent Technologies with a range of Mn from 405 to 49,450 g/mol). Optionally, the samples may be measured against poly(ethylene glycol) standards, such as polyethylene glycol EasiVials supplied by Agilent Technologies.

Features common to both the method for preparing a polycarbonate ether polyol and the method for preparing high molecular weight polyether carbonate are set out below.

The methods of the present invention may be carried out in the presence of a solvent, however it will also be appreciated that the methods may be carried out in the absence of a solvent. When a solvent is present, it may be toluene, hexane, t-butyl acetate, diethyl carbonate, dimethyl carbonate, dioxane, dichlorobenzene, methylene chloride, propylene carbonate, ethylene carbonate, acetone, ethyl acetate, propyl acetate, n-butyl acetate, tetrahydrofuran (THF), etc. The solvent may be toluene, hexane, acetone, ethyl acetate and n-butyl acetate.

The solvent may act to dissolve one or more of the materials. However, the solvent may also act as a carrier, and be used to suspend one or more of the materials in a suspension.

Solvent may be required to aid addition of one or more of the materials during the steps of the methods of the present invention.

The epoxide which is used in the methods may be any suitable compound containing an epoxide moiety. Exemplary epoxides include ethylene oxide, propylene oxide, butylene oxide and cyclohexene oxide.

The epoxide may be purified (for example by distillation, such as over calcium hydride) prior to reaction with carbon dioxide. For example, the epoxide may be distilled prior to being added.

The methods of the present invention can be carried out on any scale. The method may be carried out on an industrial scale. As will be understood by the skilled person, catalytic reactions often involve the generation of heat (i.e. catalytic reactions are generally exothermic). The generation of heat during a small-scale reaction is unlikely to be problematic, as any increase in temperature can be controlled relatively easily by, for example, the use of an ice bath. With larger scale reactions, and particularly industrial scale reactions, the generation of heat during a reaction can be problematic and potentially dangerous. Thus, the gradual addition of materials either manner as described herein may allow the rate of the catalytic reaction to be controlled and can minimise the build-up of excess heat in. The rate of the reaction may be controlled, for example, by adjusting the flow rate of the materials during addition. Thus, the methods of the present invention have particular advantages if applied to large, industrial scale catalytic reactions.

The temperature may increase during the course of the methods of the invention. For example, the methods may be initiated at a low temperature (e.g. at a temperate of about 50° C. to 80° C. or less) and reaction mixture may be allowed to increase in temperature during the course of the methods. For example, the temperature of the reaction mixture increases during the course of the method of the invention from about 50° C. at the start of the reaction to about 80° C. at the end of the reaction. This increase in temperature may be gradual, or may be rapid. This increase in temperature may be a result of applying external heating sources, or may be achieved via an exothermic reaction, as described above.

The temperature of the reaction mixture may decrease during the course of the methods of the invention. For example, the methods may be initiated at a high temperature (e.g. at a temperate of about 90-150° C. and the reaction mixture may be cooled during the course of the methods (e.g. at a temperate of about 50° C. to 80° C. or less). This decrease in temperature may be gradual, or may be rapid. This decrease in temperature may be a result of applying external cooling sources, as described above.

The present invention also relates to a product obtainable by the methods discussed above.

The catalyst of formula (I) has the following structure:

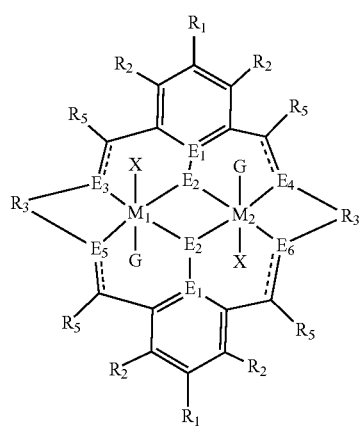

(I)

wherein:

M$_1$ and M$_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

R$_1$ and R$_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

R$_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, cycloalkylene, heteroalkylene, heteroalkenylene and heteroalkynylene, may optionally be interrupted by aryl, heteroaryl, alicyclic or heteroalicyclic;

R$_5$ is independently selected from H, or optionally substituted aliphatic, heteroaliphatic, alicyclic, heteroalicyclic, aryl, heteroaryl, alkylheteroaryl or alkylaryl;

E$_1$ is C, E$_2$ is O, S or NH or E$_1$ is N and E$_2$ is O;

E$_3$, E$_4$, E$_5$ and E$_6$ are selected from N, NR$_4$, O and S, wherein when E$_3$, E$_4$, E$_5$ or E$_6$ are N, ====== is ======, and wherein when E$_3$, E$_4$, E$_5$ or E$_6$ are NR$_4$, O or S, ------ is ———; R$_4$ is independently selected from H, or optionally substituted aliphatic, heteroaliphatic, alicyclic, heteroalicyclic, aryl, heteroaryl, alkylheteroaryl, -alkylC(O)OR$_{19}$ or -alkylC≡N or alkylaryl;

X is independently selected from OC(O)R$^x$, OSO$_2$R$^x$, OSOR$^x$, OSO(R$^x$)$_2$, S(O)R$^x$, OR$^x$, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between M and M$_2$;

R$_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

Each of the occurrences of the groups R$_1$ and R$_2$ may be the same or different, and R and R$_2$ can be the same or different.

Optionally R$_1$ and R$_2$ are independently selected from hydrogen, halide, amino, nitro, sulfoxide, sulfonyl, sulfinate, and an optionally substituted alkyl, alkenyl, aryl, heteroaryl, silyl, silyl ether, alkoxy, aryloxy or alkylthio. Optionally each occurrence of R$_2$ is the same. Optionally, each occurrence of R$_2$ is the same, and is hydrogen.

Both occurrences of R$_1$ may be the same, and may be selected from hydrogen, halide, amino, nitro, sulfoxide, sulfonyl, sulfinate, silyl, silyl ether and an optionally substituted alkyl, alkenyl, aryl, heteroaryl, alkoxy, aryloxy or alkylthio. For example, both occurrences of R may be the same, and may be selected from hydrogen, halide, sulfoxide, and an optionally substituted alkyl, heteroaryl, silyl, alkylthio or alkoxy. Exemplary options for R$_1$ (which may both be the same) include hydrogen, methyl, t-butyl, methoxy, ethoxy, alkylthio, trialkylsilyl such as trimethylsilyl or triethylsilyl, bromide, methanesulfonyl, or piperidinyl, e.g. both occurrences of R$_1$ may be the same, and may be selected from methyl, t-butyl or trialkylsilyl.

Optionally, each occurrence of R$_2$ is hydrogen and each R$_1$ is independently selected from hydrogen, halide, amino, nitro, sulfoxide, sulfonyl, sulfinate, and optionally substituted alkyl, alkenyl, aryl, heteroaryl, silyl, silyl ether, alkoxy, aryloxy, alkylthio, arylthio, such as hydrogen, C$_{1-6}$ alkyl (e.g. haloalkyl), alkoxy, aryl, halide, nitro, sulfonyl, silyl and alkylthio, for example, tBu, Pr, Me, OMe, H, nitro, SO$_2$Me, SiEt$_3$, SiMe$_3$, SMe, halogen or phenyl.

It will be understood that each occurrence of R$^1$ may be the same, and each occurrence of R$_2$ may be the same, and R may be different to R$_2$.

It will be appreciated that the group R$_3$ can be a disubstituted divalent alkyl, alkenyl, alkynyl, heteroalkyl, heteroalkenyl or heteroalkynyl group which may optionally be interrupted by an aryl, heteroaryl, alicyclic or heteroalicyclic group, or may be a disubstituted aryl or cycloalkyl group which acts as a bridging group between two nitrogen centres in the catalyst of formula (I). Thus, where R$_3$ is an alkylene group, such as dimethylpropylenyl, the R$_3$ group has the structure —CH$_2$—C(CH$_3$)$_2$—CH$_2$—. The definitions of the alkyl, aryl, cycloalkyl etc. groups set out above therefore also relate respectively to the divalent alkylene, arylene, cycloalkylene etc. groups set out for $R_3$, and may be optionally substituted. $R_3$ may be an optionally substituted alkylene group, optionally wherein $R_3$ is an optionally substituted $C_2$ or $C_3$ alkylene group. Exemplary options for $R_3$ include ethylenyl, 2,2-fluoropropylenyl, 2,2-dimethylpropylenyl, propylenyl, butylenyl, phenylenyl, cyclohexylenyl or biphenylenyl. When $R_3$ is cyclohexylenyl, it can be the racemic, RR- or SS-forms.

$R_3$ can be independently selected from substituted or unsubstituted alkylene and substituted or unsubstituted arylene, optionally substituted or unsubstituted propylenyl, such as propylenyl and 2,2-dimethylpropylenyl, and substituted or unsubstituted phenylenyl or biphenylenyl. Optionally both occurrences of $R_3$ are the same. Optionally $R_3$ is a substituted propylenyl, such as 2,2-di(alkyl)propylenyl, especially 2,2-di(methyl)propylenyl.

$R_3$ can be independently selected from substituted or unsubstituted alkylene, alkenylene, alkynylene, heteroalkylene, heteroalkenylene or heteroalkynylene, arylene or cycloalkylene.

Optionally, $R_3$ is selected from substituted or unsubstituted alkylene, cycloalkylene, alkenylene, heteroalkylene and arylene. Optionally, $R_3$ is selected from 2,2-dimethylpropylenyl, —$CH_2CH_2CH_2$—, —$CH_2CH(CH_3)CH_2$—, —$CH_2C(CH_2C_6H_5)_2CH_2$—, phenylene, —$CH_2CH_2$—, —$CH_2CH_2CH_2CH_2$—, —$CH_2CH_2N(CH_3)CH_2CH_2$—, 1,4-cyclohexandiyl or —$CH_2CH_2CH(C_2H_5)$—. Optionally $R_3$ is selected from 2,2-dimethylpropylenyl, —$CH_2CH_2CH_2$—, —$CH_2CH(CH_3)CH_2$—, —$CH_2C(CH_2C_6H_5)_2CH_2$—, —$CH_2CH_2CH(C_2H_5)$—, —$CH_2CH_2CH_2CH_2$—. Optionally, $R_3$ is selected from 2,2-dimethylpropylenyl, —$CH_2C(CH_2C_6H_5)_2CH_2$—, $CH_2CH(CH_3)CH_2$ and —$CH_2C(C_2H_5)_2CH_2$—.

Optionally $R_3$ is a substituted propylenyl, such as 2,2-di(alkyl)propylenyl, optionally 2,2-dimethylpropylenyl.

As set out above, $E_3$, $E_4$, $E_5$ and $E_6$ are each independently selected from N, $NR_4$, O and S. The skilled person will understand that if any of $E_3$, $E_4$, $E_5$ or $E_6$ are N, ------ is ======, and if any of $E_3$, $E_4$, $E_5$ or $E_6$ are $NR_4$, O or S, ------ is ——. Optionally, $E_3$, $E_4$, $E_5$ and $E_6$ are each independently selected $NR_4$, O and S.

Optionally each $R_4$ is independently selected from hydrogen, and an optionally substituted alkyl, alkenyl, alkynyl, aryl, heteroalkyl, heteroalkenyl, heteroalkynyl, heteroaryl, -alkylC(O)O$R_{19}$ or -alkylC≡N. Each $R_4$ may be the same or different. Optionally, $R_4$ is selected from hydrogen, and an optionally substituted alkyl, alkenyl, alkynyl, aryl, heteroalkyl, heteroalkenyl, heteroalkynyl or heteroaryl. Exemplary options for $R_4$ include H, Me, Et, Bn, iPr, tBu or Ph, and —$CH_2$-(pyridine). Optionally each $R_4$ is hydrogen or alkyl.

Optionally each $R_5$ is independently selected from hydrogen, and optionally substituted aliphatic or aryl. Optionally, each $R_5$ is independently selected from hydrogen, and optionally substituted alkyl or aryl. Optionally, each $R_5$ is the same, and is selected from hydrogen, and optionally substituted alkyl or aryl. Exemplary $R_5$ groups include hydrogen, methyl, ethyl, phenyl and trifluoromethyl, optionally hydrogen, methyl or trifluoromethyl. Optionally, each $R_5$ is hydrogen. $R_5$ may be H wherein $R_2$ is H.

Optionally both occurrences of $E_1$ are C and both occurrences of $E_2$ are the same, and selected from O, S or NH. Optionally, both occurrences of $E_1$ are C and both occurrences of $E_2$ are O. Alternatively, $E_1$ may be C, when $E_2$ is O.

The skilled person will appreciate that the macrocyclic ligand of the catalyst of formula (I) may be symmetric, or may be asymmetric.

When the macrocyclic ligand is symmetric, it will be appreciated that each occurrence of $E_3$, $E_4$, $E_5$ and $E_6$ will be the same. For example, each occurrence of $E_3$, $E_4$, $E_5$ and $E_6$ may be $NR_4$ (and each $R_4$ may be the same). It will be understood that $E_3$, $E_4$, $E_5$ and $E_6$ may be the same and may be NH. In other words, the catalyst of formula (I) may have the following structure:

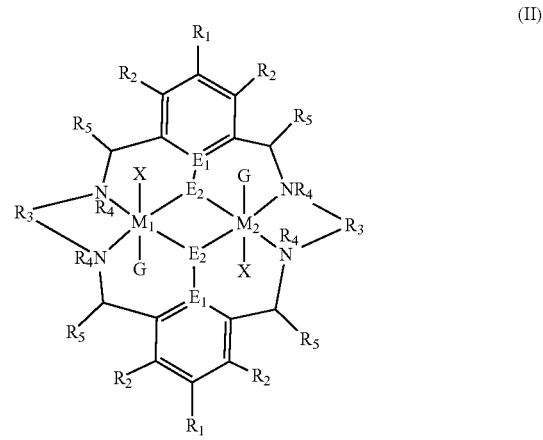

(II)

When the macrocyclic ligand is symmetric, it will be appreciated that each occurrence of $R_1$ may be the same, each occurrence of $R_2$ may be the same, each occurrence of $R_3$ may be the same, each occurrence of $R_5$ may be the same, each occurrence of $E_1$ may be the same, and each occurrence of $E_2$ may be the same (although $R_1$, $R_2$, $R_3$ and $R_5$ are not necessarily the same as each other), and $E_3$, $E_4$, $E_5$ and $E_6$ are the same.

$E_3$, $E_4$, $E_5$ and $E_6$ may, independently, be $NR_4$, wherein at least one occurrence of $E_3$, $E_4$, $E_5$ and $E_6$ is different to the remaining occurrence(s) of $E_3$, $E_4$, $E_5$ and $E_6$, optionally wherein $R_4$ is H or alkyl.

$E_3$, $E_4$, $E_5$ and $E_6$ may, independently, be $NR_4$, wherein each $R_4$ is independently H or optionally substituted aliphatic, optionally wherein each $R_4$ is H or alkyl.

For example, each occurrence of $R_2$, and $R_5$ may be hydrogen, each occurrence of $E_3$, $E_4$, $E_5$ and $E_6$ are $NR_4$, and each $R_4$ is hydrogen or alkyl, each occurrence of $R_3$ may be substituted or unsubstituted alkylene, cycloalkylene, alkenylene, heteroalkylene and arylene, each occurrence of $R^1$ may be selected from hydrogen, halogen, sulfoxide or substituted or unsubstituted alkyl, heteroaryl, silyl, alkylthio or alkoxy, both occurrences of $E_1$ may be C and both occurrences of $E_2$ may be O.

When the ligand of the catalyst of formula (I) is asymmetric, it will be appreciated that at least one of the occurrences of the groups $R_1$, $R_2$, $R_3$, $R_4$, $R_5$, $E_1$ or $E_2$ may be different from the remaining occurrences of the same group, or at least one occurrence of $E_3$, $E_4$, $E_5$ and $E_6$ is different to a remaining occurrence of $E_3$, $E_4$, $E_5$ and $E_6$. For example, each occurrence of $R_3$ may be different, or each occurrence of $R_1$ may be different.

It will also be appreciated that $E_3$ and $E_5$ may be the same, and $E_4$ and $E_6$ may be the same, but $E_3$ and $E_5$ are different to $E_4$ and $E_6$. It will also be appreciated that $E_3$ and $E_4$ may be the same, and $E_5$ and $E_6$ may be the same, but $E_3$ and $E_4$ are different to $E_5$ and $E_6$. Alternatively, one occurrence of $E_3$, $E_4$, $E_5$ and $E_6$ is different to the remaining occurrences of $E_3$, $E_4$, $E_5$ and $E_6$ (and the remaining three occurrences are the same).

For example, $E_3$, $E_4$ and $E_5$ may be —$NR_4$ where $R_4$ is H, and $E_6$ may be $NR_4$ where $R_4$ is alkyl. Furthermore, $E_3$ and $E_5$ may be $NR_4$ where $R_4$ is H, and $E_4$ and $E_6$ may be $NR_4$ where $R_4$ is alkyl, or $E_3$ and $E_4$ may be $NR_4$ where $R_4$ is H, and $E_5$ and $E_6$ may be $NR_4$ where $R_4$ is alkyl. Thus, it will be appreciated that each $E_3$, $E_4$, $E_5$ and $E_6$ is optionally $NR_4$, where at least one occurrence of $R_4$ is different to the remaining occurrences of $R_4$.

For the catalysts of formula (I), (symmetric and asymmetric), each X is independently selected from $OC(O)R^x$, $OSO_2R^x$, $OS(O)R^x$, $OSO(R^x)_2$, $S(O)R^x$, $OR^x$, phosphinate, halide, nitro, hydroxyl, carbonate, amino, nitrate, amido and optionally substituted, aliphatic, heteroaliphatic (for example silyl), alicyclic, heteroalicyclic, aryl or heteroaryl. Optionally each X is independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl. Optionally, each X is independently $OC(O)R^x$, $OR^x$, halide, carbonate, amino, nitro, alkyl, aryl, heteroaryl, phosphinate or $OSO_2R^x$. Optional substituents for when X is aliphatic, heteroaliphatic, alicyclic, heteroalicyclic, aryl or heteroaryl include halogen, hydroxyl, nitro, cyano, amino, or substituted or unsubstituted aliphatic, heteroaliphatic, alicyclic, heteroalicyclic, aryl or heteroaryl. Each X may be the same or different and optionally each X is the same. It will also be appreciated that X may form a bridge between the two metal centres.

$R^x$ is independently hydrogen, or optionally substituted aliphatic, haloaliphatic, heteroaliphatic, alicyclic, heteroalicyclic, aryl, alkylaryl, or heteroaryl. Optionally, $R^x$ is alkyl, alkenyl, alkynyl, heteroalkyl, aryl, heteroaryl, cycloalkyl, or alkylaryl. Optional substituents for R include halogen, hydroxyl, cyano, nitro, amino, alkoxy, alkylthio, or substituted or unsubstituted aliphatic, heteroaliphatic, alicyclic, heteroalicyclic, aryl or heteroaryl (e.g. optionally substituted alkyl, aryl, or heteroaryl).

Exemplary options for X include OAc, $OC(O)CF_3$, halogen, $OSO(CH_3)_2$, Et, Me, OMe, OiPr, OtBu, Cl, Br, I, F, $N(iPr)_2$ or $N(SiMe_3)_2$, OPh, OBn, salicylate, dioctyl phosphinate, etc.

Optionally each X is the same, and is selected from $OC(O)R^x$, $OR^x$, halide, carbonate, amino, nitro, alkyl, aryl, heteroaryl, phosphinate or $OSO_2R^x$, $R^x$ is alkyl, alkenyl, alkynyl, heteroalkyl, aryl, heteroaryl or alkylaryl. Optionally each X is the same and is $OC(O)R^x$, $OR^x$, halide, alkyl, aryl, heteroaryl, phosphinate or $OSO_2R^x$. Optionally each X is the same and is $OC(O)R^x$— Optionally still each X is the same and is selected from OAc, $O_2CCF_3$, or $O_2C(CH_2)_3Cy$. Optionally each X is the same and is OAc.

Optionally each $R^x$ is the same and is selected from an optionally substituted alkyl, alkenyl, alkynyl, heteroalkyl, aryl, heteroaryl, cycloalkyl or alkylaryl. Optionally each $R^x$ is the same and is an optionally substituted alkyl, alkenyl, heteroalkyl, aryl, heteroaryl, cycloalkyl or alkylaryl. Optionally each $R^x$ is the same and is an optionally substituted alkyl, alkenyl, heteroalkyl; or cycloalkyl. Optionally still $R^x$ is an optionally substituted alkyl, heteroalkyl or cycloalkyl. Optionally $R^x$ is an optionally substituted alkyl.

It will be appreciated that optional definitions for X and optional definitions for $R^x$ may be combined. For example, each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$, and $R^x$ may be optionally substituted alkyl, alkenyl, alkynyl, heteroalkyl, aryl, heteroaryl, cycloalkyl, or alkylaryl.

As detailed above, $M_1$ and $M_2$ are independently selected from any of: Zn(II), Cr(III)-X, Cr(II), Co(III)-X, Co(II), Cu(II), Mn(III)-X, Mn(II), Mg(II), Ni(II), Ni(III)-X, Fe(II), Fe(III)-X, Ca(II), Ge(II), Ti(II), Al(III)-X, Ti(III)-X, V(II), V(III)-X, Ge(IV)-(X)$_2$ or Ti(IV)-(X)$_2$.

Optionally, at least one of $M_1$ and $M_2$ is selected from Zn(II), Cr(III)-X, Co(II), Mn(II), Mg(II), Ni(II), Fe(II), and Fe(III)-X, optionally at least one of $M_1$ and $M_2$ is selected from Mg(II), Zn(II), and Ni(II), for example, at least one of $M_1$ and $M_2$ is Ni(II).

It will be appreciated that $M_1$ and $M_2$ may be the same or different. For example, $M_1$ and/or $M_2$ may be selected from Zn(II), Cr(III)—X, Co(II), Mn(II), Mg(II), Ni(II), Fe(II), and Fe(III)—X, optionally $M_1$ and/or $M_2$ is selected from Mg(II), Zn(II) and Ni(II), for example, $M_1$ and/or $M_2$ is Ni(II).

Exemplary combinations of $M_1$ and $M_2$ include Mg(II) and Mg(II), Zn(II) and Zn(II), Ni(II) and Ni(II), Mg(II) and Zn(II), Mg(II) and Ni(II), Zn(II) and Co(II), Co(II) and Co(III), Fe(III) and Fe(III), Zn(II) and Fe(II), or Zn(II) and Ni(II).

It will be appreciated that when one of M or $M_2$ is Cr(III), Co(III), Mn(III), Ni(III), Fe(III), Al(III), Ti(III) or V(III) the catalyst of formula (I) will contain an additional X group co-ordinated to the metal centre, wherein X is as defined above. It will also be appreciated that when one of M or $M_2$ is Ge(IV) or Ti(IV), the catalyst of formula (III) will contain two additional X group co-ordinated to the metal centre, wherein X is as defined above. When one of M or $M_2$ is Ge(IV)-(X)$_2$ or Ti(IV)-(X)$_2$, both G may be absent.

When G is not absent, it is a group which is capable of donating a lone pair of electrons (i.e. a Lewis base). G may be a nitrogen-containing Lewis base. Each G may be neutral or negatively charged. If G is negatively charged, then one or more positive counterions will be required to balance out the charge of the complex. Suitable positive counterions include group 1 metal ions (Na$^+$, K$^+$, etc.), group 2 metal ions (Mg$^{2+}$, Ca$^{2+}$, etc.), imidazolium ions, a positively charged optionally substituted heteroaryl, heteroaliphatic or heteroalicyclic group, ammonium ions (i.e. $N(R^{12})_4^+$), iminium ions (i.e. $(R^{12})_2C=N(R^{12})_2^+$, such as bis(triphenylphosphine)iminium ions) or phosphonium ions ($P(R^{12})_4^+$), wherein each $R^{12}$ is independently selected from hydrogen or optionally substituted aliphatic, heteroaliphatic, alicyclic, heteroalicyclic, aryl or heteroaryl. Exemplary counterions include [H-B]$^+$ wherein B is selected from triethylamine, 1,8-diazabicyclo[5.4.0]undec-7-ene and 7-methyl-1,5,7-triazabicyclo[4.4.0]dec-5-ene.

G is optionally independently selected from an optionally substituted heteroaliphatic group, an optionally substituted heteroalicyclic group, an optionally substituted heteroaryl group, a halide, hydroxide, hydride, a carboxylate and water. Optionally, G is independently selected from water, an alcohol (e.g. methanol), a substituted or unsubstituted heteroaryl (imidazole, methyl imidazole (for example, N-methyl imidazole), pyridine, 4-dimethylaminopyridine, pyrrole, pyrazole, etc.), an ether (dimethyl ether, diethylether, cyclic ethers, etc.), a thioether, carbene, a phosphine, a phosphine oxide, a substituted or unsubstituted heteroalicyclic (morpholine, piperidine, tetrahydrofuran, tetrahydrothiophene, etc.), an amine, an alkyl amine trimethylamine, triethylamine, etc.), acetonitrile, an ester (ethyl acetate, etc.), an acetamide (dimethylacetamide, etc.), a sulfoxide (dimethylsulfoxide, etc.), a carboxylate, a hydroxide, hydride, a halide, a nitrate, a sulfonate, etc. One or both instances of G may be independently selected from optionally substituted heteroaryl, optionally substituted heteroaliphatic, optionally substituted heteroalicyclic, halide, hydroxide, hydride, an ether, a thioether, carbene, a phosphine, a phosphine oxide, an amine, an alkyl amine, acetonitrile, an ester, an acetamide, a sulfoxide, a carboxylate, a nitrate or a sulfonate. G may be a halide; hydroxide; hydride; water; a heteroaryl, heteroalicyclic or carboxylate group which are optionally substituted by alkyl, alkenyl, alkynyl, alkoxy, halogen, hydroxyl, nitro or nitrile. Optionally, G is independently selected from halide; water; a heteroaryl optionally substituted by alkyl (e.g. methyl, ethyl etc.), alkenyl, alkynyl, alkoxy (optionally methoxy), halogen, hydroxyl, nitro or nitrile. One or both instances of G may be negatively charged (for example, halide). One or both instances of G may be an optionally substituted heteroaryl. Exemplary G groups include chloride, bromide, pyridine, methylimidazole (for example N-methyl imidazole) and dimethylaminopyridine (for example, 4-methylaminopyridine).

It will be appreciated that when a G group is present, the G group may be associated with a single M metal centre as shown in formula (I), or the G group may be associated with both metal centres and form a bridge between the two metal centres, as shown below in formula (IIa):

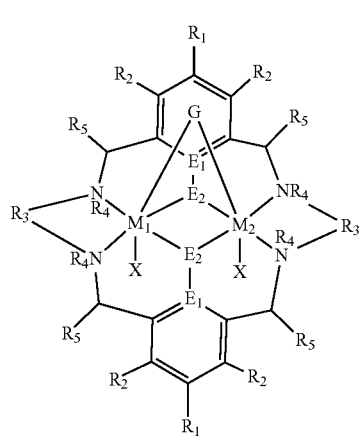

(IIa)

wherein $R_1$, $R_2$, $R_3$, $R_4$, $R_5$, $M_1$, $M_2$, G, X, $E_1$ and $E_2$, are as defined for formula (I) and formula (II).

The skilled person will understand that, in the solid state, the catalysts of formula (I), (II) or any subset thereof, may be associated with solvent molecules such as water, or alcohol (e.g. methanol or ethanol). It will be appreciated that the solvent molecules may be present in a ratio of less than 1:1 relative to the molecules of catalyst of the first aspect (i.e. 0.2:1, 0.25:1, 0.5:1), in a ratio of 1:1, relative to the molecules of catalyst of the first aspect, or in a ratio of greater than 1:1, relative to the molecules of catalyst of the first aspect.

The skilled person will understand that, in the solid state, the catalysts of the first aspect may form aggregates. For example, the catalyst of the first aspect may be a dimer, a trimer, a tetramer, a pentamer, or higher aggregate.

Exemplary catalysts of formula (I) are as follows:

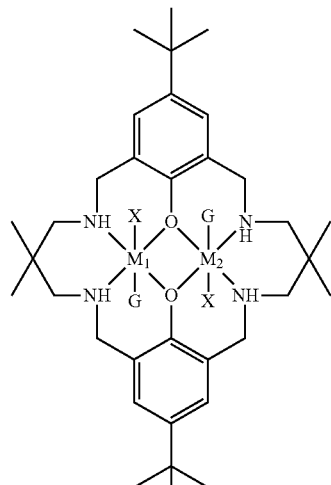

$[L^1M_1M_2(X)_2(G)_2]$

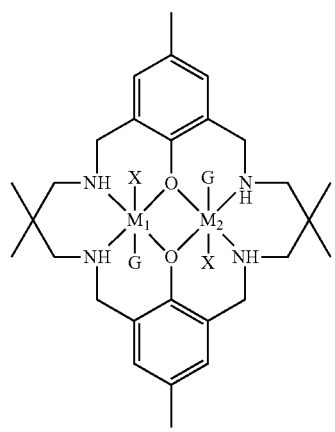

$[L^2M_1M_2(X)_2(G)_2]$

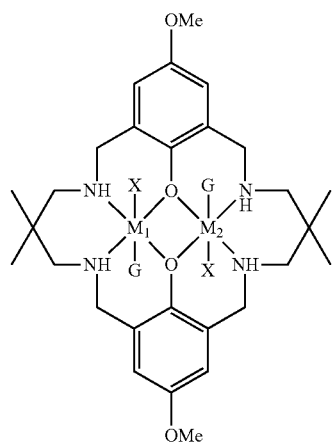

$[L^3M_1M_2(X)_2(G)_2]$

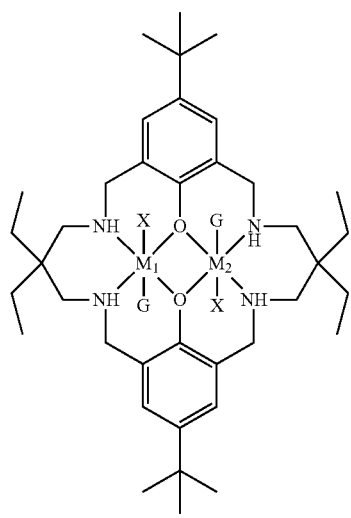
[L⁴M₁M₂(X)₂(G)₂]
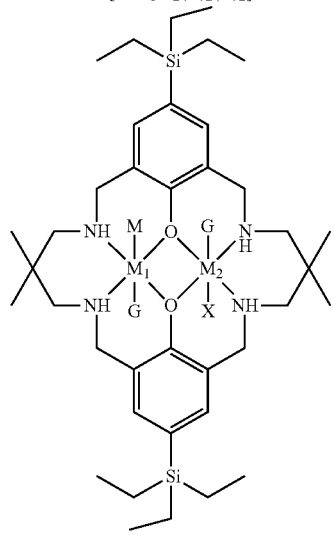
[L⁵M₁M₂(X)₂(G)₂]
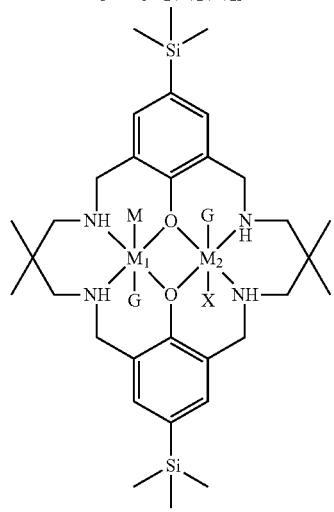
[L⁶M₁M₂(X)₂(G)₂]
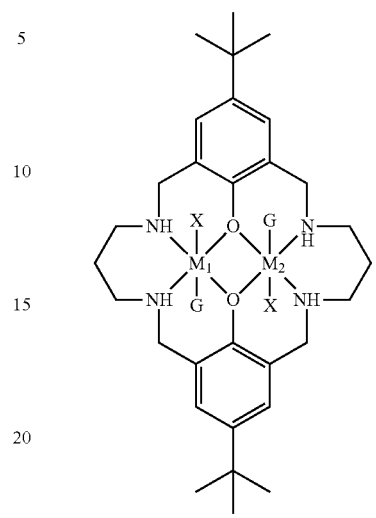
[L⁷M₁M₂(X)₂(G)₂]
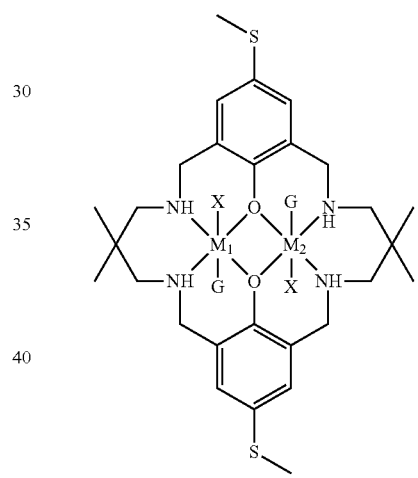
[L⁸M₁M₂(X)₂(G)₂]
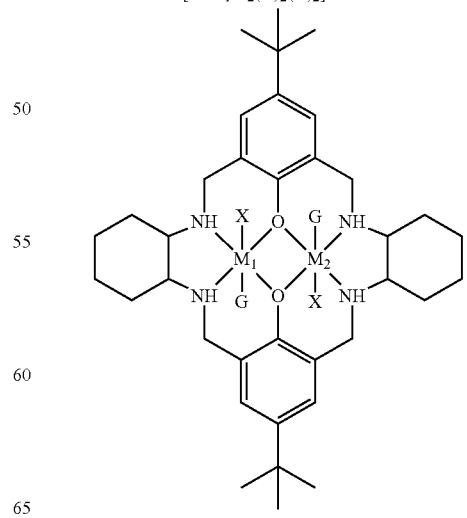
[L⁹M₁M₂(X)₂(G)₂]

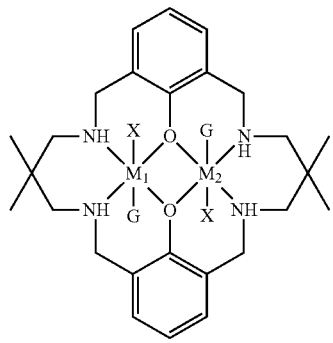
[L^10M_1M_2(X)_2(G)_2]
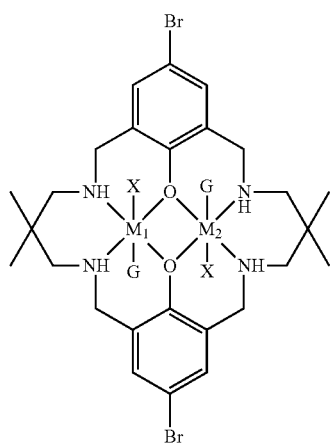
[L^11M_1M_2(X)_2(G)_2]
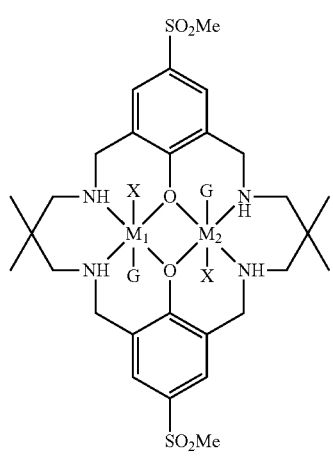
[L^12M_1M_2(X)_2(G)_2]
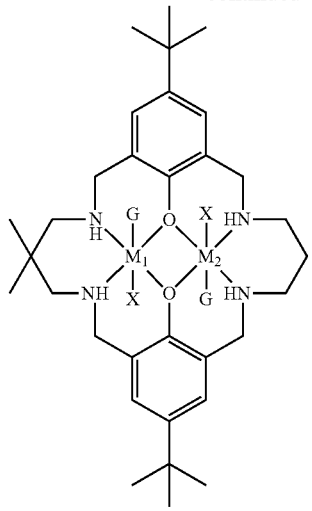
[L^13M_1M_2(X)_2(G)_2]
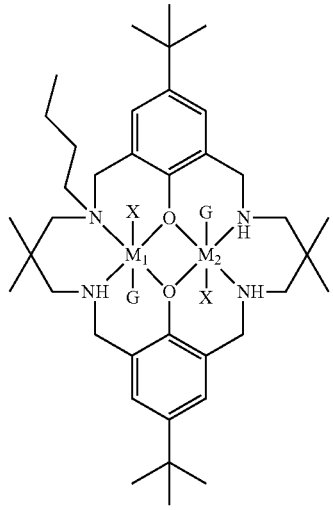
[L^14M_1M_2(X)_2(G)_2]
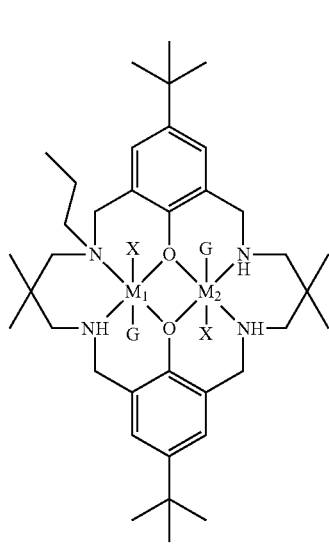
[L^15M_1M_2(X)_2(G)_2]

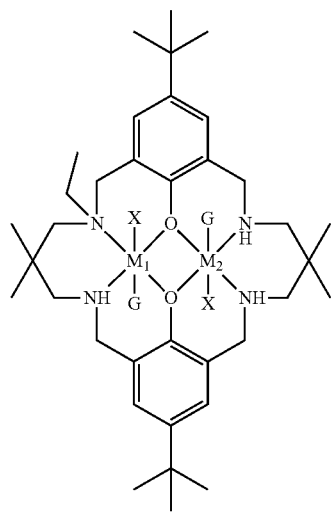
[L^16M_1M_2(X)_2(G)_2]
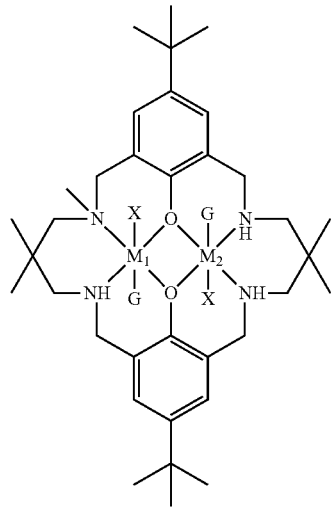
[L^17M_1M_2(X)_2(G)_2]
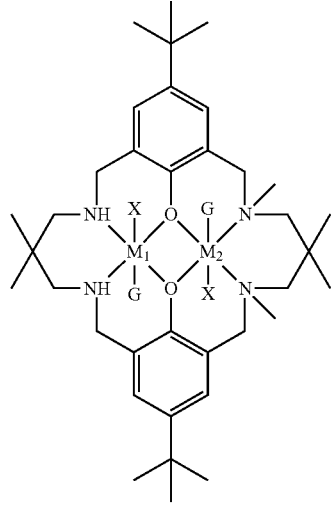
[L^18M_1M_2(X)_2(G)_2]
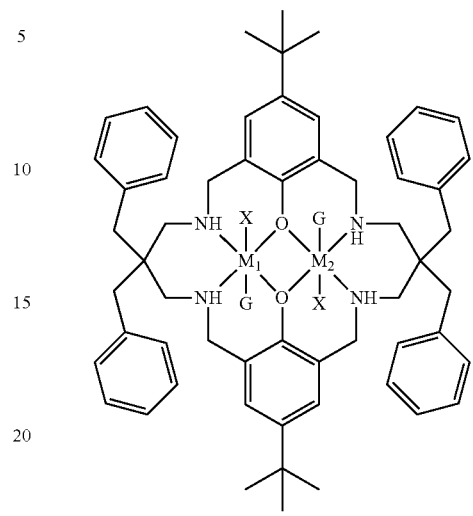
[L^19M_1M_2(X)_2(G)_2]
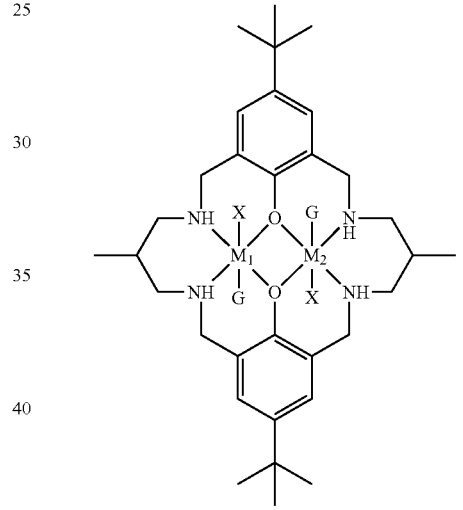
[L^20M_1M_2(X)_2(G)_2]
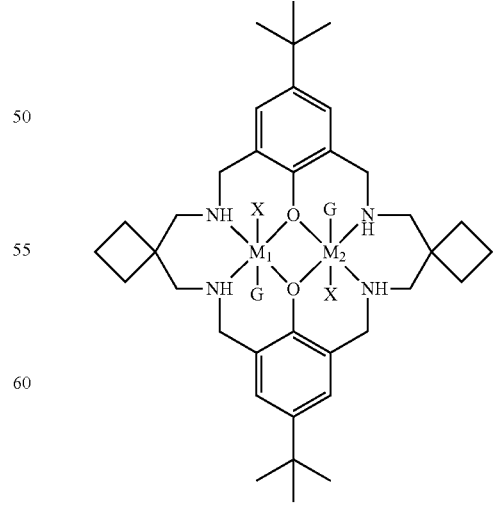
[L^21M_1M_2(X)_2(G)_2]

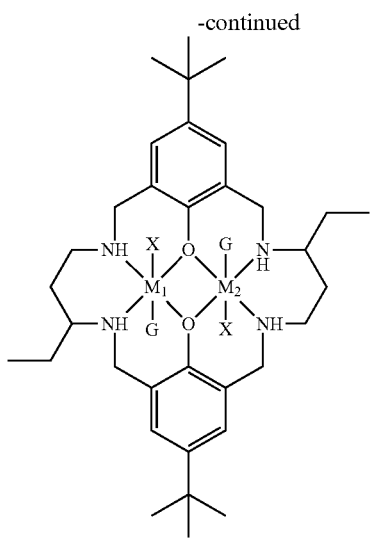

$[L^{22}M_1M_2(X)_2(G)_2]$

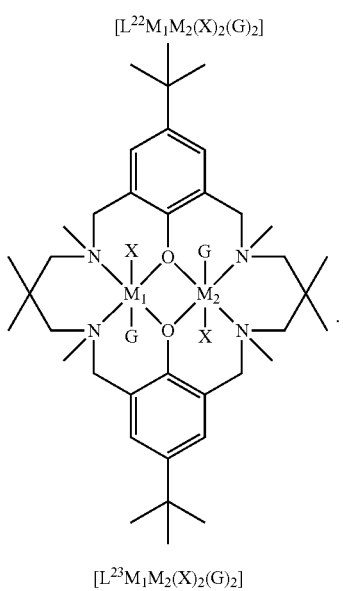

$[L^{23}M_1M_2(X)_2(G)_2]$ where $M_1$, $M_2$, G and X are as defined above for formula (I), and it will be appreciated that one or both G groups may be absent.

For example, at least one of $M_1$ and $M_2$ may be selected from Zn(II), Cr(III)-X, Co(II), Mn(II), Mg(II), Ni(II), Fe(II), and Fe(III)-X, e.g. at least one of $M_1$ and $M_2$ may be selected from Mg(II), Zn(II) and Ni(II), for example, at least one of $M_1$ and $M_2$ may be Ni(II).

As set out above, $M_1$ and $M_2$ may be the same or different. For example, $M_1$ and/or $M_2$ may be selected from Zn(II), Cr(III)-X, Co(II), Mn(II), Mg(II), Ni(II), Fe(II), and Fe(III)-X, optionally $M_1$ and/or $M_2$ is selected from Mg(II), Zn(II) and Ni(II), for example, $M_1$ and/or $M_2$ is Ni(II). Exemplary combinations of $M_1$ and $M_2$ include Mg(II)/Mg(II), Zn(II)/Zn(II), Ni(II)/Ni(II), Mg(II)/Zn(II), Mg(II)/Ni(II), Zn(II)/Ni(II).

For example, each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$. For example, $R^x$ may be alkyl, alkenyl, alkynyl, heteroalkyl, aryl, heteroaryl, cycloalkyl, or alkylaryl.

For example, if either G is present, G may be independently selected from halide; water; a heteroaryl optionally substituted by alkyl (e.g. methyl, ethyl etc.), alkenyl, alkynyl, alkoxy (optionally methoxy), halogen, hydroxyl, nitro or nitrile, e.g. one or both instances of G (if present) can be chloride, bromide, pyridine, methylimidazole (for example N-methyl imidazole) and dimethylaminopyridine (for example, 4-methylaminopyridine).

The skilled person will appreciate that the above definitions may be combined. For example, for the catalysts above, $M_1$ and $M_2$ may be the same or different, and may be selected from Zn(II), Cr(III)-X, Co(II), Mn(II), Mg(II), Ni(II), Fe(II), and Fe(III)-X; each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$; $R^x$ may be alkyl, alkenyl, alkynyl, heteroalkyl, aryl, heteroaryl, cycloalkyl, or alkylaryl; G may be absent or if present, may be independently selected from halide; water; a heteroaryl optionally substituted by alkyl (e.g. methyl, ethyl etc.), alkenyl, alkynyl, alkoxy (optionally methoxy), halogen, hydroxyl, nitro or nitrile.

Thus, the skilled person will understand that the above exemplary catalysts of formula (I) encompass, but are not restricted to, the following catalysts:

$[L^1Ni_2(OAc)_2]$, $[L^1Mg_2(OAc)_2]$, $[L^1Zn_2(OAc)_2]$, $[L^1MgZn(OAc)_2]$, $[L^1MgNi(OAc)_2]$, $[L^1Ni_2(CO_2CF_3)_2]$, $[L^1Mg_2CO_2CF_3)_2]$, $[L^1Zn_2(CO_2CF_3)_2]$, $[L^1MgZn(CO_2CF_3)_2]$, $[L^1MgNi(CO_2CF_3)_2]$, $[L^1Ni_2(CO_2{}^tBu)_2]$, $[L^1Mg_2(CO_2{}^tBu)_2]$, $[L^1Zn_2(CO_2{}^tBu)_2]$, $[L^1MgZn(CO_2{}^tBu)_2]$, $[L^1MgNi(CO_2{}^tBu)_2]$, $[L^1Ni_2(OPh)_2]$, $[L^1Mg_2(OPh)_2]$, $[L^1Zn_2(OPh)_2]$, $[L^1MgZn(OPh)_2]$, $[L^1MgNi(OPh)_2]$, $[L^1Ni_2(Ph)_2]$, $[L^1Mg_2(Ph)_2]$, $[L^1Zn_2(Ph)_2]$, $[L^1MgZn(Ph)_2]$, $[L^1MgNi(Ph)_2]$, $[L^1Ni_2(O^iPr)_2]$, $[L^1Mg_2(O^iPr)_2]$, $[L^1Zn_2(O^iPr)_2]$, $[L^1MgZn(O^iPr)_2]$, $[L^1MgNi(O^iPr)_2]$, $[L^1Ni_2(C_6F_5)_2]$, $[L^1Mg_2(C_6F_5)_2]$, $[L^1Zn_2(C_6F_5)_2]$, $[L^1MgZn(C_6F_5)_2]$, $[L^1MgNi(C_6F_5)_2]$, $[L^1Ni_2Cl_2]$, $[L^1Mg_2Cl_2]$, $[L^1Zn_2Cl_2]$, $[L^1MgZnCl_2]$, $[L^1MgNiCl_2]$, $[L^1Ni_2Br_2]$, $[L^1Mg_2Br_2]$, $[L^1Zn_2Br_2]$, $[L^1MgZnBr_2]$, $[L^1MgNiBr_2]$, $[L^1Ni_2I_2]$, $[L^1Mg_2I_2]$, $[L^1Zn_2I_2]$, $[L^1MgZnI_2]$, $[L^1MgNiI_2]$, $[L^1Ni_2(OC(O)(CH_2)_4CH_3)_2]$, $[L^1Mg_2(OC(O)(CH_2)_4CH_3)_2]$, $[L^1Zn_2(OC(O)(CH_2)_4CH_3)_2]$, $[L^1MgZn(OC(O)(CH_2)_4CH_3)_2]$, $[L^1MgNi(OC(O)(CH_2)_4CH_3)_2]$, $[L^1Ni_2(OC(O)(CH_2)_6CH_3)_2]$, $[L^1Mg_2(OC(O)(CH_2)_6CH_3)_2]$, $[L^1Zn_2(OC(O)(CH_2)_6CH_3)_2]$, $[L^1MgZn(OC(O)(CH_2)_6CH_3)_2]$, $[L^1MgNi(OC(O)(CH_2)_6CH_3)_2]$, $[L^1Ni_2(OC(O)(CH_2)_{10}CH_3)_2]$, $[L^1Mg_2(OC(O)(CH_2)_{10}CH_3)_2]$, $[L^1Zn_2(OC(O)(CH_2)_{10}CH_3)_2]$, $[L^1MgZn(OC(O)(CH_2)_{10}CH_3)_2]$, $[L^1MgNi(OC(O)(CH_2)_{10}CH_3)_2]$, $[L^1Ni_2(OC(O)C_6F_5)_2]$, $[L^1Mg_2(OC(O)C_6F_5)_2]$, $[L^1Zn_2(OC(O)C_6F_5)_2]$, $[L^1MgZn(OC(O)C_6F_5)_2]$, $[L^1MgNi(OC(O)C_6F_5)_2]$,

[L$^1$Ni$_2$Cl$_2$(methylimidazole)], [L$^1$Mg$_2$Cl$_2$(methylimidazole)], [L$^1$Zn$_2$Cl$_2$(methylimidazole)],

[L$^1$MgZnCl$_2$(methylimidazole)], [L$^1$MgNiCl$_2$(methylimidazole)],

[L$^1$Ni$_2$Cl$_2$(pyridine)], [L$^1$Mg$_2$Cl$_2$(pyridine)], [L$^1$Zn$_2$Cl$_2$(pyridine)], [L$^1$MgZnCl$_2$(pyridine)], [L$^1$MgNiCl$_2$(pyridine)],

[L$^1$Ni$_2$Cl$_2$(dimethylaminopyridine)], [L$^1$Mg$_2$Cl$_2$(dimethylaminopyridine)],

[L$^1$Zn$_2$Cl$_2$(dimethylaminopyridine)], [L$^1$MgZnCl$_2$(dimethylaminopyridine)],

[L$^1$MgNiCl$_2$(dimethylaminopyridine)],

[L$^1$Ni$_2$Br$_2$(dimethylaminopyridine)], [L$^1$Mg$_2$Br$_2$(dimethylaminopyridine)],

[L$^1$Zn$_2$Br$_2$(dimethylaminopyridine)], [L$^1$MgZnBr$_2$(dimethylaminopyridine)],

[L$^1$MgNiBr$_2$(dimethylaminopyridine)],

[L$^1$Ni$_2$(bis(4-methoxy)phenyl phosphinate)$_2$], [L$^1$Mg$_2$(bis(4-methoxy)phenyl phosphinate)$_2$],

[L$^1$Zn$_2$(bis(4-methoxy)phenyl phosphinate)$_2$], [L$^1$MgZn(bis(4-methoxy)phenyl phosphinate)$_2$],

[L$^1$MgNi(bis(4-methoxy)phenyl phosphinate)$_2$],

[L$^1$Ni$_2$(adamantyl carbonate)$_2$], [L$^1$Mg$_2$(adamantyl carbonate)$_2$], [L$^1$Zn$_2$(adamantyl carbonate)$_2$], [L$^1$MgZn(adamantyl carbonate)$_2$], [L$^1$MgNi(adamantyl carbonate)$_2$],

[L$^1$Ni$_2$(diphenylphosphinate)$_2$], [L$^1$Mg$_2$(diphenylphosphinate)$_2$], [L$^1$Zn$_2$(diphenylphosphinate)$_2$],

[L$^1$MgZn(diphenylphosphinate)$_2$], [L$^1$MgNi(diphenylphosphinate)$_2$],

[L$^2$Ni$_2$(OAc)$_2$], [L$^2$Mg$_2$(OAc)$_2$], [L$^2$Zn$_2$(OAc)$_2$], [L$^2$MgZn(OAc)$_2$], [L$^2$MgNi(OAc)$_2$],

[L$^3$Ni$_2$(OAc)$_2$], [L$^3$Mg$_2$(OAc)$_2$], [L$^3$Zn$_2$(OAc)$_2$], [L$^3$MgZn(OAc)$_2$], [L$^3$MgNi(OAc)$_2$],

[L$^4$Ni$_2$(OAc)$_2$], [L$^4$Mg$_2$(OAc)$_2$], [L$^4$Zn$_2$(OAc)$_2$], [L$^4$MgZn(OAc)$_2$], [L$^4$MgNi(OAc)$_2$],

[L$^5$Ni$_2$(OAc)$_2$], [L$^5$Mg$_2$(OAc)$_2$], [L$^5$Zn$_2$(OAc)$_2$], [L$^5$MgZn(OAc)$_2$], [L$^5$MgNi(OAc)$_2$],

[L$^6$Ni$_2$(OAc)$_2$], [L$^6$Mg$_2$(OAc)$_2$], [L$^6$Zn$_2$(OAc)$_2$], [L$^6$MgZn(OAc)$_2$], [L$^6$MgNi(OAc)$_2$],

[L$^7$Ni$_2$(OAc)$_2$], [L$^7$Mg$_2$(OAc)$_2$], [L$^7$Zn$_2$(OAc)$_2$], [L$^7$MgZn(OAc)$_2$], [L$^7$MgNi(OAc)$_2$],

[L$^8$Ni$_2$(OAc)$_2$], [L$^8$Mg$_2$(OAc)$_2$], [L$^8$Zn$_2$(OAc)$_2$], [L$^8$MgZn(OAc)$_2$], [L$^8$MgNi(OAc)$_2$],

[L$^9$Ni$_2$(OAc)$_2$], [L$^9$Mg$_2$(OAc)$_2$], [L$^9$Zn$_2$(OAc)$_2$], [L$^9$MgZn(OAc)$_2$], [L$^9$MgNi(OAc)$_2$],

[L$^{10}$Ni$_2$(OAc)$_2$], [L$^{10}$Mg$_2$(OAc)$_2$], [L$^{10}$Zn$_2$(OAc)$_2$], [L$^{10}$MgZn(OAc)$_2$], [L$^{10}$MgNi(OAc)$_2$],

[L$^{11}$Ni$_2$(OAc)$_2$], [L$^{11}$Mg$_2$(OAc)$_2$], [L$^{11}$Zn$_2$(OAc)$_2$], [L$^{11}$MgZn(OAc)$_2$], [L$^{11}$MgNi(OAc)$_2$],

[L$^{12}$Ni$_2$(OAc)$_2$], [L$^{12}$Mg$_2$(OAc)$_2$], [L$^{12}$Zn$_2$(OAc)$_2$], [L$^{12}$MgZn(OAc)$_2$], [L$^{12}$MgNi(OAc)$_2$],

[L$^{13}$Ni$_2$(OAc)$_2$], [L$^{13}$Mg$_2$(OAc)$_2$], [L$^{13}$Zn$_2$(OAc)$_2$], [L$^{13}$MgZn(OAc)$_2$], [L$^{13}$MgNi(OAc)$_2$],

[L$^{14}$Ni$_2$(OAc)$_2$], [L$^{14}$Mg$_2$(OAc)$_2$], [L$^{14}$Zn$_2$(OAc)$_2$], [L$^{14}$MgZn(OAc)$_2$], [L$^4$MgNi(OAc)$_2$],

[L$^{15}$Ni$_2$(OAc)$_2$], [L$^{15}$Mg$_2$(OAc)$_2$], [L$^{15}$Zn$_2$(OAc)$_2$], [L$^{15}$MgZn(OAc)$_2$], [L$^5$MgNi(OAc)$_2$],

[L$^{16}$Ni$_2$(OAc)$_2$], [L$^{16}$Mg$_2$(OAc)$_2$], [L$^{16}$Zn$_2$(OAc)$_2$], [L$^{16}$MgZn(OAc)$_2$], [L$^{16}$MgNi(OAc)$_2$],

[L$^{17}$Ni$_2$(OAc)$_2$], [L$^{17}$Mg$_2$(OAc)$_2$], [L$^{17}$Zn$_2$(OAc)$_2$], [L$^{17}$MgZn(OAc)$_2$], [L$^{17}$MgNi(OAc)$_2$],

[L$^{18}$Ni$_2$(OAc)$_2$], [L$^{18}$Mg$_2$(OAc)$_2$], [L$^{18}$Zn$_2$(OAc)$_2$], [L$^{18}$MgZn(OAc)$_2$], [L$^{18}$MgNi(OAc)$_2$],

[L$^{19}$Ni$_2$(OAc)$_2$], [L$^{19}$Mg$_2$(OAc)$_2$], [L$^{19}$Zn$_2$(OAc)$_2$], [L$^{19}$MgZn(OAc)$_2$], [L$^9$MgNi(OAc)$_2$],

[L$^{20}$Ni$_2$(OAc)$_2$], [L$^{20}$Mg$_2$(OAc)$_2$], [L$^{20}$Zn$_2$(OAc)$_2$], [L$^{20}$MgZn(OAc)$_2$], [L$^{20}$MgNi(OAc)$_2$],

[L$^{21}$Ni$_2$(OAc)$_2$], [L$^{21}$Mg$_2$(OAc)$_2$], [L$^{21}$Zn$_2$(OAc)$_2$], [L$^{21}$MgZn(OAc)$_2$], [L$^{21}$MgNi(OAc)$_2$],

[L$^{22}$Ni$_2$(OAc)$_2$], [L$^{22}$Mg$_2$(OAc)$_2$], [L$^{22}$Zn$_2$(OAc)$_2$], [L$^{22}$MgZn(OAc)$_2$], [L$^{22}$MgNi(OAc)$_2$],

[L$^{23}$Ni$_2$(OAc)$_2$], [L$^{23}$Mg$_2$(OAc)$_2$], [L$^{23}$Zn$_2$(OAc)$_2$], [L$^{23}$MgZn(OAc)$_2$], [L$^{23}$MgNi(OAc)$_2$],

[L$^1$Co$_2$(OAc)$_3$], [L$^1$ZnCoI], [L$^1$ZnFe(OAc)$_2$], [L$^1$ZnFeBr$_2$], [L$^1$ZnFeCl$_2$], [L$^1$ZnFeI$_2$],

[L$^1$ZnCo(OAc)$_2$], [L$^1$ZnCoCl$_2$], [L$^1$ZnCoBr$_2$],

[L$^1$Fe$_2$Cl$_4$], [L$^1$Co$_2$Cl$_2$(methylimidazole)],

[L$^1$Co$_2$Cl$_2$(pyridine)], [L$^1$CO$_2$Cl$_3$][H-DBU]$^+$, and [L$^1$CO$_2$Cl$_3$]$^-$[H-MTBD]$^+$.

The skilled person will appreciate that in any of the above complexes, any one ligand defined by "L" may be replaced by another ligand defined by a different "L". For example, in complexes which refer to L$^1$, this ligand may be replaced by any of the ligands defined by L$^2$ to L$^{22}$.

DMC catalysts are complicated compounds which comprise at least two metal centres and cyanide ligands. The DMC catalyst may additionally comprise at least one of: one or more complexing agents, water, a metal salt and/or an acid (e.g. in non-stoichiometric amounts).

The first two of the at least two metal centres may be represented by M' and M".

M' may be selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), M' is optionally selected from Zn(II), Fe(II), Co(II) and Ni(II), optionally M' is Zn(II).

M" is selected from Fe(II), Fe(III), Co(II), Co(III), Cr(II), Cr(III), Mn(II), Mn(III), Ir(III), Ni(II), Rh(III), Ru(II), V(IV), and V(V), optionally M" is selected from Co(II), Co(III), Fe(II), Fe(III), Cr(III), Ir(III) and Ni(II), optionally M" is selected from Co(II) and Co(III).

It will be appreciated that the above optional definitions for M' and M" may be combined. For example, optionally M' may be selected from Zn(II), Fe(II), Co(II) and Ni(II), and M" may optionally selected form be Co(II), Co(III), Fe(II), Fe(III), Cr(III), Ir(III) and Ni(II). For example, M' may optionally be Zn(II) and M" may optionally be selected from Co(II) and Co(III).

If a further metal centre(s) is present, the further metal centre may be further selected from the definition of M' or M".

Examples of DMC catalysts which can be used in the method of the invention include those described in U.S. Pat. Nos. 3,427,256, 5,536,883, 6,291,388, 6,486,361, 6,608,231, 7,008,900, 5,482,908, 5,780,584, 5,783,513, 5,158,922, 5,693,584, 7,811,958, 6,835,687, 6,699,961, 6,716,788, 6,977,236, 7,968,754, 7,034,103, 4,826,953, 4,500,704, 7,977,501, 9,315,622, EP-A-1568414, EP-A-1529566, and WO 2015/022290, the entire contents of which are incorporated by reference.

DMC catalysts which are useful in the invention may be produced by treating a solution (such as an aqueous solution) of a metal salt with a solution (such as an aqueous solution) of a metal cyanide salt in the presence of one or more complexing agents, water, and/or an acid. Suitable metal salts include compounds of the formula M'(X')$_p$, wherein M' is selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), and M' is optionally selected from Zn(II), Fe(II), Co(II) and Ni(II), optionally M' is Zn(II). X' is an anion selected from halide, oxide, hydroxide, sulphate, carbonate, cyanide, oxalate, thiocyanate, isocyanate, isothiocyanate, carboxylate and nitrate, optionally X' is halide. p is an integer of 1 or more, and the charge on the anion multiplied by p satisfies the valency of M'. Examples of suitable metal salts include zinc chloride, zinc bromide, zinc acetate, zinc acetonylacetonate, zinc benzoate, zinc nitrate, iron(II) sulphate, iron (II) bromide, cobalt(II) chloride, cobalt(II) thiocyanate, nickel(II) formate, nickel(II) nitrate, and mixtures thereof.

Suitable metal cyanide salts include compounds of the formula $(Y)q[M''(CN)_b(A)_c]$, wherein M'' is selected from Fe(II), Fe(III), Co(II), Co(III), Cr(II), Cr(III), Mn(II), Mn(III), Ir(III), Ni(II), Rh(III), Ru(II), V(IV), and V(V), optionally M'' is selected from Co(II), Co(III), Fe(II), Fe(III), Cr(III), Ir(III) and Ni(II), optionally M'' is selected from Co(II) and Co(III). Y is a proton ($H^+$) or an alkali metal ion or an alkaline earth metal ion (such as $K^+$), A is an anion selected from halide, oxide, hydroxide, sulphate, cyanide oxalate, thiocyanate, isocyanate, isothiocyanate, carboxylate and nitrate. q and b are integers of 1 or more, optionally b is 4 or 6. c may be 0 or an integer of 1 or more. The sum of the charges on the ions Y, CN and A multiplied by q, b and c respectively (e.g. Y×q+CN×b+A×c) satisfies the valency of M''. Examples of suitable metal cyanide salts include potassium hexacyanocobaltate(III), potassium hexacyanoferrate(II), potassium hexacyanoferrate(III), calcium hexacyanocobaltate(III), lithium hexacyanocolbaltate(III), and mixtures thereof.

Suitable complexing agents include (poly)ethers, polyether carbonates, polycarbonates, poly(tetramethylene ether diol)s, ketones, esters, amides, alcohols, ureas and the like, or combinations thereof. Exemplary complexing agents include propylene glycol, polypropylene glycol (PPG), (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol, etc, or combination a thereof. It will be appreciated that the alcohol may be saturated or may contain an unsaturated moiety (e.g. a double or triple bond). Multiple (i.e. more than one different type of) complexing agents may be present in the DMC catalysts used in the present invention.

The DMC catalyst may comprise a complexing agent which is a polyether, polyether carbonate or polycarbonate.

Suitable polyethers for use in the DMC catalyst of the present invention include those produced by ring-opening polymerisation of cyclic ethers, and include epoxide polymers, oxetane polymers, tetrahydrofuran polymers etc. Any method of catalysis can be used to make the polyethers. The polyethers can have any desired end groups, including, for example, hydroxyl, amine, ester, ether, or the like. Optional polyethers for use in the DMC catalyst of the present invention are polyether polyols having between 2 and 8 hydroxyl groups. It is also optional that polyethers for use in the DMC catalyst of the present invention have a molecular weight between about 1,000 Daltons and about 10,000 Daltons, optionally between about 1,000 Daltons and about 5,000 Daltons. Polyether polyols useful in the DMC catalyst of the present invention include PPG polyols, EO-capped PPG polyols, mixed EO-PO polyols, butylene oxide polymers, butylene oxide copolymers with ethylene oxide and/or propylene oxide, polytetramethylene ether glycols, and the like. Optional polyethers include PPGs, such as PPG polyols, particularly diols and triols, said PPGs having molecular weights of from about 250 Daltons to about 8,000 Daltons, optionally from about 400 Daltons to about 4,000 Daltons.

Suitable polyether carbonates for use in the DMC catalyst of the present invention may be obtained by the catalytic reaction of alkylene oxides and carbon dioxide in the presence of a suitable starter or initiator compound. The polyether carbonates used as the complexing agent can also be produced by other methods known to the person skilled in the art, for example by partial alcoholysis of polycarbonate polyols with di- or tri-functional hydroxy compounds. The polyether carbonates used as complexing agents in the DMC catalyst of the present invention optionally have an average hydroxyl functionality of 1 to 6, optionally 2 to 3, optionally 2.

Suitable polycarbonates for use in the DMC catalyst of the present invention may be obtained by the polycondensation of difunctional hydroxy compounds (generally bishydroxy compounds such as alkanediols or bisphenols) with carbonic acid derivatives such as, for example, phosgene or bis[chlorocarbonyloxy] compounds, carbonic acid diesters (such as diphenyl carbonate or dimethyl carbonate) or urea. Methods for producing polycarbonates are generally well known and are described in detail in for example "Houben-Weyl, Methoden der organischen Chemie", Volume E20, Makromolekulare Stoffe, $4^{th}$ Edition, 1987, p. 1443-1457, "Ullmann's Encyclopaedia of Industrial Chemistry", Volume A21, $5^{th}$ Edition, 1992, p. 207-215 and "Encyclopaedia of Polymer Science and Engineering", Volume 11, $2^{nd}$ Edition, 1988, p. 648-718. Aliphatic polycarbonate diols having a molecular weight of from about 500 Daltons to 5000 Daltons, optionally from 1000 Daltons to 3000 Daltons, are optionally used in the DMC catalyst of the present invention. These are generally obtained from non-vicinal diols by reaction with diaryl carbonate, dialkyl carbonate, dioxolanones, phosgene, bischloroformic acid esters or urea (see, for example, EP-A 292 772). Suitable non-vicinal diols are in particular 1,4-butanediol, neopentyl glycol, 1,5-pentanediol, 2-methyl-1,5-pentanediol, 3-methyl-1,5-pentanediol, 1,6-hexanediol, bis-(6-hydroxyhexyl)ether, 1,7-heptanediol, 1,8-octanediol, 2-methyl-1,8-octanediol, 1,9-nonanediol, 1,10-decanediol, 1,4-bis-hydroxymethyl cyclohexane, diethylene glycol, triethylene glycol, tetraethylene glycol, dipropylene glycol, tripropylene glycol, tetrapropylene glycol, alkoxylation products of diols with ethylene oxide and/or propylene oxide and/or tetrahydrofuran with molar masses up to 1000 Daltons, optionally between 200 Daltons and 700 Daltons, and in rarer cases the dimer diols, which are obtainable by reducing both carboxyl groups of dimer acids, which in turn can be obtained by dimerisation of unsaturated vegetable fatty acids. The non-vicinal diols can be used individually or in mixtures. The reaction can be catalysed by bases or transition metal compounds in the manner known to the person skilled in the art.

Other complexing agents that may be useful in present invention include poly(tetramethylene ether diols). Poly (tetramethylene ether diols) are polyether polyols based on tetramethylene ether glycol, also known as polytetrahydrofuran (PTHF) or polyoxybutylene glycol. These poly(tetramethylene ether diols) comprise two OH groups per molecule. They can be produced by cationic polymerisation of tetrahydrofuran (THF) with the aid of catalysts.

Complexing agents, as defined above, may be used to increase or decrease the crystallinity of the resulting DMC catalyst.

Suitable acids for use in the DMC catalyst of the present invention may have the formula $H_fX'''$, where X''' is an anion selected from halide, sulfate, phosphate, borate, chlorate, carbonate, cyanide, oxalate, thiocyanate, isocyanate, isothiocyanate, carboxylate and nitrate, optionally X''' is a halide.

r is an integer corresponding to the charge on the counterion X'''. For example, when X''' is Cl⁻, r will be 1, i.e. the acid will be HCl.

If present, particularly optional acids for use in the DMC catalyst of the present invention having the formula $H_rX'''$ include the following: HCl, $H_2SO_4$, $HNO_3$, $H_3PO_4$, HF, HI, HBr, $H_3BO_3$ and $HClO_4$. For example, HCl, HBr and $H_2SO_4$.

It will also be appreciated that an alkali metal salt (e.g. an alkali metal hydroxide such as KOH, an alkali metal oxide or an alkali metal carbonate) may be added to the reaction mixture during synthesis of the DMC catalyst. For example, the alkali metal salt may be added to the reaction mixture after the metal salt $(M'(X')_p)$ has been added to the metal cyanide salt $((Y)_q[M''(CN)_b(A)_c])$.

In one common preparation, an aqueous solution of zinc chloride (excess) is mixed with an aqueous solution of potassium hexacyanocobaltate, and a complexing agent (such as dimethoxyethane) is added to the resulting slurry. After filtration and washing of the catalyst with an aqueous solution of the complexing agent (e.g. aqueous dimethoxyethane), an active catalyst is obtained.

In an alternative preparation, several separate solutions may be prepared and then combined in order. For example, the following solutions may be prepared:
1. a solution of a metal cyanide (e.g. potassium hexacyanocobaltate)
2. a solution of a metal salt e.g. (zinc chloride (excess))
3. a solution of a first complexing agent (e.g. PPG diol)
4. a solution of a second complexing agent (e.g. tert-butyl alcohol).

In this method, solutions 1 and 2 are combined immediately, followed by slow addition of solution 4, optionally whilst stirring rapidly. Solution 3 may be added once the addition of solution 4 is complete, or shortly thereafter. The catalyst is removed from the reaction mixture via filtration, and is subsequently washed with a solution of the complexing agents.

If water is desired in the DMC catalyst, then the above solutions (e.g. solutions 1 to 4) may be aqueous solutions. However, it will be understood that anhydrous DMC catalysts (i.e. DMC catalysts without any water present) may be prepared if the solutions described in the above preparations are anhydrous solutions. To avoid hydrating the DMC catalyst and thereby introducing water molecules, any further processing steps (washing, filtration etc.) may be conducted using anhydrous solvents.

In one common preparation, several separate solutions may be prepared and then combined in order. For example, the following solutions may be prepared:
1. a solution of a metal salt (e.g. zinc chloride (excess)) and a second complexing agent (e.g. tert-butyl alcohol)
2. a solution of a metal cyanide (e.g. potassium hexacyanocobaltate)
3. a solution of a first and a second complexing agent (e.g. the first complexing agent may be a polymer (for example, polypropylene glycol diol) and the second complexing agent may be tert-butyl alcohol)

In this method, solutions 1 and 2 are combined slowly (e.g. over 1 hour) at a raised temperature (e.g. above 25° C., such as about 50° C.) while stirring (e.g. at 450 rpm). After addition is complete the stirring rate is increased for 1 hour (e.g. up to 900 rpm). The stirring rate is then decreased to a slow rate (e.g. to 200 rpm) and solution 3 is added quickly with low stirring. The mixture is filtered. The catalyst solids may be re-slurried in a solution of the second complexing agent at high stirring rate (e.g. about 900 rpm) before addition of the first complexing agent at low stirring rate (e.g. 200 rpm). The mixture is then filtered. This step may be repeated more than once. The resulting catalyst cake may be dried under vacuum (with heating e.g. to 60° C.).

Alternatively, after the mixture is first filtered it can be re-slurried at a raised temperature (e.g. above 25° C., such as about 50° C.) in a solution of the first complexing agent (and no second or further complexing agent) and then homogenized by stirring. It is then filtered after this step. The catalyst solids are then re-slurried in a mixture of the first and second complexing agents. For example, the catalyst solids are re-slurried in the second complexing agent at a raised temperature (e.g. above 25° C., such as about 50° C.) and subsequently the first complexing agent is added and mixture homogenized by stirring. The mixture is filtered and the catalyst is dried under vacuum with heating (e.g. to 100° C.).

It will be appreciated that the DMC catalyst may comprise:

$$M'_d[M''_e(CN)_f]_g$$

wherein M' and M'' are as defined above, d, e, f and g are integers, and are chosen to such that the DMC catalyst has electroneutrality. Optionally, d is 3. Optionally, e is 1. Optionally f is 6. Optionally g is 2. Optionally, M' is selected from Zn(II), Fe(II), Co(II) and Ni(II), optionally M' is Zn(II). Optionally M'' is selected from Co(II), Co(III), Fe(II), Fe(III), Cr(III), Ir(III) and Ni(II), optionally M'' is Co(II) or Co(III).

It will be appreciated that any of these optional features may be combined, for example, d is 3, e is 1, f is 6 and g is 2, M' is Zn(II) and M'' is Co(III).

Suitable DMC catalysts of the above formula may include zinc hexacyanocobaltate(III), zinc hexacyanoferrate(III), nickel hexacyanoferrate(II), and cobalt hexacyanocobaltate (III).

There has been a lot of development in the field of DMC catalysts, and the skilled person will appreciate that the DMC catalyst may comprise, in addition to the formula above, further additives to enhance the activity of the catalyst. Thus, while the above formula may form the "core" of the DMC catalyst, the DMC catalyst may additionally comprise stoichiometric or non-stoichiometric amounts of one or more additional components, such as at least one complexing agent, an acid, a metal salt, and/or water.

For example, the DMC catalyst may have the following formula:

$$M'_d[M''_e(CN)_f]_g \cdot hM'''X''_i \cdot jR^c \cdot kH_2O \cdot lH_rX'''$$

wherein M', M'', X''', d, e, f and g are as defined above. M''' can be M' and/or M''. X'' is an anion selected from halide, oxide, hydroxide, sulphate, carbonate, cyanide, oxalate, thiocyanate, isocyanate, isothiocyanate, carboxylate and nitrate, optionally X'' is halide. i is an integer of 1 or more, and the charge on the anion X'' multiplied by i satisfies the valency of M'''. r is an integer that corresponds to the charge on the counterion X'''. For example, when X''' is Cl⁻, r will be 1. l is 0, or a number between 0.1 and 5. Optionally, l is between 0.15 and 1.5.

$R^c$ is a complexing agent, and may be as defined above. For example, $R^c$ may be a (poly)ether, a polyether carbonate, a polycarbonate, a poly(tetramethylene ether diol), a ketone, an ester, an amide, an alcohol (e.g. a $C_{1-8}$ alcohol), a urea and the like, such as propylene glycol, polypropylene glycol, (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol, for example, $R^c$ may be tert-butyl alcohol, dimethoxyethane, or polypropylene glycol.

As indicated above, more than one complexing agent may be present in the DMC catalysts used in the present invention. Optionally, a combination of the complexing agents tert-butyl alcohol and polypropylene glycol may be present.

It will be appreciated that if the water, complexing agent, acid and/or metal salt are not present in the DMC catalyst, h, j, k and/or l will be zero respectively. If the water, complexing agent, acid and/or metal salt are present, then h, j, k and/or l are a positive number and may, for example, be between 0 and 20. For example, h may be between 0.1 and 4. j may be between 0.1 and 6. k may be between 0 and 20, e.g. between 0.1 and 10, such as between 0.1 and 5. l may be between 0.1 and 5, such as between 0.15 and 1.5.

As set out above, DMC catalysts are complicated structures, and thus the above formula including the additional components is not intended to be limiting. Instead, the skilled person will appreciate that this definition is not exhaustive of the DMC catalysts which are capable of being used in the invention.

For example, the DMC catalyst may comprise:

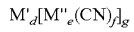

$$M'_d[M''_e(CN)_f]_g$$

Wherein M' and M" are as defined above, d, e, f and g are integers, and are chosen to such that the DMC catalyst has electroneutrality. Optionally, d is 3. Optionally, e is 1. Optionally f is 6. Optionally g is 2. Optionally, M' is selected from Zn(II), Fe(II), Co(II) and Ni(II), optionally M' is Zn(II). Optionally M" is selected from Co(III), Fe(III), Cr(III) and Ir(III), optionally M" is Co(III).

It will be appreciated that any of these optional features may be combined, for example, d is 3, e is 1, f is 6 and g is 2, M' is Zn(II) and M" is Co(III).

Suitable DMC catalysts of the above formula may include zinc hexacyanocobaltate(III), zinc hexacyanoferrate(III), nickel hexacyanoferrate(II), and cobalt hexacyanocobaltate(III).

There has been a lot of development in the field of DMC catalysts, and the skilled person will appreciate that the DMC catalyst may comprise, in addition to the formula above, further additives to enhance the activity of the catalyst. Thus, while the above formula may form the "core" of the DMC catalyst, the DMC catalyst additionally comprises stoichiometric or non-stoichiometric amounts of a first and a second complexing agent, where the first complexing agent is a polymer. The DMC catalyst may also comprise stoichiometric or non-stoichiometric amounts of one or more additional components, such as an acid, a metal salt, and/or water.

For example, the DMC catalyst may have the following formula:

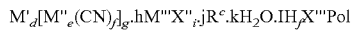

$$M'_d[M''_e(CN)_f]_g.hM'''X''_i.jR^c.kH_2O.lH_rX'''Pol$$

Wherein M', M", d, e, f and g are as defined above. M''' can be M' and/or M". X" is an anion selected from halide, hydroxide, oxide, sulphate, carbonate, cyanide, oxalate, thiocyanate, isocyanate, isothiocyanate, carboxylate and nitrate, optionally X' is halide. i is an integer of 1 or more, and the charge on the anion X" multiplied by i satisfies the valency of M'''. r is an integer that corresponds to the charge on the counterion X'''. For example, when X''' is Cl⁻, r will be 1. l is a number between 0.1 and 5. Optionally, l is between 0.15 and 1.5.

$R^c$ is the second complexing agent, and may be as defined above. For example, $R^c$ may be an ether, a ketone, an ester, an amide, an alcohol (e.g. a Ca alcohol), a urea and the like. Examples of $R^c$ include propylene glycol, (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol, for example, $R^c$ may be tert-butyl alcohol or dimethoxyethane. Optionally $R^c$ is tert-butyl alcohol.

j is a positive number, and may be between 0.1 and 6.

It will be appreciated that if the water, metal salt and/or acid are not present in the DMC catalyst, h, k and/or l will be zero respectively. If the water, metal salt and/or acid are present, then h, k and/or l are a positive number and may, for example, be between 0 and 20. For example, h may be between 0.1 and 4. k may be between 0 and 20, e.g. between 0.1 and 10, such as between 0.1 and 5.

Pol represents the first complexing agent, which is a polymer. Pol is optionally selected from a polyether, a polycarbonate ether, and a polycarbonate. The first complexing agents (e.g. "Pol") is present in an amount of from about 5% to about 80% by weight of the DMC catalyst, optionally in an amount of from about 10% to about 70% by weight of the DMC catalyst, optionally in an amount of from about 20% to about 50% by weight of the DMC catalyst.

The DMC catalyst, in addition to at least two metal centres and cyanide ligands, may also comprises at least one of: one or more complexing agents, water, a metal salt and/or an acid, optionally in non-stoichiometric amounts.

An exemplary DMC catalyst is of the formula $Zn_3[Co(CN)_6]_2.hZnCl_2.kH_2O.j[(CH_3)_3COH]$, wherein h, k and j are as defined above. For example, h may be from 0 to 4 (e.g. from 0.1 to 4), k may be from 0 to 20 (e.g. from 0.1 to 10), and j may be from 0 to 6 (e.g. from 0.1 to 6).

As set out above, DMC catalysts are complicated structures, and thus, the above formulae including the additional components is not intended to be limiting. Instead, the skilled person will appreciate that this definition is not exhaustive of the DMC catalysts which are capable of being used in the invention.

EXAMPLES

Methods
Nuclear Magnetic Resonance Spectroscopy
¹H NMR spectra were recorded on a Bruker AV-400 instrument, using the solvent $CDCl_3$.
Gel Permeation Chromatography
GPC measurements were carried out against narrow polydispersity poly(ethylene glycol) or polystyrene standards in THF using an Agilent 1260 Infinity machine equipped with Agilent PLgel Mixed-E columns.
Mass Spectroscopy
All mass spectrometry measurements were performed using a MALDI micro MX micromass instrument.

Example 1

Synthesis of DMC Catalyst
The DMC catalyst used in this example was prepared according to the method reported in Journal of Polymer Science; Part A: Polymer Chemistry, 2002, 40, 1142. In brief, 1.0 g of $K_3Co(CN)_6$ was dissolved in a mixture solvent of 13 g distilled water and 2 g tert-butyl alcohol. 6 g of $ZnCl_2$ was dissolved in a mixture solvent of 13 g water and 4 g tert-butyl alcohol, and then this mixture was added slowly to the $K_3Co(CN)_6$ solution over a period of 20 minutes, whilst stirring. The mixture was then stirred for a further 40 minutes and then centrifugal separation was performed to yield a white precipitate. The precipitate was dispersed in a mixture solvent of 16 g water and 16 g tert-butyl alcohol, and stirred for 20 minutes, and then the precipitate was separated by centrifuge. This washing procedure was repeated 3 times. The white precipitate was then dispersed in 50 g tert-butyl alcohol, and then stirred for 20 minutes, followed by centrifugal separation to obtain a white precipitate. The washing with tert-butyl alcohol was then repeated once more. The solvent was then removed under reduced pressure at 60° C. for 8 hours. The resultant compound is understood to have the formula $Zn_3[Co(CN)_6]_2 \cdot hZnCl_2 \cdot 0.5H_2O \cdot 2[(CH_3)_3COH]$.

Synthesis of $[L^1Ni_2(OAc)_2]$, Catalyst 1

Ligand $H_2L^1$ was synthesised by the method previously described by Kember et al, Angew. Chem. Int. Ed., 2009, 48, 931-933.

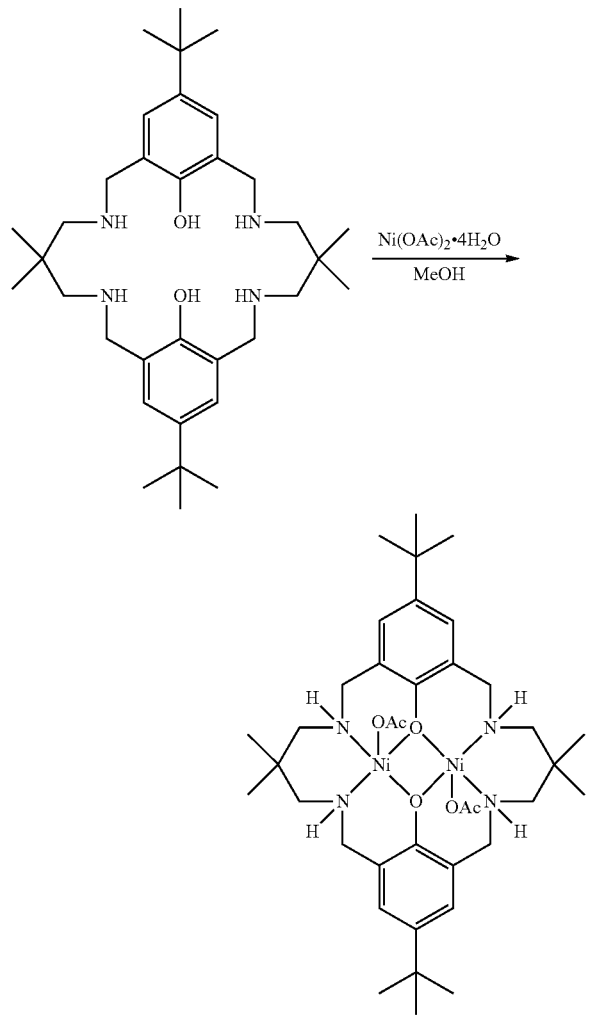

$H_2L^1$ (2 mmol) was dissolved in MeOH (50 mL), then $Ni(OAc)_2 \cdot 4H_2O$ (0.498 g, 4 mmol) was added portionwise over 15 minutes and the solution stirred overnight. The solvent was removed under vacuum and excess water/AcOH was removed by azeotrope with toluene (3×40 mL).

$[L^1Ni_2(OAc)_2]$: IR ($\upsilon_{C=O}$, cm$^{-1}$, neat): 1581 and 1413. MALDI-TOF MS: m/z: 727.6 ([M-OAc]$^+$, 100%).

Example 2

Synthesis of DMC Catalyst According to U.S. Pat. No. 5,482,908 Example 1 (Catalyst 2)

The synthesis described in Example 1 of U.S. Pat. No. 5,482,908 was followed except the 4000 molecular weight polypropylene glycol diol was replaced with a 2000 molecular weight polypropylene glycol diol:

Potassium hexacyanocobaltate (8.0 g) was dissolved in deionised (DI) water (140 mL) in a beaker (solution 1). Zinc chloride (25 g) was dissolved in DI water (40 mL) in a second beaker (solution 2). A third beaker containing solution 3 was prepared: a mixture of DI water (200 mL), tert-butyl alcohol (2 mL) and polyol (2 g of a 2000 mol. wt. polypropylene glycol diol). Solutions 1 and 2 were mixed together using a mechanical stirrer. Immediately a 50/50 (by volume) mixture of tert-butyl alcohol and DI water (200 mL total) was added to the zinc hexacyanocobaltate mixture, and the product was stirred vigorously for 10 min. Solution 3 (polyol/water/tert-butyl alcohol mixture) was added to the aqueous slurry of zinc hexacyanocobaltate and the product stirred magnetically for 3 min. The mixture was filtered under pressure to isolate the solids. The solid cake was reslurried in tert-butyl alcohol (140 mL), DI water (60 mL), and an additional 2 g of the 2000 mol. wt. polypropylene glycol diol. Then mixture was stirred vigorously for 10 min. and filtered. The solid cake was reslurried in tert-butyl alcohol (200 mL) and an additional 1 g of 2000 mol. wt. polypropylene glycol diol and stirred vigorously for 10 minutes, then filtered. The resulting solid catalyst was dried under vacuum (<1 mbar) at 50° C. to constant weight. The yield of dry, powdery catalyst was 8.5 g.

Example 3

DMC synthesised precisely as described in Chen et al, Polymer, 45 (2004), 6519 (Catalyst 3) Under vigorous stirring, 10 ml of $K_3[Co(CN)_6]$ solution (0.2 M) was added dropwise in $ZnCl_2$ solution (8 g $ZnCl_2$ in mixture of 30 ml water and 15 ml tert-butanol), the resulting white suspension was filtered to isolate precipitate of DMC catalyst, and resuspended in a solution of tert-butanol and water (v/vZ1:1) under vigorous stirring, then precipitate was filtered again. The precipitate was washed several times with gradually increasing portion of tert-butanol against water. Finally, the solid was resuspended in tert-butanol to exclude water, filtered and dried under vacuum at 50° C. for 8 h.

The catalyst was analysed by ICP-MS, which revealed almost no K$^+$ content (XXX ppm). Analysis by powder X-ray diffraction indicated the absence of peaks at 17.65 (5.07 Å), 23.72° (3.76 Å), 24.80° (3.59 Å), 35.19° (2.54 Å) and 39.82° (2.26 Å) which would indicate the presence of crystalline zinc hexacyanocobaltate content. Broad peaks at 18.37° (4.82 Å), and 23.72° (3.76 Å) indicate the catalyst made by this procedure is substantially or completely amorphous.

Example 4

206 mg of DMC catalyst (3) as referred to above was taken into a 2 L reactor along with 1,6-hexanediol (30.5 g). The catalyst and starter were dried at 110-120° C. under vacuum for 1-2 hours. The reactor was cooled down to room temperature and catalyst 1 (2.06 g) was added as an ethyl acetate solution by injected into the vessel via a syringe under continuous flow of $CO_2$ gas. The reactor was pressurized to 2 bar of CO while at room temperature. The vessel was heated to the desired temperature and the reactor was stabilised with desired reaction pressure. The reaction was started with an addition of an initial 14 wt % of total PO. The contents of the reactor were stirred for 45 min. Another 4 wt % PO was added slowly over 30 minutes before waiting for another 30 minutes for it to be consumed. The remaining PO (82 wt %) was added continuously with via HPLC pump in a duration of 5-6 hours. Reaction temperature and pressure were remained same throughout the reactions. After 16 hours, the reaction was terminated by cooling the reactor to 5° C. and vented slowly. The crude polyol was analysed by $^1$H NMR spectroscopy and Gel Permeation Chromatography.

PEC1 to PEC7 were made following this process. The $CO_2$ contents in the polyol were controlled by changing the temperature and $CO_2$ pressure.

PEC 8 and PEC9 were made by varying the temperature of steps (α) & (β). 20% of the PO was added in step (α) at 65° C., the remaining 80% of PO was added in step (β) at 80° C. The rest of the procedure was as described above.

| Polyol | Starter | Functionality | $CO_2$ wt % | Mn (GPC) |
|---|---|---|---|---|
| PEC1 | 1,6-hexanediol | 2 | 9.0 | 1800 |
| PEC2 | 1,6-hexanediol | 2 | 21 | 1930 |
| PEC3 | 1,6-hexanediol | 2 | 27.4 | 1935 |
| PEC5 | 1,6-hexanediol | 2 | 35.2 | 1700 |
| PEC6 | 1,6-hexanediol | 2 | 37.8 | 1817 |
| PEC7 | 1,6-hexanediol | 2 | 23.6 | 905 |
| PEC8 | 1,6-hexanediol | 2 | 18.8 | 809 |
| PEC9 | 1,6-hexanediol | 2 | 14.3 | 728 |

Example 5

10.3 mg of DMC catalyst (2) as referred to above was taken into a 100 mL oven dried reactor along with dodecanediol (2.615 g). The mixture was dried at 120° C. under vacuum for 1 hour. The reactor was cooled down to room temperature and ethyl acetate (15 mL) was injected into the vessel via a syringe under continuous flow of $CO_2$ gas. The vessel was heated to the desired temperature (130° C.) and filled to the desired $CO_2$ pressure (5 bar). 6% (1.49 g) of total propylene oxide was added in 3 bursts (2 wt % each, 0.5 g) with 30 minutes between each.

The reactor was cooled to 70° C., then catalyst (1) (103 mg) dissolved in EtOAc (5 mL) and 20 wt % PO (4.98 g) was added via a HPLC pump. The remaining 74 wt % PO (18.43 g) was added over 3 hours. The reactor was cooled to below 10° C. and the pressure was released. NMR and GPC were measured immediately.

TABLE 1

| Run | Temp (° C.) | Pressure (bar) | $CO_2$ wt % | Mn/Mw | PDI |
|---|---|---|---|---|---|
| 1 | 130 70 | 5 | 20.9 | 1748 | 1.406 |

Example 6

10.3 mg of the DMC catalyst (3) was taken into a 100 mL oven dried reactor along with polytetrahydrofuran 250 (50% of total starter, 1.6 g). The catalyst and starter were dried at 120° C. under vacuum for 1 hour. The reactor was cooled down to room temperature and catalyst (1) (103 mg) in ethyl acetate (15 mL) was injected into the vessel via a syringe under continuous flow of $CO_2$ gas.

The vessel was heated to the desired temperature (70° C.) and filled to the desired $CO_2$ pressure (5 bar). 14 wt % of propylene oxide (3.5 g) was added and then after 45 minutes a further 3.8 wt % (0.95 g) propylene oxide was added followed by 45 minute wait. A further 1.63 g of polytetrahydrofuran 250 (50% of total starter) was mixed with the remaining 82.2 wt % propylene oxide (20.45 g), and this mixture was added to the reactor over 4 hours via a HPLC pump. Once the reaction was finished, the reactor was cooled to below 10° C. and the pressure was released. NMR and GPC were measured immediately.

TABLE 2

| Run | Temp (° C.) | Pressure (bar) | % Carbonate linkages | $CO_2$ wt % | Mn/Mw | PDI |
|---|---|---|---|---|---|---|
| 1 | 120 70 | 5 | 40.8 | 21.5 | 2079 | 1.301 |

Example 7

3.1 mg of DMC catalyst (3) was taken into a 100 mL oven dried reactor along with dodecanediol (6.2 g). The mixture was dried at 120° C. under vacuum for 1 hour. The reactor was cooled down to room temperature and ethyl acetate (6 mL) was injected into the vessel via a syringe under continuous flow of $CO_2$ gas. The vessel was heated to the desired temperature (130° C.). 3.75 g of propylene oxide was added in 3 bursts (1.25 g each) with 30 minutes between each. An exotherm and pressure drop occurred indicating activation.

The reactor was cooled to 65° C. whilst pressurizing to 5 bar with $CO_2$. The catalyst (1) (103 mg) dissolved in EtOAc (5 mL) and PO (4.98 g) was added via a HPLC pump. The remaining PO (18.43 g) was added over 3 hours after which the temperature was increased to 85° C. The reaction 'cooked out' overnight before the reactor was cooled to below 10° C. and the pressure was released. NMR and GPC were measured immediately.

Example 8

3.1 mg of DMC catalyst (3) was taken into a 100 mL oven dried reactor along with dodecanediol (6.2 g). The mixture was dried at 120° C. under vacuum for 1 hour. The reactor was cooled down to room temperature and ethyl acetate (6 mL) was injected into the vessel via a syringe under continuous flow of $CO_2$ gas. The vessel was heated to the desired temperature (130° C.). 2.25 g propylene oxide was added in 3 bursts 0.75 g each with 30 minutes between each. An exotherm and pressure drop occurred indicating activation.

The reactor was cooled to 65° C. whilst pressurizing to 5 bar with $CO_2$. The catalyst (1) (103 mg) dissolved in EtOAc (5 mL) and PO (4.98 g) was added via a HPLC pump. The remaining PO (18.43 g) was added over 3 hours after which the temperature was increased to 85° C. The reaction 'cooked out' overnight before the reactor was cooled to below 10° C. and the pressure was released. NMR and GPC were measured immediately.

Example 9

3.1 mg of DMC catalyst (3) was taken into a 100 mL oven dried reactor along with dodecanediol (6.2 g). The mixture was dried at 120° C. under vacuum for 1 hour. The reactor was cooled down to room temperature and ethyl acetate (6 mL) was injected into the vessel via a syringe under continuous flow of $CO_2$ gas. The vessel was heated to the desired temperature (130° C.). 3.75 g of propylene oxide was added in 3 bursts 1.25 g each with 30 minutes between each. An exotherm and pressure drop occurred indicating activation.

The reactor was cooled to 65° C. whilst pressurising to 5 bar with $CO_2$ and slow-feeding PO (1.25 g) over 30 mins. At target temperature, a further addition of PO (2.5 g) was added. After this, the catalyst (1) (103 mg) dissolved in EtOAc (5 mL) was added via a HPLC pump. The remaining PO (17.4 g) was added over 2.5 hours after which the temperature was increased to 85° C. The reaction 'cooked out' overnight before the reactor was cooled to below 10° C. and the pressure was released. NMR and GPC were measured immediately.

Example 10

180.0 mg of DMC catalyst (3) was taken into a 2 L reactor along with dodecanediol (52.0 g). The mixture was dried at 120° C. under vacuum for 1 hour. The vessel was isolated under vacuum and heated to 130° C. 225 g of ethyl acetate was added via HPLC pump. 75 g of propylene oxide was added in 3 bursts (25 g each) with 30 minutes between each.

The reactor was cooled to 65° C. and the reactor was pressurised to 5 bar with $CO_2$. The catalyst (1) (2.06 g) dissolved in EtOAc (100 g) was added via a HPLC pump followed by PO (25 g). The remaining PO (398.4 g) was added over 3 hours at 65° C. The reactor was cooled to below 10° C. and the pressure was released. NMR and GPC were measured immediately.

Example 11

180.0 mg of DMC catalyst (3) was taken into a 2 L reactor along with dodecanediol (52.0 g). The mixture was dried at 120° C. under vacuum for 1 hour. The vessel was heated to 130° C. and pressurised with 5 bar CO2. 225 g of ethyl acetate was added via HPLC pump. 75 g of total propylene oxide was added in 3 bursts (25 g each) with 30 minutes between each.

The reactor was cooled to 73° C. with continuous flow of 5 bar $CO_2$ and PO (25 g) was added once the temperature reached 73° C. The catalyst (1) (2.06 g) dissolved in EtOAc (100 g) was added via a HPLC pump. The remaining PO (398.4 g) was added over 3 hours at 73° C. The reaction 'cooked out' overnight before the reactor was cooled to below 10° C. and the pressure was released. NMR and GPC were measured immediately.

TABLE 3

| Example | Conversion % | Overall $CO_2$ wt % | Mn g/mol | PDI |
|---|---|---|---|---|
| 7 | 100 | 15.6 | 950 | 1.10 |
| 8 | 100 | 12.6 | 1200 | 1.20 |
| 9 | 100 | 13.9 | 950 | 1.10 |
| 10 | 100 | 24.8 | 2200 | 1.45 |
| 11 | 100 | 14.0 | 1500 | 1.91 |

The examples demonstrate that a range of $CO_2$ containing polyols can be made using process methods where one or more reagents or catalysts are added at different points of the reaction in a continuous or semi-continuous manner, to increase process safety, productivity and product design. Products can be made using low molecular weight starters to produce high $CO_2$ content polyols under low $CO_2$ pressures.

The invention claimed is:

1. A method for preparing a polycarbonate ether polyol, the method comprising the steps of:
   (I) (a) mixing catalyst of formula (I), double metal cyanide (DMC) catalyst and optionally carbon dioxide and/or solvent with epoxide and optionally starter compound and/or carbon dioxide to form mixture (α); or
   (b) mixing double metal cyanide (DMC) catalyst and optionally starter compound, carbon dioxide and/or solvent with epoxide and optionally carbon dioxide and/or solvent to form mixture (α); or
   (c) mixing epoxide, catalyst of formula (I), starter compound and carbon dioxide and optionally solvent to form mixture (α); or
   (d) mixing catalyst of formula (I), double metal cyanide (DMC) catalyst and optionally starter compound, epoxide, carbon dioxide and/or solvent to form mixture (α); and
   (II) adding one or more of starter compound, epoxide, catalyst of formula (I), double metal cyanide (DMC) catalyst and/or solvent, and optionally carbon dioxide, to mixture (α) to form mixture (β) comprising starter compound, epoxide, carbon dioxide, catalyst of formula (I), double metal cyanide (DMC) catalyst and optionally solvent,
   wherein the catalyst of formula (I) has the following structure:

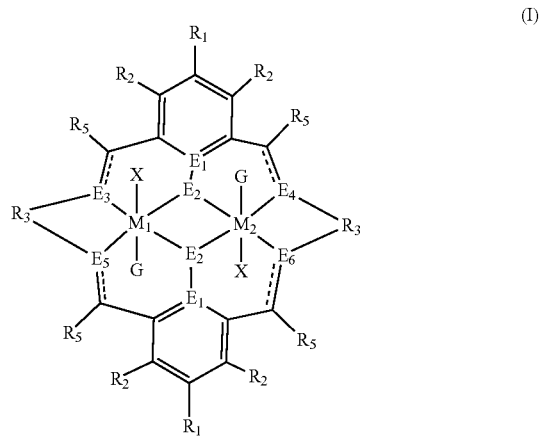

(I)

wherein $M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-$(X)_2$ or Ti(IV)-$(X)_2$;

$R_1$ and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

R₃ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

R₅ is independently selected from H, or optionally substituted aliphatic, heteroaliphatic, alicyclic, heteroalicyclic, aryl, heteroaryl, alkylheteroaryl or alkylaryl; E₁ is C, E₂ is O, S or NH or E₁ is N and E₂ is O;

E₃, E₄, E₅ and E₆ are selected from N, NR₄, O and S, wherein when E₃, E₄, E₅ or E₆ are N, ===== is ═════, and wherein when E₃, E₄, E₅ or E₆ are NR₄, O or S, ----- is ─────;

R₄ is independently selected from H, or optionally substituted aliphatic, heteroaliphatic, alicyclic, heteroalicyclic, aryl, heteroaryl, alkylheteroaryl, -alkylC(O)OR₁₉ or -alkylC≡N or alkylaryl, wherein R₁₉ is independently selected from hydrogen, an aliphatic, heteroaliphatic, alicyclic, heteroalicyclic, aryl or heteroaryl group;

X is independently selected from OC(O)Rₓ, OSO₂Rₓ, OSORₓ, OSO(Rₓ)₂, S(O)Rₓ, ORₓ, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between M₁ and M₂;

Rₓ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

2. The method of claim 1, wherein during either step(I)(a) or (I)(b) the mixture (α) is held at a temperature of between about 50 to 150° C. prior to step (II).

3. The method of claim 1, wherein during either step (I)(c) or (I)(d) the mixture (α) is held at a temperature of between about 0 to 120° C. prior to step (II).

4. The method of claim 1, wherein mixture (a) comprises less than about 1 wt. % water.

5. The method of claim 1), wherein step (II) comprises mixing double metal cyanide (DMC) catalyst, epoxide, and optionally starter compound, carbon dioxide and/or solvent to form a pre-activated mixture and adding the pre-activated mixture to mixture (α) to form mixture (β).

6. The method of claim 5, wherein the pre-activated mixture is held at a temperature of between about 50 to 110° C. prior to adding.

7. The method of claim 1, wherein the method employs a total amount of epoxide, and wherein about 1 to 95% of the total amount of epoxide is mixed in step (I), with the remainder added in step (II).

8. The method of claim 1, in which there are two starter compounds in mixture (β), wherein the starter compound in step (I) is a first starter compound, and wherein step (II) comprises:

(A) adding one or more of first starter compound, epoxide, catalyst of formula (I), double metal cyanide (DMC) catalyst and/or solvent, and optionally carbon dioxide, to mixture (α); and (B) adding a second starter compound and optionally epoxide, carbon dioxide, catalyst of formula (I), double metal cyanide (DMC) catalyst and/or solvent to form mixture (β) comprising first starter compound, second starter compound, epoxide, carbon dioxide, catalyst of formula (I), double metal cyanide (DMC) catalyst and optionally solvent.

9. The method of claim 8, wherein said first starter compound has a molecular weight of at least about 200 Da and said second starter compound has a molecular weight of at most about 200 Da.

10. The method of claim 1, wherein one starter or each starter compound has two or more hydroxyl groups.

11. The method of claim 1, wherein epoxide, catalyst of formula (I), double metal cyanide (DMC) catalyst and/or starter compound is, independently, continuously added in step (II).

12. The method of claim 1, wherein epoxide, catalyst of formula (I), double metal cyanide (DMC) catalyst and/or starter compound is, independently, discontinuously added in step (II).

13. The method of claim 1, wherein one starter or each starter compound has the formula (III):

(III)

wherein Z can be any group which can have 2 or more —Rᶻ groups attached to it;

each Rᶻ is independently selected from —OH, —NHR', —SH, —C(O)OH, -P(O)(OR')(OH),— PR'(O)(OH)₂ or —PR'(O)OH;

R' is selected from H, or optionally substituted alkyl, heteroalkyl, aryl, heteroaryl, cycloalkyl or heterocycloalkyl; and a is an integer which is at least 2.

14. The method of claim 1, wherein one starter or each starter compound is selected from 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,4-cyclohexanediol, 1,2-diphenol, 1,3-diphenol, 1,4-diphenol, neopentyl glycol, catechol, cyclohexenediol, 1,4-cyclohexanedimethanol, dipropylene glycol, diethylene glycol, tripropylene glycol, triethylene glycol, tetraethylene glycol, polypropylene glycols (PPGs) or polyethylene glycols (PEGs) having an Mn of up to about 1500 g/mol, glycerol, benzenetriol, 1,2,4-butanetriol, 1,2,6-hexanetriol, tris(methylalcohol)propane, tris(methylalcohol)ethane, tris(methylalcohol)nitropropane, trimethylol propane, polypropylene oxide triols, polyester triols, calix[4]arene, 2,2-bis(methylalcohol)-1,3-propanediol, erythritol, pentaerythritol, sorbitol, oxalic acid, malonic acid, succinic acid, glutaric acid, adipic acid, pimelic acid, suberic acid, azelaic acid, sebacic acid, undecanedioic acid, dodecanedioic acid, lactic acid, glycolic acid, 3-hydroxypropanoic acid, 4-hydroxybutanoic acid, 5-hydroxypentanoic acid, ethanolamine, diethanolamine, methyldiethanolamine, and phenyldiethanolamine.

15. The method of claim 1, wherein the carbon dioxide is present and is provided continuously.

* * * * *

UNITED STATES PATENT AND TRADEMARK OFFICE
CERTIFICATE OF CORRECTION

| | | |
|---|---|---|
| PATENT NO. | : 11,965,062 B2 | |
| APPLICATION NO. | : 16/757870 | |
| DATED | : April 23, 2024 | |
| INVENTOR(S) | : Michael Kember et al. | |

It is certified that error appears in the above-identified patent and that said Letters Patent is hereby corrected as shown below:

In the Claims

Claim 4, Column 67, Line 43 should read: The method of claim 1, wherein mixture ($\alpha$) comprises Signed and Sealed this
Eleventh Day of June, 2024

*Katherine Kelly Vidal*

Katherine Kelly Vidal
*Director of the United States Patent and Trademark Office*